(12) United States Patent
Takizawa

(10) Patent No.: US 9,386,226 B2
(45) Date of Patent: Jul. 5, 2016

(54) CAMERA DRIVE DEVICE

(71) Applicant: PANASONIC INTELLECTUAL PROPERTY CORPORATION OF AMERICA, Torrance, CA (US)

(72) Inventor: Teruyuki Takizawa, Osaka (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 114 days.

(21) Appl. No.: 14/372,267

(22) PCT Filed: Nov. 14, 2013

(86) PCT No.: PCT/JP2013/006708
§ 371 (c)(1),
(2) Date: Jul. 15, 2014

(87) PCT Pub. No.: WO2014/076959
PCT Pub. Date: May 22, 2014

(65) Prior Publication Data
US 2014/0362242 A1 Dec. 11, 2014

(30) Foreign Application Priority Data

Nov. 16, 2012 (JP) ................................ 2012-252344

(51) Int. Cl.
*H04N 5/232* (2006.01)
*H04N 5/225* (2006.01)
(Continued)

(52) U.S. Cl.
CPC .......... *H04N 5/23287* (2013.01); *G02B 27/646* (2013.01); *G03B 5/00* (2013.01);
(Continued)

(58) Field of Classification Search
CPC ........... H04N 5/2251–5/2254; H04N 5/23264; H04N 5/2328; H04N 5/23287; G03B 17/02; G03B 5/00; G03B 5/02; G03B 2205/0007; G03B 2205/0015; G03B 2205/0023; G03B 2205/0038; G03B 2205/0053–2205/0084; G08B 13/19617–13/1932; G02B 27/64; G02B 27/646

See application file for complete search history.

(56) References Cited

U.S. PATENT DOCUMENTS 5,956,529 A 9/1999 Lee et al.
9,225,899 B2 * 12/2015 Takizawa ........... H04N 5/23261
(Continued)

FOREIGN PATENT DOCUMENTS

JP 08-234092 A 9/1996
JP 11-220651 A 8/1999
(Continued)

OTHER PUBLICATIONS

Form PCT/ISA/237 for corresponding PCT App. No. PCT/JP2013/006708, dated Feb. 10, 2014, and partial English translation.
(Continued)

*Primary Examiner* — Paul Berardesca
(74) *Attorney, Agent, or Firm* — Renner, Otto, Boisselle & Sklar, LLP

(57) ABSTRACT

A camera driving apparatus according to the present invention includes: a camera section with an imaging plane; a movable unit which houses the camera section inside and includes an attracting magnet and a convex partial sphere on its outer surface; a fixed unit which has a depressed portion in which a magnetic body and the movable unit are loosely fit, which brings the convex partial sphere of the movable unit into a point or line contact with the depressed portion under magnetic attractive force of the attracting magnet to the magnetic body, and which allows the movable unit to rotate freely on the spherical centroid of the first convex partial sphere; a panning driving section; a tilting driving section; a rolling driving section; a lens driving section; an image sensor driving section; a first detector which detects the tilt angles of the camera section in the panning and tilting directions with respect to the fixed unit; a second detector which detects the angle of rotation of the camera section that is rotating in the rolling direction; and a third detector which detects the magnitudes of shift of the image sensor along the panning rotation axis and the tilting rotation axis.

45 Claims, 29 Drawing Sheets

(51) Int. Cl.
  *G02B 27/64* (2006.01)
  *G03B 17/02* (2006.01)
  *G03B 5/00* (2006.01)

(52) U.S. Cl.
  CPC ............. *G03B 17/02* (2013.01); *H04N 5/2252* (2013.01); *H04N 5/2253* (2013.01); *H04N 5/2254* (2013.01); *G03B 2205/0023* (2013.01); *G03B 2205/0069* (2013.01); *G03B 2205/0092* (2013.01)

(56) References Cited

U.S. PATENT DOCUMENTS

| | | |
|---|---|---|
| 2006/0033818 A1 | 2/2006 | Wada et al. |
| 2011/0122495 A1 | 5/2011 | Togashi |
| 2012/0188441 A1* | 7/2012 | Takizawa ............. H04N 5/2251 348/374 |
| 2012/0250156 A1* | 10/2012 | Asakawa ............. H02K 41/031 359/554 |

FOREIGN PATENT DOCUMENTS

| | | |
|---|---|---|
| JP | 2003-241298 A | 8/2003 |
| JP | 2006-053358 A | 2/2006 |
| JP | 2008-058391 A | 3/2008 |
| WO | WO 2012/004952 A1 | 12/2012 |

OTHER PUBLICATIONS

International Search report and English translation for PCT App. No. PCT/JP2013/006708 mailed Feb. 10, 2014.
Co-Pending U.S. Appl. No. 14/372,327, filed Jul. 15, 2014.
Co-pending U.S. Appl. No. 14/372,275, filed Jul. 15, 2014.

* cited by examiner

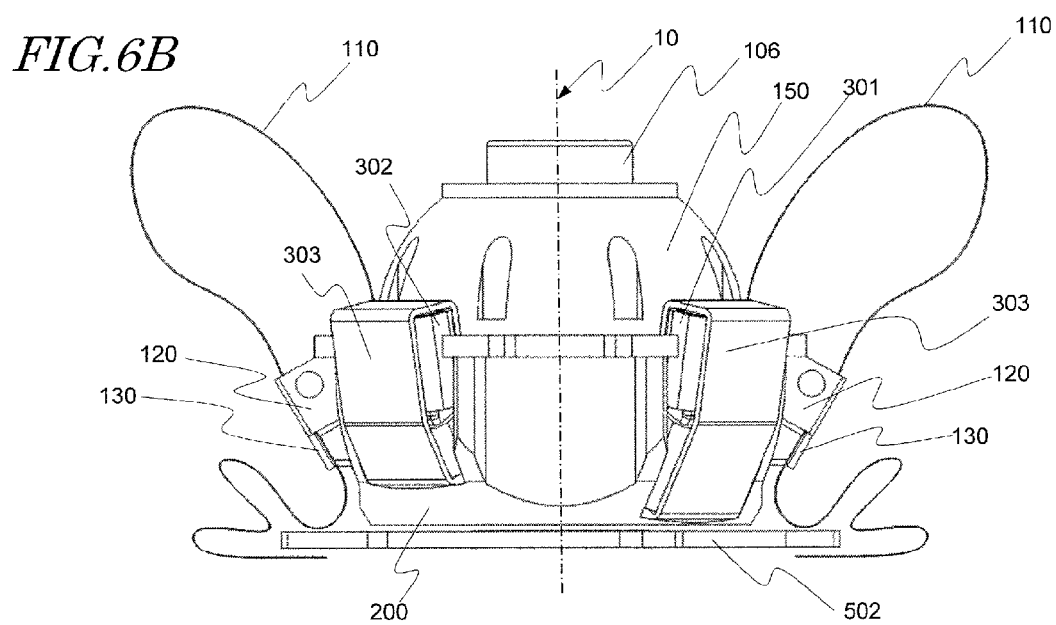

FIG.22A
FIG.22B
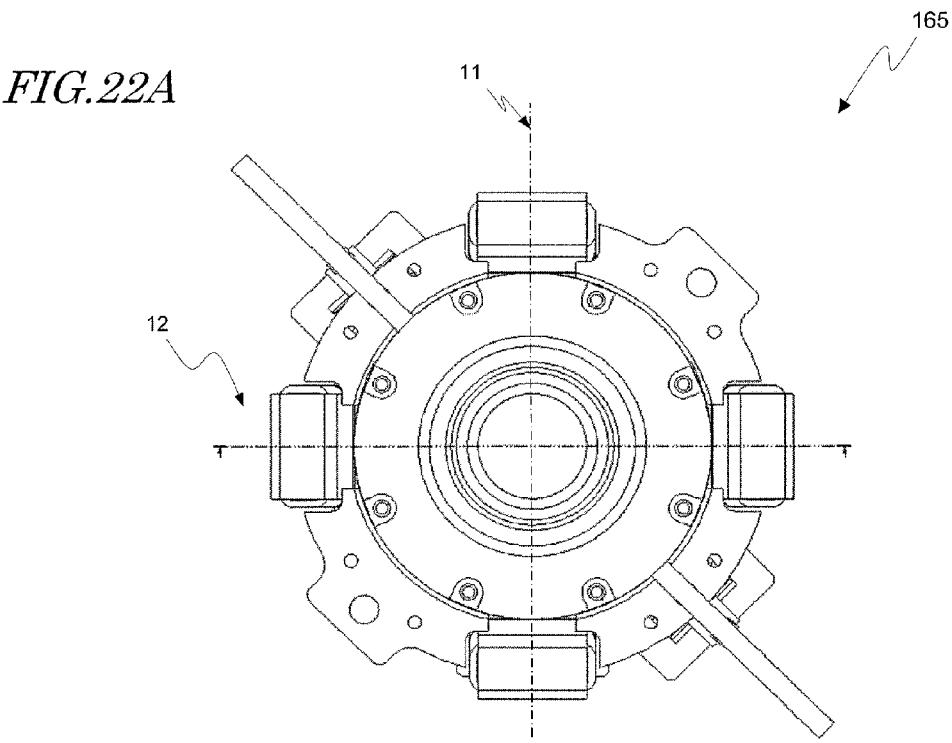
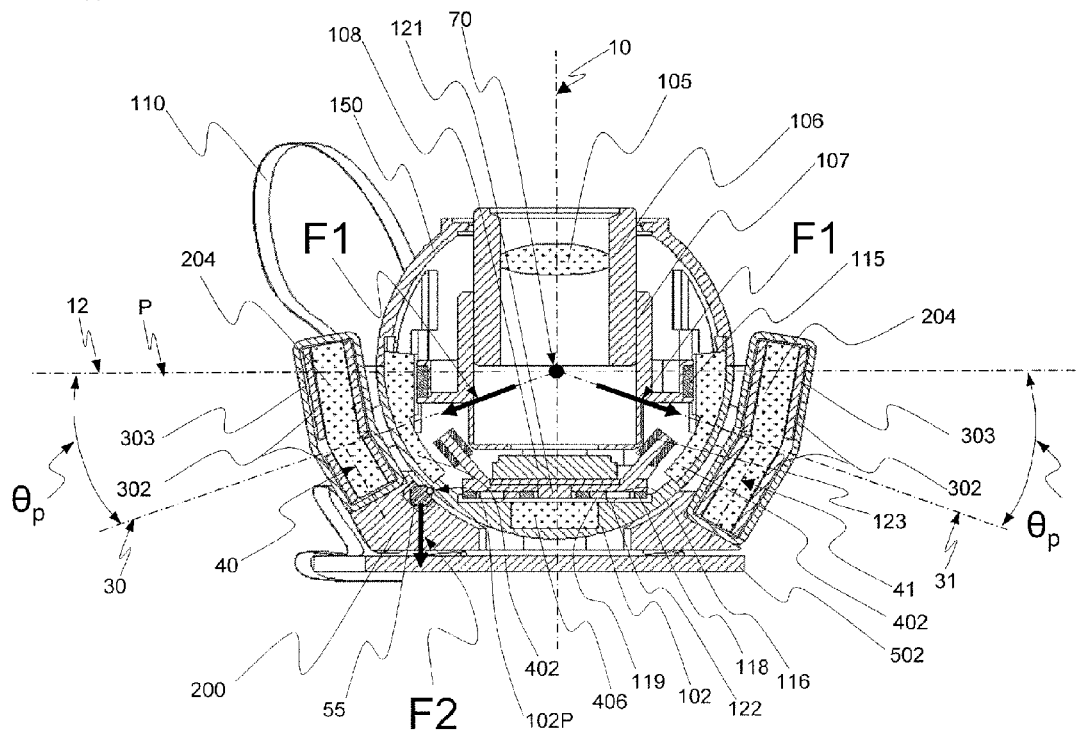

FIG.24A
FIG.24B
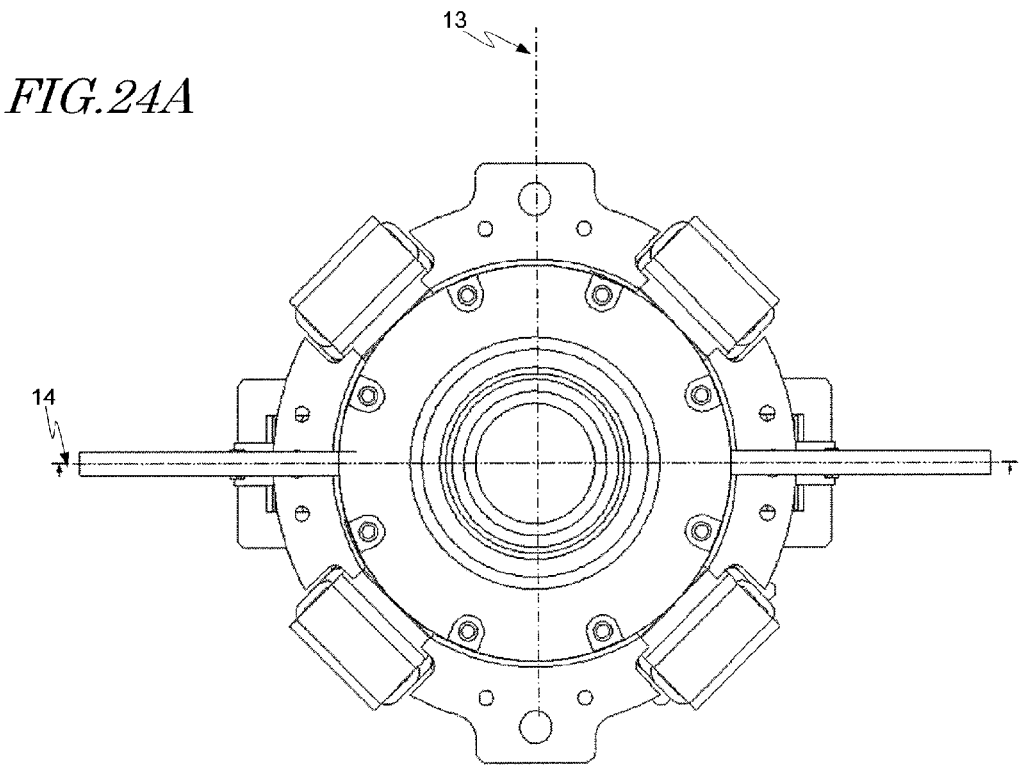
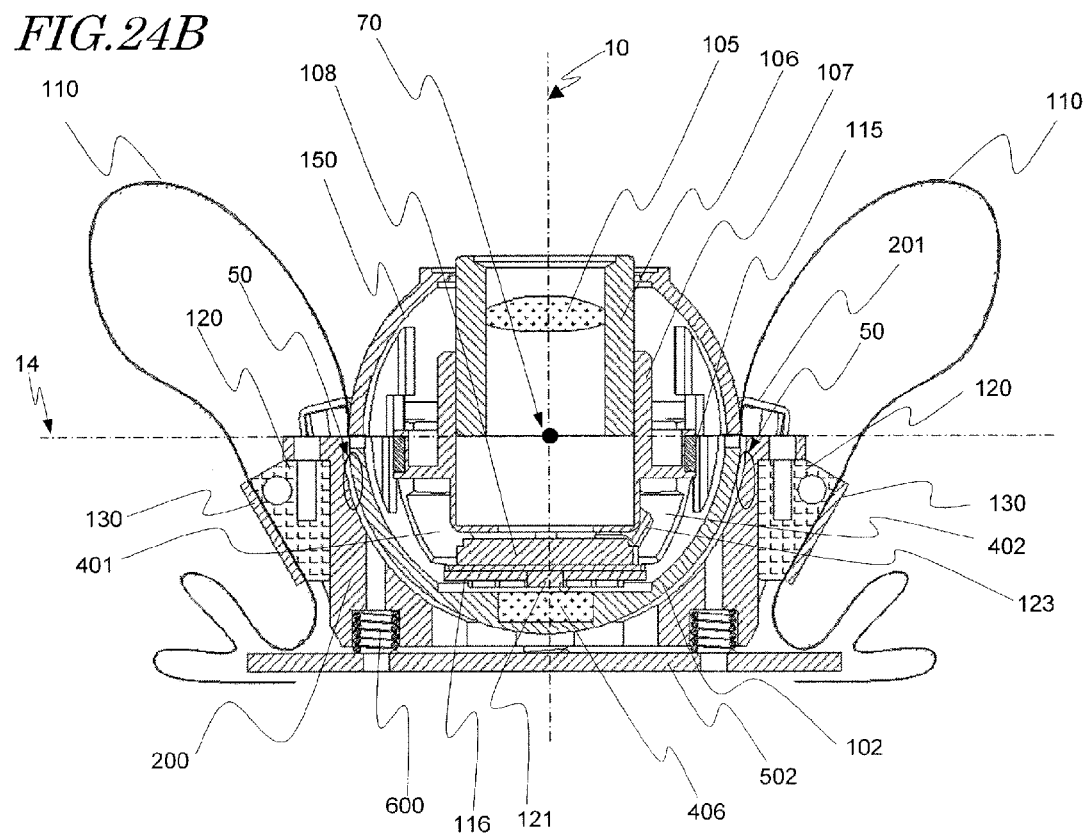

CAMERA DRIVE DEVICE

TECHNICAL FIELD

The present application relates to a camera driving apparatus which includes means for getting a camera section including a lens and an image sensor tilted in the panning (yawing) direction and in the tilting (pitching) direction, rotating (or rolling) the camera section on the optical axis of the lens, and shifting the lens that forms part of the camera section in the optical axis direction, and means for shifting the image sensor that forms part of the camera section two-dimensionally within a plane that intersects with the optical axis at right angles and rotating the image sensor on the optical axis.

BACKGROUND ART

Many of camcorders and digital cameras which have been put on the market recently include a camera shake compensation device which is specially designed to cancel the motion blur of an image shot to be caused by a camera shake. Such a camera shake compensation device gets a lens, a lens barrel, a reflective mirror, an image sensor or any other member of the camera either tilted with respect to the optical axis of the camera or shifted two-dimensionally on a plane which intersects with the optical axis at right angles.

For example, Patent Document No. 1 discloses a camera shake compensation mechanism which is configured to elastically support the lens barrel at one point and get the lens barrel tilted respect to the optical axis. Meanwhile, Patent Document No. 2 discloses a camera shake compensation device which supports the mirror with a pivot structure and gets the mirror tilted with respect to the optical axis. Furthermore, Patent Document No. 3 discloses an imaging lens unit which supports a spherical, lens barrel at three points and gets the lens barrel tilted and shifted along the optical axis.

CITATION LIST

Patent Literature

Patent Document No. 1: Japanese Laid-Open Patent Publication No. 2006-53358
Patent Document No. 2: Japanese Laid-Open Patent Publication No. 11-220651
Patent Document No. 3: Japanese Laid-Open Patent Publication No. 2008-58391

SUMMARY OF INVENTION

Technical Problem

However, these conventional cameras sometimes cannot compensate for the camera shake sufficiently, and are required to control the camera section with a greater degree of freedom.

A non-limiting embodiment of the present disclosure provides a camera driving apparatus which can compensate for a camera shake sufficiently and which can control the camera section with a greater degree of freedom.

Solution to Problem

A camera driving apparatus according to a non-limiting aspect of the present invention includes: a camera section including an image sensor which has an imaging plane, a lens which has an optical axis and which produces a subject image on the imaging plane, and a lens barrel to support the lens; a movable unit which includes at least one attracting magnet, houses the camera section inside, and has a first convex partial sphere on its outer surface; a fixed unit which has a depressed portion in which at least one magnetic body and at least a portion of the movable unit are loosely fit, which brings the first convex partial sphere of the movable unit into a point or line contact with the depressed portion under magnetic attractive force of the at least one attracting magnet to the at least one magnetic body, and which allows the movable unit to rotate freely on the spherical centroid of the first convex partial sphere; a panning driving section which tilts the camera section in a panning direction with respect to the fixed unit; a tilting driving section which tilts the camera section in a tilting direction that intersects with the panning direction at right angles with respect to the fixed unit; a rolling driving section which rotates the camera section in a rolling direction around the optical axis of the lens with respect to the fixed unit; a lens driving section which shifts the lens barrel in the optical axis direction with respect to the movable unit and which is provided for the movable unit; an image sensor driving section which shifts the image sensor with respect to the movable unit in a panning rotation axis direction that defines the axis of rotation in the panning direction and in a tilting rotation axis direction that defines the axis of rotation in the tilting direction; a first detector which detects the tilt angles of the movable unit in the panning and tilting directions with respect to the fixed unit; a second detector which detects the angle of rotation of the movable unit that is rotating in the rolling direction; a third detector which detects the magnitude of shift of the lens barrel in the optical axis direction; and a fourth detector which detects the magnitudes of shift of the image sensor in the panning rotation axis direction and in the tilting rotation axis direction.

Advantageous Effects of Invention

In a camera driving apparatus according to the present disclosure, its movable unit includes: a panning driving section which gets a camera section tilted in a panning direction with respect to a fixed unit; a tilting driving section which tilts the camera section in a tilting direction that intersects with the panning direction at right angles with respect to the fixed unit; a rolling driving section which rotates the camera section in a rolling direction around the optical axis of a lens with respect to the fixed unit; a lens driving section which gets a lens barrel mounting the lens shifted in the optical axis direction with respect to the movable unit; and an image sensor driving section which gets an image sensor shifted two-dimensionally in a plane that intersects with the optical axis direction at right angles with respect to the movable unit. Thus, not only can a three-axis direction shake compensation control be performed on the movable unit but also can the position of the lens in the optical axis direction and the two-dimensional position of the image sensor perpendicular to the optical axis direction be adjusted and controlled.

BRIEF DESCRIPTION OF DRAWINGS

FIG. 6B is a plan view of the camera driving apparatus 165 according to the aspect of the present invention as viewed along a line 13.

FIG. 22A is a top view of a camera driving apparatus 165 according to the second embodiment of the present invention.

FIG. 22B is a cross-sectional view of the camera driving apparatus 165 according to the second embodiment of the present invention as viewed on a plane including the optical axis 10 and a panning direction rotation axis 12.

FIG. 24A is a top view of the camera driving apparatus 165 according to the second embodiment of the present invention.

FIG. 24B is a cross-sectional view of the camera driving apparatus 165 according to the second embodiment of the present invention as viewed on a plane including the optical axis 10 and a line 14.

DESCRIPTION OF EMBODIMENTS

Figure 1:
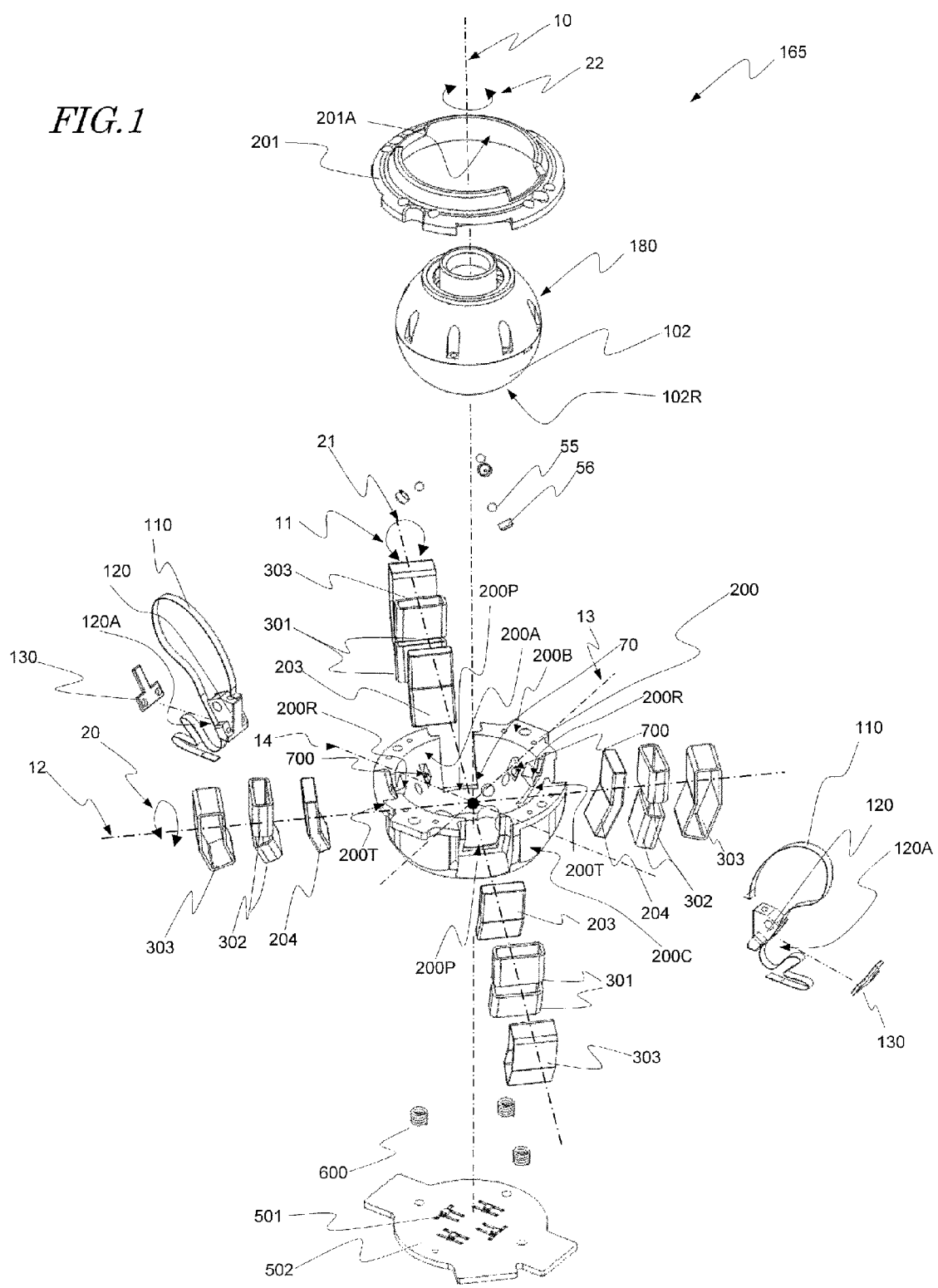
FIG. 1 is an exploded perspective view illustrating a general configuration for a camera driving apparatus 165 according to an aspect of the present invention.

The present inventors checked out closely conventional cameras with the ability to compensate for a camera shake. It is generally said that when a person who is standing still is shooting, the angle of a camera shake to be produced is approximately ±0.3 degrees and its generation frequency components are approximately 20 to 30 Hz. It is also said that the camera shake needs to be compensated for in a frequency range of around 10 Hz.

As can be seen, if a person who is standing still is shooting with a camcorder or a digital camera, the angle of the camera shake involved is relatively small and the frequency for control is relatively low. That is why even though respective members (including a lens, a lens barrel, a reflective mirror and an image sensor) that form a conventional camera driving apparatus which is designed to compensate for the motion blur to be caused to an image shot due to a camera shake while the shooter is standing still are tilted at a very small angle with respect to the optical axis of the lens and linearly shifted two-dimensionally by only a short distance within a plane that intersects with the optical axis at right angles, the conventional camera driving apparatus can still compensate for the camera shake well enough.

However, it is said that if a person is shooting a movie or a still picture while walking, the motion blur to be caused to an image shot in such a situation (which will be referred to herein as a "walking blur" that includes an ordinary motion blur caused by the user's hand tremors) will have an angle of ±10 degrees or more. And it is said that to compensate for the walking blur, the control should be performed within a frequency range of approximately 50 Hz.

If the motion blur of the image has such a large angle and if the control needs to be performed at such a high frequency, the conventional camera driving apparatus's supporting system to support its members and its driving system to drive those members will have a problem.

For example, the driver disclosed in Patent Document No. 1 is suitable to getting a lens barrel tilted at a very small angle. However, if the driver was used to get the lens barrel tilted at as large an angle as more than ±10 degrees, then the elastic body supported would be deformed to the plastic range. Also, if the angle of the tilt should be increased so much, the load due to the spring constant of the elastic body would be a huge one and the index (Q value) of the amplitude augmentation of the elastic body's natural vibration would increase significantly, too. As a result, the phase and gain characteristics of the compensation and control would deteriorate too much to get the compensation and control done easily in the frequency range described above.

The driver of Patent Document No. 2 drives the reflective mirror to compensate for the motion blur of the image. However, in a situation where the camcorder or digital camera has a wide angle lens system, if such a reflective mirror was provided for the optical system, the reflective mirror would be a bulky member of the optical system. For that reason, it cannot be said that the reflective mirror is an ideal solution for a camcorder or digital camera that should have as small a size as possible. In addition, since the mirror is pivoted with magnetic attractive force, the mirror could fall off under some disturbance such as vibration or impact.

The lens unit of Patent Document No. 3 includes a spherical lens holder, and therefore, can get the lens holder tilted at a large angle. However, since a region where the lens holder and another holder provided outside of the lens holder contact with each other has a large radius of rotation, the frictional load on the movable unit increases and the movable unit needs to go a longer working distance. As a result, the larger the tilt angle, the more significantly the contact frictional load would vary and the more difficult it would be to get the control done as intended. Also, unless the interval between the lens holder and the outer holder is controlled precisely, it will be difficult to control accurately the tilt angle of the lens holder. Depending on the machining accuracy of these parts, mechanical backlash could be produced to possibly affect the frequency response characteristic of the movable unit.

Furthermore, none of the drivers of Patent Document Nos. 1 to 3 have a structure for rotating a member such as the lens on the optical axis of the camera section. Thus, it is difficult for them to control a large angle of rotation highly accurately around the optical axis of the camera section.

Thus, in order to overcome these problems with the related art by making a camera section rotatable in three axis directions and adding new functions that no conventional drivers have ever had, a first embodiment of the present invention provides a camera driving apparatus which can move in six axis directions in total by using means for shifting a lens that forms part of the camera section in an optical axis direction, and means for shifting an image sensor that forms part of the camera section in two axis directions within a plane that intersects with the optical axis direction at right angles.

Meanwhile, in order to overcome these problems with the related art by making a camera section rotatable in three axis directions and adding new functions that no conventional drivers have ever had, a second embodiment of the present invention provides a camera driving apparatus which can move in seven axis directions in total by using means for shifting a lens that forms part of the camera section in an optical axis direction, means for shifting an image sensor that forms part of the camera section in two axis directions within a plane that intersects with the optical axis direction at right angles, and means for rotating the image sensor on the optical axis.

A camera driving apparatus according to an aspect of the present invention includes: a camera section including an image sensor which has an imaging plane, a lens which has an optical axis and which produces a subject image on the imaging plane, and a lens barrel to support the lens; a movable unit which includes at least one attracting magnet, houses the camera section inside, and has a first convex partial sphere on its outer surface; a fixed unit which has a depressed portion in which at least one magnetic body and at least a portion of the movable unit are loosely fit, which brings the first convex partial sphere of the movable unit into a point or line contact with the depressed portion under magnetic attractive force of the at least one attracting magnet to the at least one magnetic body, and which allows the movable unit to rotate freely on the spherical centroid of the first convex partial sphere; a panning driving section which tilts the camera section in a panning direction with respect to the fixed unit; a tilting driving section which tilts the camera section in a tilting direction that intersects with the panning direction at right angles with respect to the fixed unit; a rolling driving section which rotates the camera section in a rolling direction around the optical axis of the lens with respect to the fixed unit; a lens driving section which shifts the lens barrel in the optical axis direction with respect to the movable unit and which is provided for the movable unit; an image sensor driving section which shifts the image sensor with respect to the movable unit in a panning rotation axis direction that defines the axis of rotation in the panning direction and in a tilting rotation axis direction that defines the axis of rotation in the tilting direction and which is provided for the movable unit; a first detector which detects the tilt angles of the movable unit in the panning and tilting directions with respect to the fixed unit; a second detector which detects the angle of rotation of the movable unit that is rotating in the rolling direction; a third detector which detects the magnitude of shift of the lens barrel in the optical axis direction; and a fourth detector which detects the magnitudes of shift of the image sensor in the panning rotation axis direction and in the tilting rotation axis direction.

A camera driving apparatus according to an embodiment includes: a camera section including an image sensor which has an imaging plane, a lens which has an optical axis and which produces a subject image on the imaging plane, and a lens barrel to support the lens; a movable unit which includes at least one attracting magnet, houses the camera section inside, and has a first convex partial sphere on its outer surface; a fixed unit which has a depressed portion in which at least one magnetic body and at least a portion of the movable unit are loosely fit, which brings the first convex partial sphere of the movable unit into a point or line contact with the depressed portion under magnetic attractive force of the at least one attracting magnet to the at least one magnetic body, and which allows the movable unit to rotate freely on the spherical centroid of the first convex partial sphere; a panning driving section which tilts the camera section in a panning direction with respect to the fixed unit; a tilting driving section which tilts the camera section in a tilting direction that intersects with the panning direction at right angles with respect to the fixed unit; a rolling driving section which rotates the camera section in a rolling direction around the optical axis of the lens with respect to the fixed unit; a lens driving section which shifts the lens barrel in the optical axis direction with respect to the movable unit and which is provided for the movable unit; an image sensor driving section which shifts the image sensor with respect to the movable unit in a panning rotation axis direction that defines the axis of rotation in the panning direction and in a tilting rotation axis direction that defines the axis of rotation in the tilting direction and rotates the image sensor in the rolling direction and which is provided for the movable unit; a first detector which detects the tilt angles of the movable unit in the panning and tilting directions with respect to the fixed unit; a second detector which detects the angle of rotation of the movable unit that is rotating in the rolling direction; a third detector which detects the magnitude of shift of the lens barrel in the optical axis direction; and a fourth detector which detects the magnitudes of shift of the image sensor in the panning rotation axis direction and in the tilting rotation axis direction.

In one embodiment, the fixed unit has at least three second convex partial spheres inside its depressed portion, and the second convex partial spheres make a point contact with the first convex partial sphere of the movable unit.

In one embodiment, the fixed unit has a concave conical surface defining the inner side surface of the depressed portion and the concave conical surface and the first convex partial sphere of the movable unit make a line contact with each other.

In one embodiment, the camera driving apparatus further includes a stopper member which is provided for the fixed unit and which has a regulating surface that regulates the movement of the movable unit so as to prevent the movable unit from falling off the fixed unit. The regulating surface has a concave partial sphere, of which the centroid agrees with the spherical centroid of the first convex partial sphere.

In one embodiment, the panning driving section includes a pair of panning drive magnets which is arranged symmetrically with respect to the optical axis in the movable unit, a pair of panning magnetic yokes which is arranged in the fixed unit so as to face the pair of panning drive magnets, and a pair of panning drive coils which is wound around the pair of panning magnetic yokes. The tilting driving section includes a pair of tilting drive magnets which is arranged symmetrically with respect to the optical axis in the movable unit, a pair of tilting magnetic yokes which is arranged in the fixed unit so as to face the pair of tilting drive magnets, and a pair of tilting drive coils which is wound around the pair of tilting magnetic yokes. The pair of panning drive magnets and the pair of panning drive coils are arranged on a line which passes through the spherical centroid of the first convex partial sphere. The pair of tilting drive magnets and the pair of tilting drive coils are arranged on another line which also passes through the spherical centroid of the first convex partial sphere. And the center of the movable unit in the optical axis direction substantially agrees with the spherical centroid of the first convex partial sphere.

In one embodiment, the rolling driving section includes four rolling drive coils which are wound around the pair of panning magnetic yokes and the pair of tilting magnetic yokes, respectively, and uses the pair of panning drive magnets and the pair of tilting drive magnets as rolling drive magnets.

In one embodiment, the at least one magnetic body includes the pair of panning magnetic yokes and the pair of tilting magnetic yokes.

In one embodiment, the attracting magnet includes the pair of panning drive magnets and the pair of tilting drive magnets.

In one embodiment, lines which intersect at right angles with the respective winding center axes of the pair of panning drive coils and the pair of tilting drive coils and which pass through the spherical centroid of the first convex partial sphere and the drive coils define a tilt angle A of 45 degrees or less with respect to a horizontal plane which intersects with the optical axis at right angles and which passes through the spherical centroid of the first convex partial sphere, and the pair of panning drive magnets and the pair of tilting drive magnets are arranged tilted with respect to the movable unit so as to face the pair of panning drive coils and the pair of tilting drive coils, respectively.

In one embodiment, lines which intersect at right angles with the respective winding center axes of the pair of rolling drive coils and which pass through the spherical centroid of the first convex partial sphere define a tilt angle B of 45 degrees or less with respect to a horizontal plane which intersects with the optical axis at right angles and which passes through the spherical centroid of the first convex partial sphere and the respective centers of the rolling drive coils, the rolling driving section includes a pair of rolling drive magnets, which is arranged tilted with respect to the movable unit so as to face the rolling drive coils.

In one embodiment, the tilt angles A and B are 20 degrees.

In one embodiment, lines which connect the respective spherical centroids of the second convex partial spheres to the spherical centroid of the first convex partial sphere define a tilt angle C of 45 degrees with respect to a horizontal plane which intersects with the optical axis at right angles and which passes through the spherical centroid of the first convex partial sphere.

In one embodiment, the pair of panning drive magnets, the pair of tilting drive magnets and the pair of rolling drive magnets are located inside the movable unit and not exposed on the first convex partial sphere.

In one embodiment, the pair of panning drive coils, the pair of tilting drive coils and the rolling drive coils are arranged inside the fixed unit and not exposed inside the depressed portion.

In one embodiment, the movable unit is made of a resin material.

In one embodiment, the movable unit has been formed together with the pair of panning drive magnets, the pair of tilting drive magnets and the pair of rolling drive magnets.

In one embodiment, the fixed unit is made of a resin material.

In one embodiment, the fixed unit has been formed together with the pair of panning drive coils, the pair of tilting drive coils, the rolling drive coils, the pair of panning magnetic yokes, the pair of tilting magnetic yokes and the pair of rolling magnetic yokes.

In one embodiment, the first detector includes a first magnetic sensor which is fixed to the fixed unit and a tilt detecting magnet which is provided for the movable unit. The first magnetic sensor senses a variation in magnetic force due to a tilt of the tilt detecting magnet and calculates two-dimensional tilt angles of the camera section in the panning and tilting directions.

In one embodiment, the first magnetic sensor and the tilt detecting magnet are located on the optical axis.

In one embodiment, the first detector includes a photosensor which is fixed to the fixed unit and a photosensing pattern which is arranged on a portion of the first convex partial sphere of the movable unit. The photosensor senses a variation in light that has been incident on the photosensor due to a tilt of the photosensing pattern and calculates two-dimensional tilt angles of the camera section in the panning and tilting directions.

In one embodiment, the lens driving section includes: the lens barrel which shifts in the optical axis direction with respect to a plurality of guide portions that are provided parallel to the optical axis for the movable unit and which supports the lens; an optical axis direction drive coil which is provided for the lens barrel; and an optical axis direction drive magnet which is provided for the movable unit so as to face the optical axis direction drive coil.

In one embodiment, the optical axis direction drive magnet includes the pair of panning drive magnets and the pair of tilting drive magnets.

In one embodiment, the winding center axis of the optical axis direction drive coil agrees with the optical axis.

In one embodiment, the guide portions are guide bars which are fixed to the movable unit and which run parallel to the optical axis.

In one embodiment, the image sensor driving section includes: an image sensor holder portion which holds the image sensor; supporting means for supporting the image sensor holder portion so that the image sensor holder portion is movable with respect to the movable unit within a plane that intersects with the optical axis at right angles; an image sensor drive coil which has a winding center axis that is parallel to the optical axis and which is fixed to the image sensor holder portion; and an image sensor drive magnet which is fixed to the movable unit so as to face the image sensor drive coil.

In one embodiment, the image sensor driving section includes: an image sensor holder portion which holds the image sensor; supporting means for supporting the image sensor holder portion so that the image sensor holder portion is movable with respect to the movable unit within a plane that intersects with the optical axis at right angles; a first image sensor drive coil which has a winding center axis that is parallel to the optical axis and which is fixed to the image sensor holder portion; a first image sensor drive magnet which is fixed to the movable unit so as to face the first image sensor drive coil; a second image sensor drive coil which has a winding center axis that is tilted with respect to the optical axis and which is fixed to the image sensor holder portion; and a second image sensor drive magnet which is fixed to the movable unit so as to face the second image sensor drive coil.

In one embodiment, the image sensor drive magnet is the tilt detecting magnet.

In one embodiment, the first image sensor drive magnet is the tilt detecting magnet.

In one embodiment, the second image sensor drive magnet is either the panning drive magnet or the tilting drive magnet.

In one embodiment, the supporting means includes: a first plane portion which is provided for the image sensor holder portion and which has a plane that intersects with the optical axis at right angles; a second plane portion which is provided for the movable unit and which has a plane that intersects with the optical axis at right angles; and at least three supporting balls which are held between the first and second plane portions.

In one embodiment, the image sensor holder portion includes a magnetic body and grips the supporting balls with magnetic attractive force between the magnetic body and the image sensor drive magnet.

In one embodiment, the image sensor holder portion includes a magnetic body and grips the supporting balls with magnetic attractive force between the magnetic body and the first image sensor drive magnet.

In one embodiment, the center of mass of the movable unit agrees with the spherical centroid of the first convex partial sphere.

In one embodiment, the camera driving apparatus further includes cables which are connected to the camera section and which are implemented as flexible cables. The cables are arranged line-symmetrically with respect to the optical axis and are fixed to the movable unit in a direction which defines an angle of 45 degrees with respect to either a line that connects the pair of tilting drive magnets together or a line that connects the pair of panning drive magnets together on a plane which intersects with the optical axis at right angles.

In one embodiment, the second detector includes a second magnetic sensor which is fixed to the fixed unit and a rotation detecting magnet which is provided for the movable unit. The second magnetic sensor senses a variation in magnetic force due to a rotation of the rotation detecting magnet and calculates the angle of rotation of the movable unit in the rolling direction.

In one embodiment, the third detector includes a third magnetic sensor which is fixed to the movable unit and a first shift detecting magnet which is provided for the lens barrel. The third magnetic sensor senses a variation in magnetic force due to a shift of the first shift detecting magnet and calculates the magnitude of shift of the lens barrel in the optical axis direction.

In one embodiment, the fourth detector includes a fourth magnetic sensor which is fixed to the image sensor holder portion and a second shift detecting magnet which is provided for the movable unit. The fourth magnetic sensor senses a variation in magnetic force due to a shift of the image sensor holder portion and calculates the magnitudes of shift of the image sensor driving section in the panning rotation axis direction and in the tilting rotation axis direction.

In one embodiment, the rotation detecting magnet is either the panning drive magnet or the tilting drive magnet.

In one embodiment, the second shift detecting magnet is the tilt detecting magnet.

In one embodiment, a gap is left between the regulating surface of the stopper member and the first convex partial sphere of the movable unit and has been determined so that even if the first convex partial sphere of the movable unit has fallen off the depressed portion of the fixed unit, the first convex partial sphere and the depressed portion recover their point or line contact with magnetic attractive force.

A camera unit according to an aspect of the present invention includes: a camera driving apparatus according to any of the embodiments described above; an angular velocity sensor which senses angular velocities of the fixed unit around three orthogonal axes; an arithmetic processing section which generates target rotation angle signals based on the outputs of the angular velocity sensor; and a driver circuit which generates signals to drive the first and second driving sections based on the target rotation angle signals.

In a camera driving apparatus according to an aspect of the present disclosure, its movable unit includes: a panning driving section which gets a camera section tilted in a panning direction with respect to a fixed unit; a tilting driving section which tilts the camera section in a tilting direction that intersects with the panning direction at right angles with respect to the fixed unit; a rolling driving section which rotates the camera section in a rolling direction around the optical axis of a lens with respect to the fixed unit; a lens driving section which gets a lens barrel mounting the lens shifted in the optical axis direction with respect to the movable unit and which is provided for the movable unit; and an image sensor driving section which gets an image sensor shifted two-dimensionally in a plane that intersects with the optical axis direction at right angles with respect to the movable unit. Thus, not only can a three-axis direction shake compensation control be performed on the movable unit but also can the position of the lens in the optical axis direction and the two-dimensional position of the image sensor perpendicular to the optical axis direction be adjusted and controlled as well.

As a result, a focus control, a nodal point correction of the camera, and measurement of the distance to the subject based on a variation in motion blur can all get done. Consequently, the camera shake compensation in the translational direction, which has been difficult to get done according to the rotational drive shake compensation method, can get done on a pixel-by-pixel basis by driving and shifting the image sensor two-dimensionally.

In another embodiment, the movable unit includes: a panning driving section which gets a camera section tilted in a panning direction with respect to a fixed unit; a tilting driving section which tilts the camera section in a tilting direction that intersects with the panning direction at right angles with respect to the fixed unit; a rolling driving section which rotates the camera section in a rolling direction around the optical axis of a lens with respect to the fixed unit; a lens driving section which gets a lens barrel mounting the lens shifted in the optical axis direction with respect to the movable unit and which is provided for the movable unit; and an image sensor driving section which gets an image sensor shifted two-dimensionally in a plane that intersects with the optical axis direction at right angles with respect to the movable unit and also gets the image sensor rotated around the optical axis. Thus, not only can a three-axis direction shake compensation control be performed on the camera section but also can the position of the lens in the optical axis direction, the two-dimensional position of the image sensor perpendicular to the optical axis direction and its angle of rotation around the optical axis be adjusted and controlled as well.

As a result, a focus control, a nodal point correction of the camera, and measurement of the distance to the subject based on a variation in motion blur can all get done. Consequently, the camera shake compensation in the translational direction, which has been difficult to get done according to the rotational drive shake compensation method, can get done on a pixel-by-pixel basis by driving the image sensor.

Also, the camera driving apparatus further includes a movable unit which includes an attracting magnet and a first convex partial sphere, and a fixed unit which has a depressed portion in which a magnetic body and at least a portion of the movable unit are loosely fit and which brings the movable unit into a point or line contact under magnetic attractive force of the attracting magnet to the magnetic body. Thus, the movable unit can rotate freely on the spherical centroid of the first convex partial sphere with respect to the fixed unit.

In addition, since the first convex partial sphere can be kept inscribed to the depressed portion under the magnetic attractive force, the load due to the contact can be kept constant irrespective of the rotation state of the movable unit.

Furthermore, since the movable unit can be supported at its center of mass by a pivoting structure which gets the convex partial sphere fit into the depressed portion, mechanical resonance can be reduced significantly in the control frequency range.

On top of that, according to an embodiment, the following effects can also be achieved. Specifically, by providing a stopper member, even when subjected to external impact, the movable unit will not fallen off but can recover the state where the convex partial sphere is in contact with the depressed portion.

In addition, by getting constant normal force applied as magnetic attractive force that does not affect the angle of rotation to a pivoting structure in which the convex partial sphere of the movable unit is inscribed to the concave conical surface of the fixed unit, the variation in frictional load with the angle of rotation can be reduced and good phase and gain characteristics are realized in the control frequency range.

Besides, by providing an anti-fall regulating surface for the stopper member to be fixed to the fixed unit, the movable unit can get assembled into the fixed unit more easily. As a result, the assembling work can get done much more efficiently.

Furthermore, the panning and tilting direction driving sections include two pairs of drive magnets which are fixed to the movable unit and arranged so as to intersect with each other at right angles along the circumference of a circle, of which the center is the optical axis, and two pairs of drive coils which are provided for the fixed unit so as to face the drive magnets.

Meanwhile, the rolling direction driving section includes a pair of drive magnets which is fixed to the movable unit and arranged along the circumference of a circle, of which the center is the optical axis, and a pair of drive coils which is provided for the fixed unit so as to face the drive magnets.

Furthermore, by filling a substantially ringlike gap to be left between the convex partial sphere of the movable unit and the anti-fall regulating surface of the fixed unit with a vibration damping viscous member or a magnetic fluid, the index (Q value) of the amplitude augmentation of the variation or the Q value of the mechanical natural vibration to be produced between the drive magnets of the movable unit and the magnetic yokes of the fixed unit due to the magnetic spring effect of the magnetic attractive force can be reduced. As a result, good controllability can be achieved.

Moreover, the tilt detecting means of the movable unit is comprised of a tilt detecting magnet which is arranged along the optical axis at the bottom of the movable unit and a first magnetic sensor which is provided for the fixed unit so as to face the tilt detecting magnet. By sensing a variation in the magnetic force of the tilt detecting magnet due to a tilt of the movable unit and calculating the tilt angle using that tilt detecting means, the size of the driver can be cut down.

What is more, by arranging a rotation detecting means so that the rotation detecting means defines an angle of degrees with respect to the panning and tilting driving sections as viewed in the optical axis direction and by arranging a plurality of driving sections along the circumference of a circle, of which the center is defined at the optical axis, the moment of the driving force can be increased. And by arranging the rotation detecting means along the circumference of the same circle, the space that should be left for the driver can be saved.

Furthermore, if the rolling driving section uses the panning and tilting drive magnets as rolling drive magnets, too, and if the rolling drive coils have a crossed winding structure in which the rolling drive coils are wound around the panning and tilting magnetic yokes perpendicularly to the direction in which the coils are wound around the panning and tilting drive coils, the space that should be left for the driver, the size of the driver, and the number of parts that make up the driver can all be reduced.

Furthermore, if the lens driving section uses the panning and tilting drive magnets as optical axis direction drive magnets, too, the space that should be left for the driver, the size of the driver, and the number of parts that make up the driver can all be reduced.

Furthermore, if the image sensor driving section uses the tilt detecting magnet that is built in the movable unit as an image sensor drive magnet to be driven two-dimensionally on a plane which intersects with the optical axis at right angles, too, the space that should be left for the driver, the size of the driver, and the number of parts that make up the driver can all be reduced.

Furthermore, the image sensor driving section can use the tilt detecting magnet that is built in the movable unit as a first image sensor drive magnet to be driven two-dimensionally on a plane which intersects with the optical axis at right angles, and can use the panning drive magnets and the tilting drive magnets as second image sensor drive magnets to be rotated and driven around the optical axis. As a result, the space that should be left for the driver, the size of the driver, and the number of parts that make up the driver can all be reduced.

In addition, if the panning, tilting and rolling drive coils to be fixed to the fixed unit and the panning, tilting and rolling drive magnets to be provided for the movable unit so as to face those coils are arranged to be located under, and define a tilt angle of 30 to 45 degrees with respect to, a horizontal plane that intersects with the optical axis at right angles and that includes the spherical centroid of the convex partial sphere of the movable unit, the height of the driver can be lowered.

Since the magnetic attractive force to be produced between the movable unit and the fixed unit can be obtained so as to be dispersed between a plurality of drive magnets and a plurality of magnetic yokes in the panning, tilting and rolling driving sections, the frictional resistance due to the normal force between the movable and fixed units can be kept a constant value which does not depend on the angle of rotation.

On top of that, the panning, tilting and rolling drive magnets are housed in the movable unit and are not exposed on the convex partial sphere of the movable unit which is in contact with the concave conical surface of the fixed unit. Thus, the coefficient of friction between the movable and fixed units can be reduced.

Optionally, if the concave conical surface of the fixed unit and the convex partial sphere of the movable unit are made of a plastic resin with good sliding ability, the coefficient of friction between the movable and fixed units can be further reduced.

Furthermore, if at least three supporting balls are interposed between the concave conical surface of the fixed unit and the convex partial sphere of the movable unit, the coefficient of friction between the movable and fixed units can be further reduced.

In addition, if the panning, tilting and rolling driving sections are arranged to be located under, and define a tilt angle of 30 degrees with respect to, a horizontal plane that intersects with the optical axis at right angles and that includes the spherical centroid of the convex partial sphere of the movable unit and if the supporting balls are arranged so as to be located under, and define a tilt angle of 45 degrees with respect to, that horizontal plane, the coefficient of friction between the movable and fixed units can be reduced with the height of the driver lowered.

Added to that, if the fixed unit is made of a plastic resin, the entire fixed unit, including the panning, tilting and rolling drive coils and panning, tilting and rolling magnetic yokes that form the fixed unit, can be formed altogether. As a result, the driver can be manufactured at a lower cost.

Furthermore, if the movable unit is made of a plastic resin, the entire movable unit, including the panning, tilting and rolling drive magnets, rotation detecting magnet and tilt detecting magnet that form the movable unit, can be formed altogether. As a result, the driver can be manufactured at a lower cost.

Optionally, if the concave conical surface of the fixed unit and the convex partial sphere of the movable unit are made of a plastic resin with good sliding ability, the coefficient of friction between the movable and fixed units can be further reduced.

Furthermore, the tilt detecting section of the movable unit gets a shift detected by a photosensor which is fixed to the fixed unit based on a tilt of a design/pattern which has been printed on a portion of the convex partial sphere of the movable unit, and calculates the two-dimensional tilt angles in the panning and tilting directions. As a result, the driver can be manufactured at a lower cost.

As can be seen, according to the present invention, by supporting and driving the movable unit at its center of mass with respect to the fixed unit, the mechanical resonance can be reduced significantly in the control frequency range.

In addition, by adopting a movable unit driving and supporting system which can drive the movable unit at a tilt angle of as large as ±10 degrees or more in the panning and tilting directions and which can rotate and drive the movable unit in the rolling direction, the camera shake compensation control can be carried out in a broad frequency range to about 50 Hz. Furthermore, if the movable unit includes a driving means which shifts the lens in the optical axis direction, another driving means which shifts the image sensor two-dimensionally in a plane that intersects with the optical axis at right angles, and still another driving means which rotates the image sensor around the optical axis, the motion blur of the image produced by hand tremors of the shooter who is walking can be compensated for in three axis directions. As a result, the present invention provides a compact and robust seven-axis compensating camera driving apparatus which can not only perform a focus control and a nodal point correction of the camera and measurement of the distance to the subject, which have never been done by any conventional camera driving apparatus, but also perform, on an image sensor's pixel basis, a camera shake compensation and a rotation correction in the translational direction.

Embodiment 1

Hereinafter, a first embodiment of a camera driving apparatus according to the present invention will be described.

FIG. 1 is an exploded perspective view illustrating a camera driving apparatus 165 as a first embodiment of the present invention.

Figure 2:
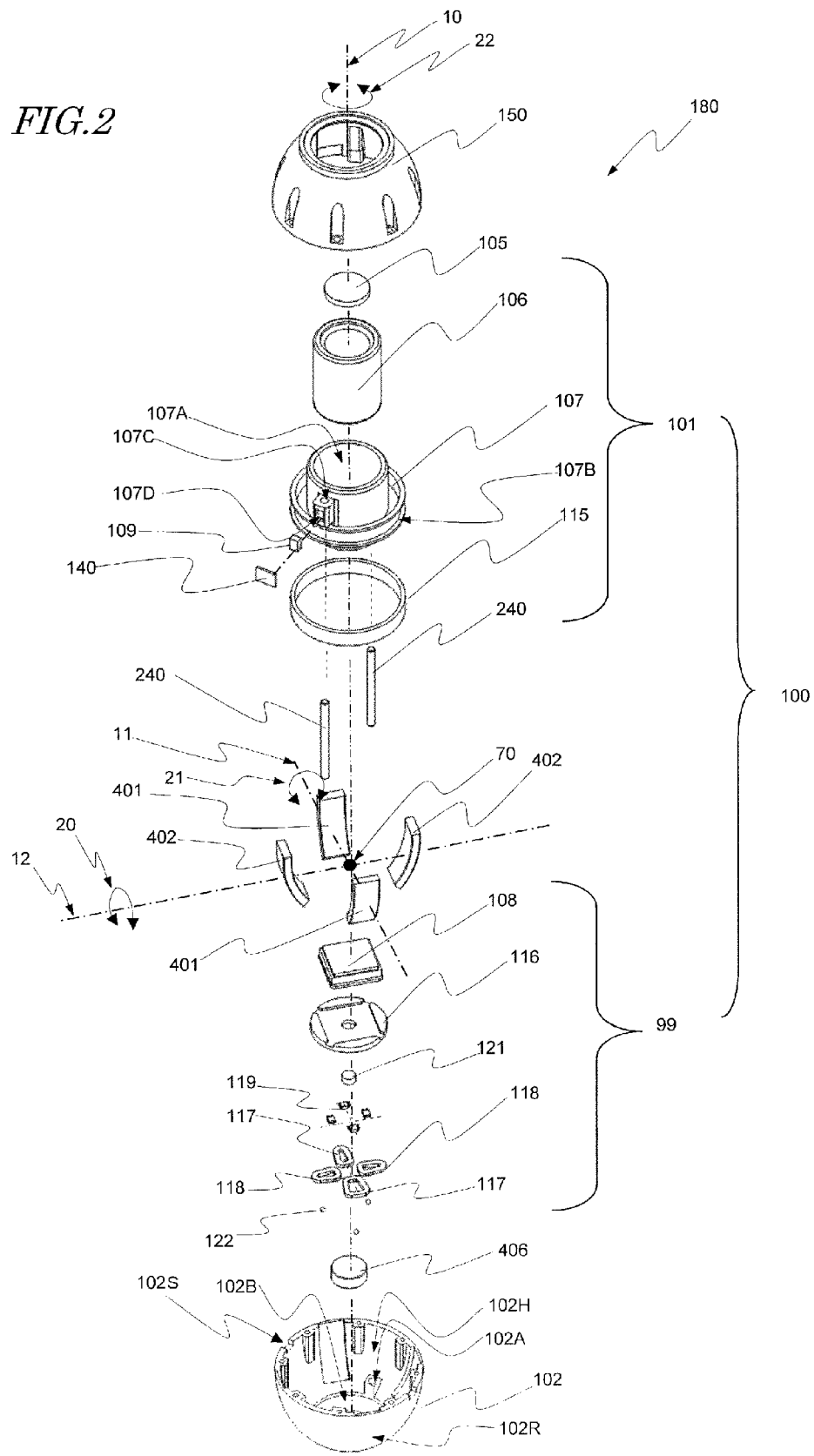
FIG. 2 is an exploded perspective view illustrating a detailed configuration for a movable unit 180 according to a first embodiment of the present invention.

FIG. 2 is an exploded perspective view illustrating a detailed configuration for a movable unit 180 according to the first embodiment of the present invention.

Figure 3A:
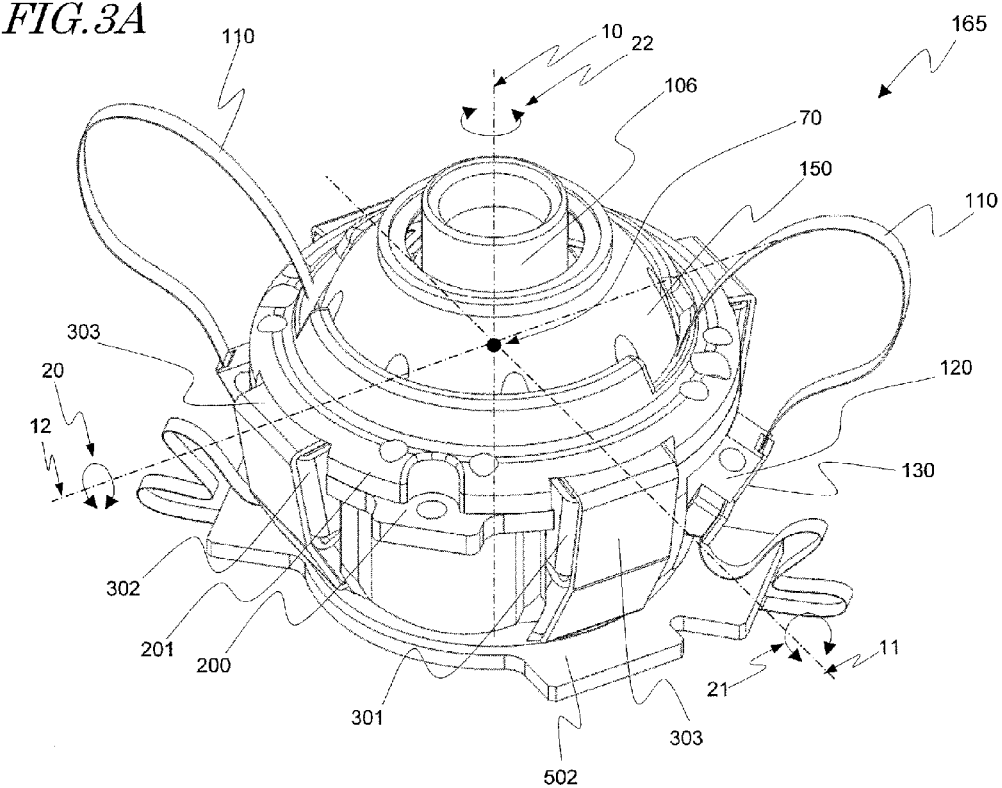
FIG. 3A is a perspective view of the camera driving apparatus 165 according to the aspect of the present invention as viewed from above the driver 165.
Figure 4A:
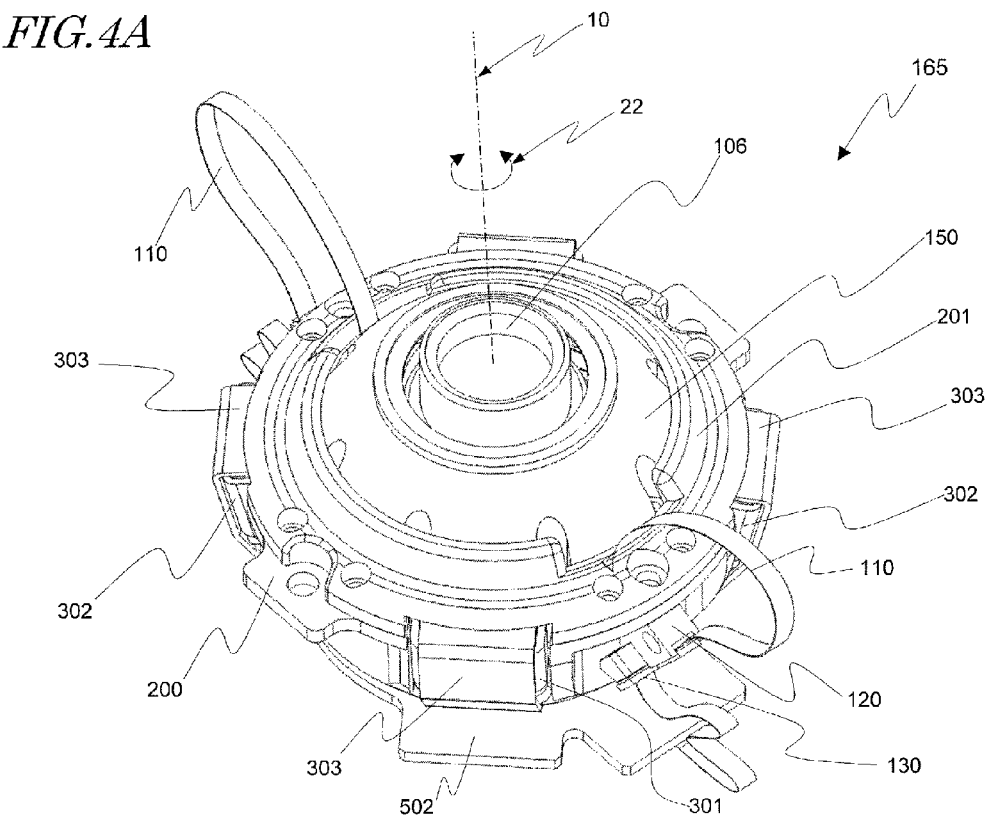
FIG. 4A is a perspective view of the camera driving apparatus 165 according to the aspect of the present invention as viewed from a different angle from above the driver 165.

FIGS. 3A and 4A are perspective views of the camera driving apparatus 165 as viewed from obliquely above the driver 165.

Figure 3B:
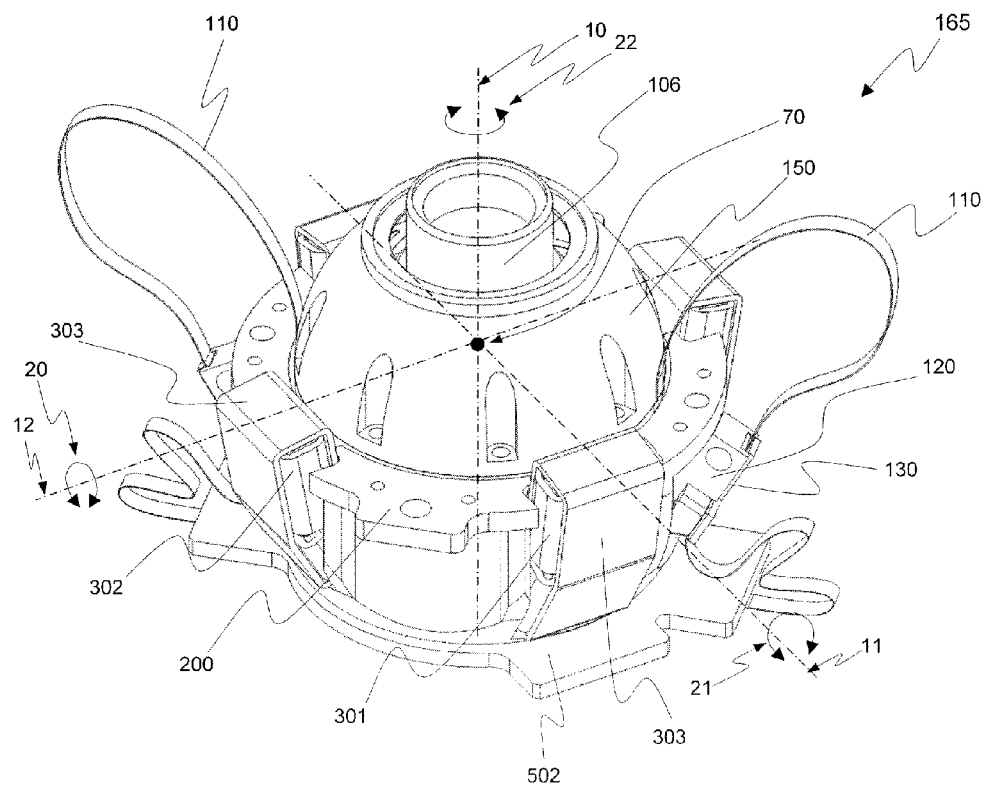
FIG. 3B is a perspective view of the camera driving apparatus 165 according to the aspect of the present invention as viewed from above the driver 165 with its stopper member 201 removed.
Figure 4B:
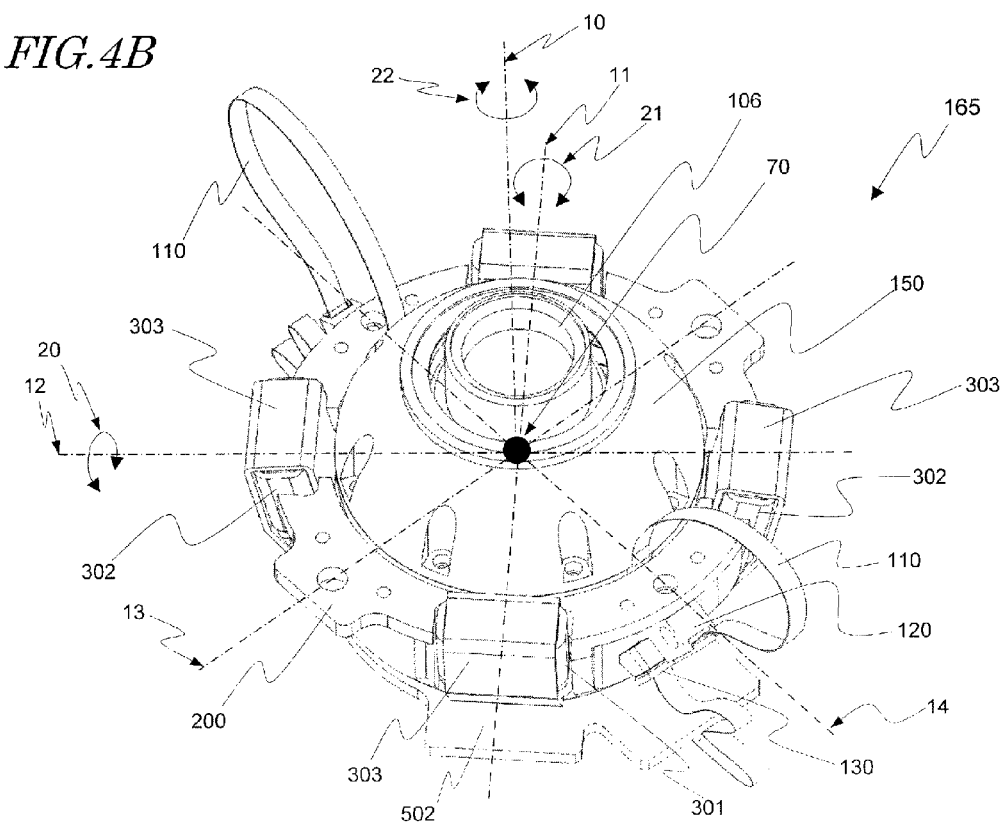
FIG. 4B is a perspective view of the camera driving apparatus 165 according to the aspect of the present invention as viewed from a different angle from above the driver 165 with its stopper member 201 removed.

FIGS. 3B and 4B are perspective views of the camera driving apparatus 165 as viewed from obliquely above the driver 165 with its stopper member 201 removed.

Figure 5:
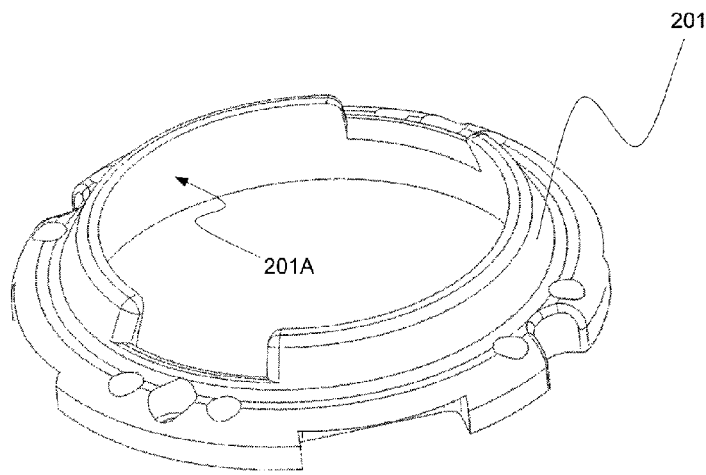
FIG. 5 is a perspective view of the stopper member 201 as viewed from above the camera driving apparatus 165 according to the aspect of the present invention.

FIG. 5 is a perspective view of the stopper member 201 as viewed from obliquely above the member 201.

Figure 6A:
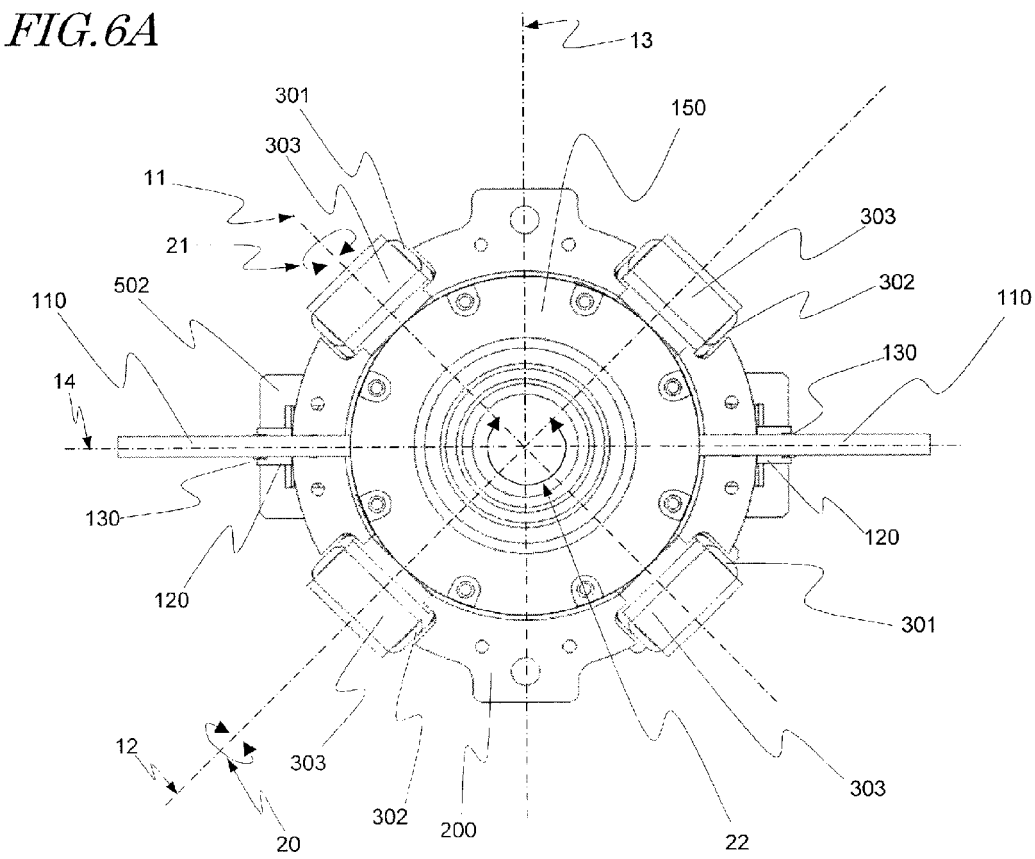
FIG. 6A is a plan view of the camera driving apparatus 165 according to the aspect of the present invention as viewed along the optical axis 10 of a lens 105 to be built in a camera section 100.

FIG. 6A is a plan view of the camera driving apparatus 165 as viewed along the optical axis 10 of a lens 105 to be built in a lens driving section.

FIG. 6B is a plan view of the camera driving apparatus 165 as viewed along a line 13.

Figure 7:
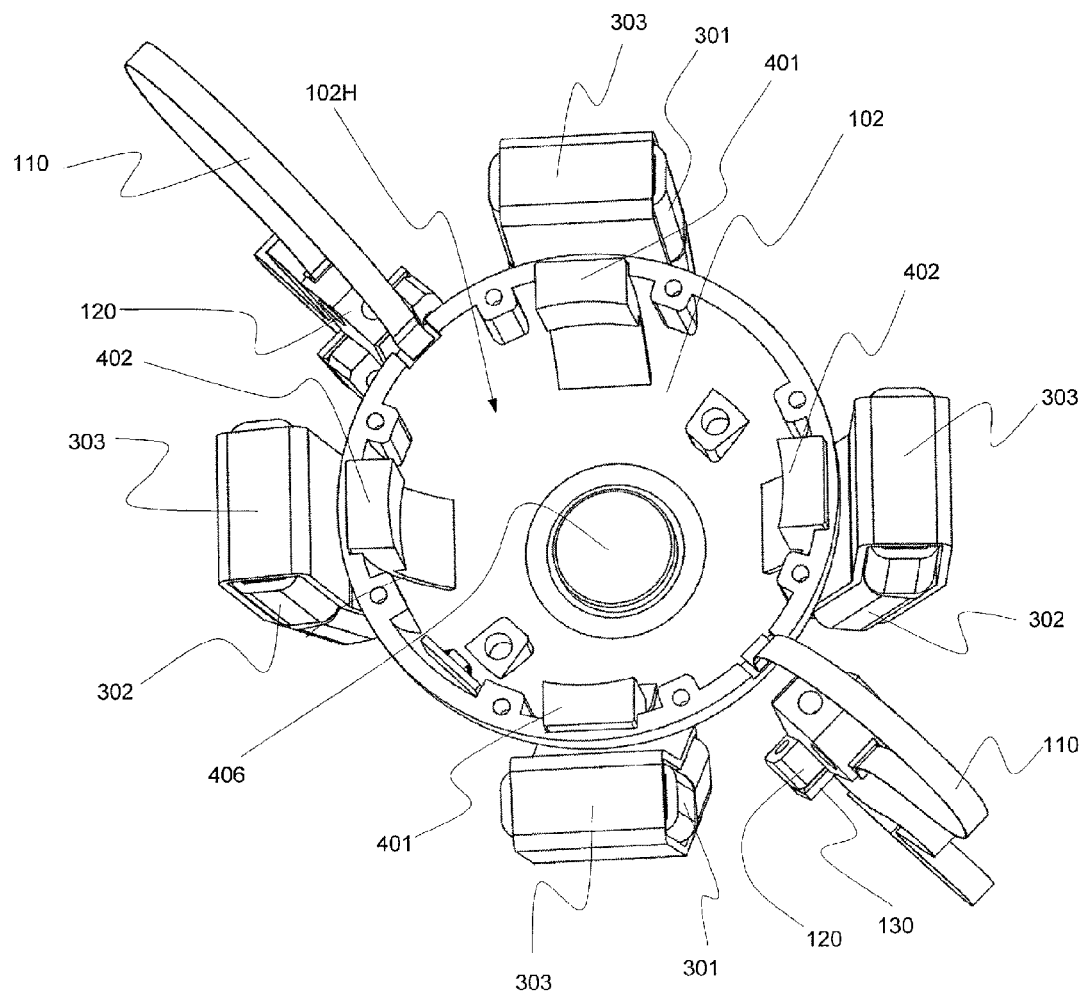
FIG. 7 is a perspective view of the movable unit 180 and driving section as viewed from above the camera driving apparatus 165 according to the aspect of the present invention with the image sensor driving section 99, lens section 101, camera cover 150 and base 200 removed.

FIG. 7 is a perspective view of the movable unit 180 and driving section as viewed from above them with the image sensor driving section 99, the lens driving section, a camera cover 150 and a base 200 removed.

Figure 8:
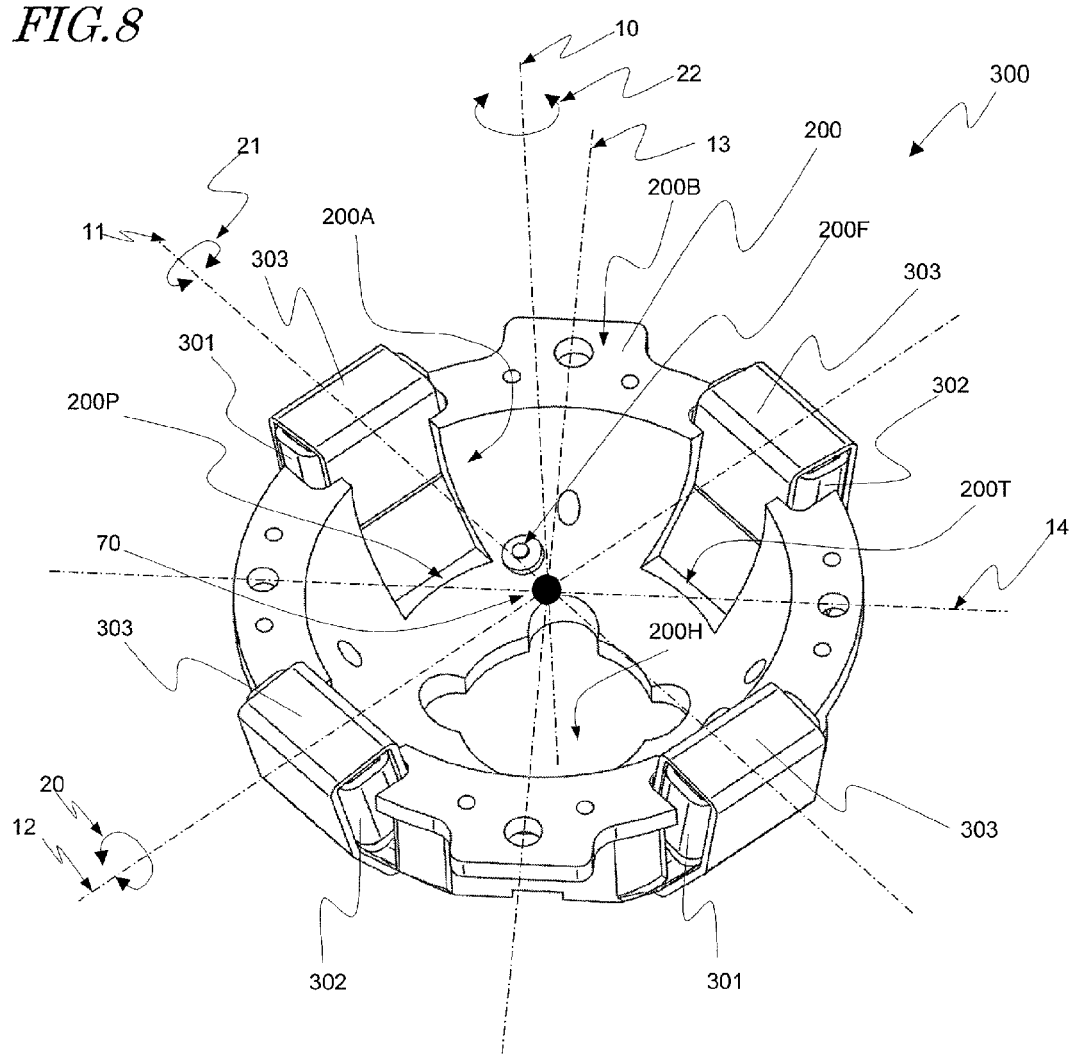
FIG. 8 is a perspective view of a fixed unit 300 as viewed from above the camera driving apparatus 165 according to the aspect of the present invention.

FIG. 8 is a perspective view of a fixed unit 300 as viewed from above the unit 300.

Figure 9:
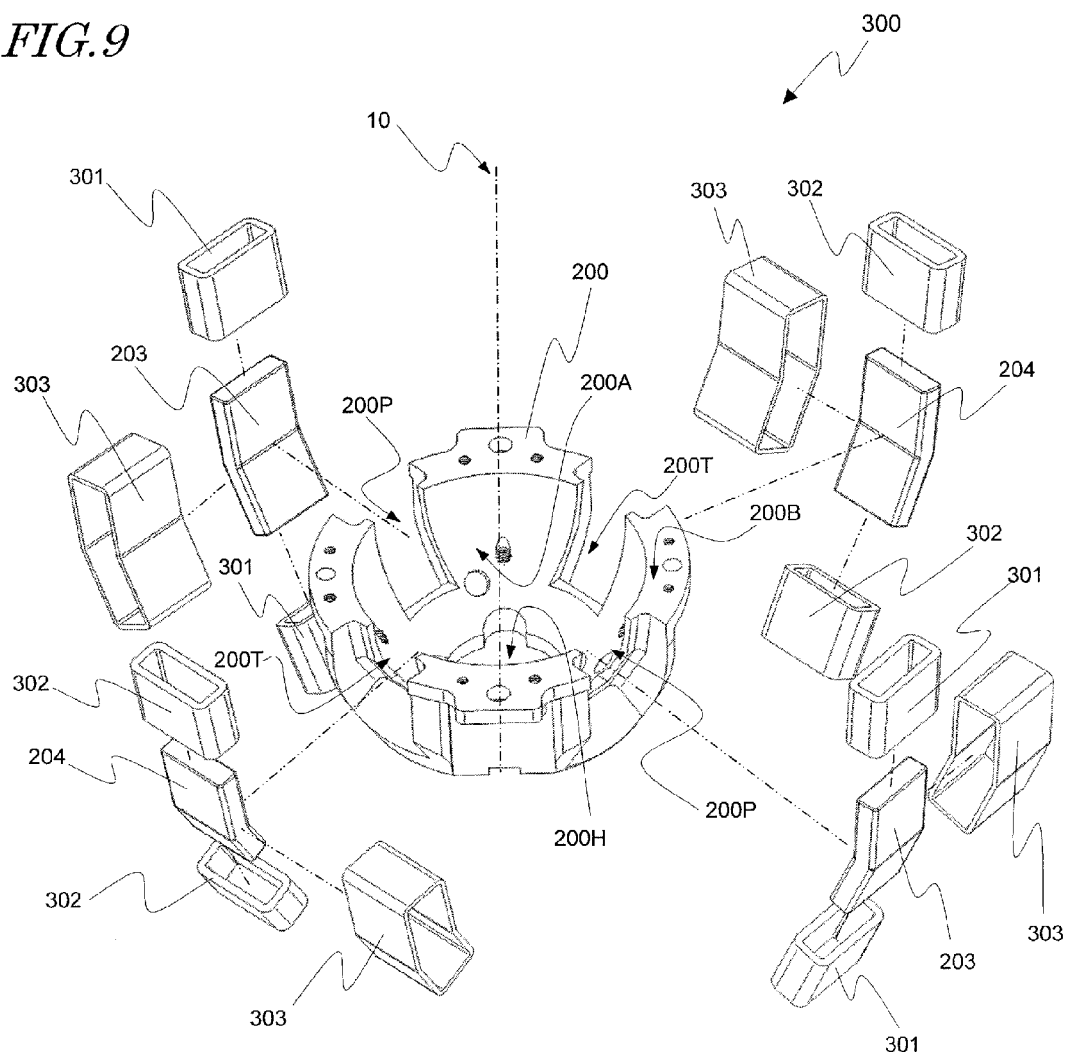
FIG. 9 is an exploded perspective view illustrating a general configuration for the fixed unit 300 of the camera driving apparatus 165 according to the aspect of the present invention.

FIG. 9 is an exploded perspective view illustrating a general configuration for the fixed unit 300.

Figure 10A:
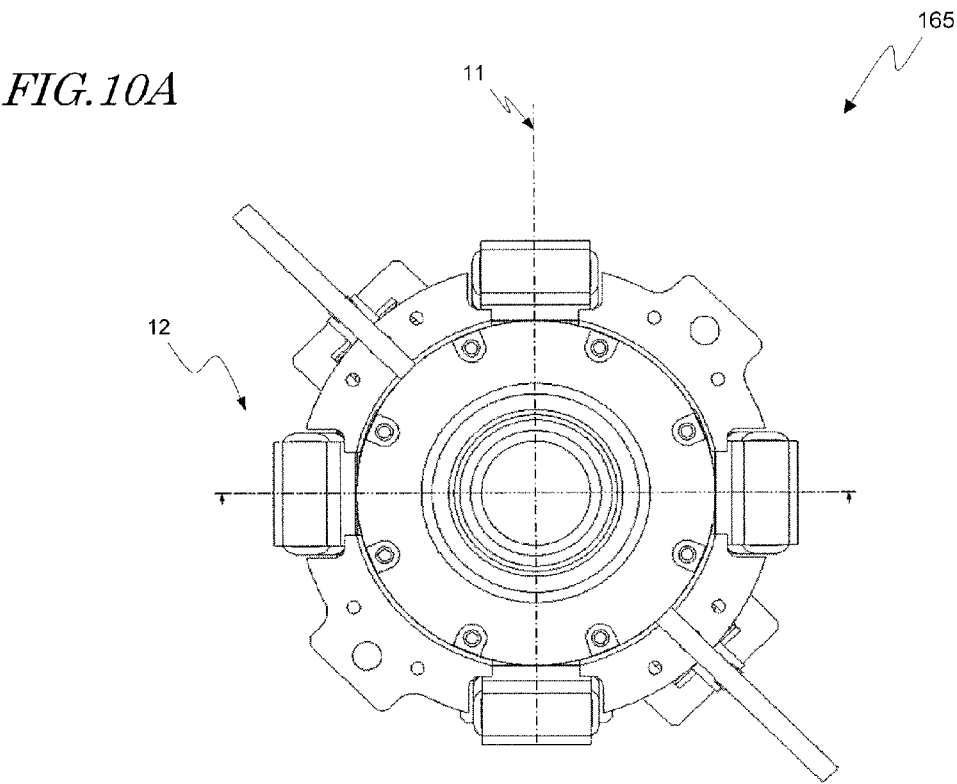
FIG. 10A is a top view of the camera driving apparatus 165 according to the first embodiment of the present invention.
Figure 10B:
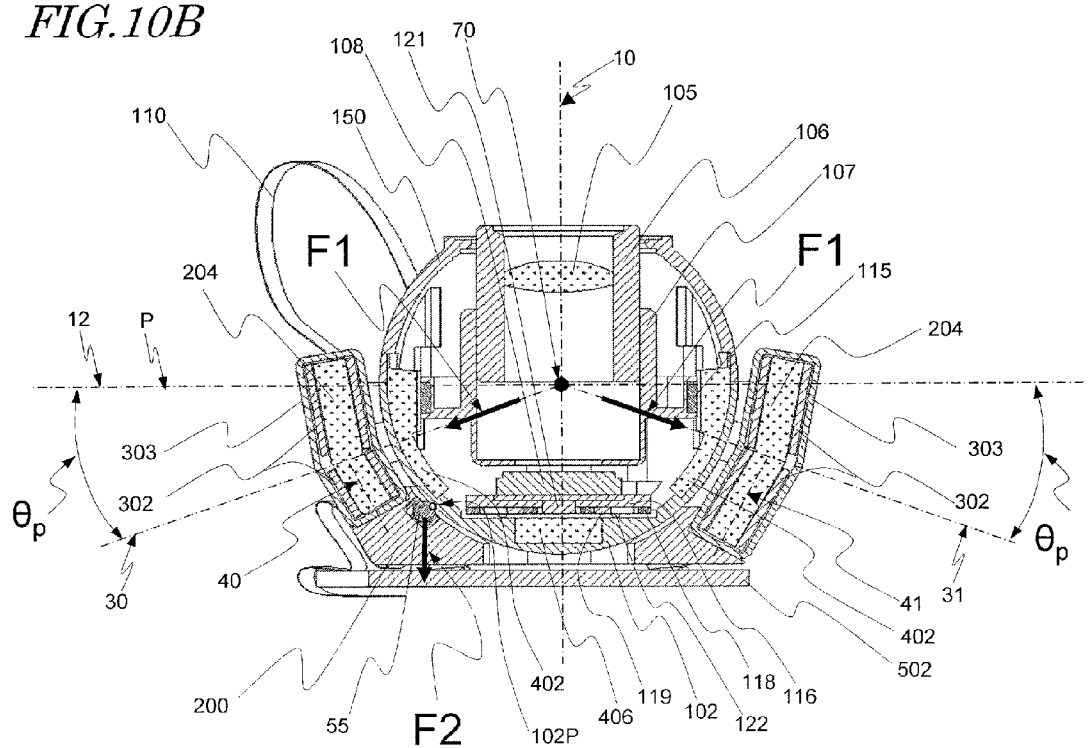
FIG. 10B is a cross-sectional view of the camera driving apparatus 165 according to the first embodiment of the present invention as viewed on a plane including the optical axis 10 and a panning direction rotation axis 12.

FIGS. 10A and 10B are respectively a top view of the camera driving apparatus 165 and a cross-sectional view thereof as viewed on the plane including the optical axis 10 and a panning direction rotation axis 12.

Figure 11A:
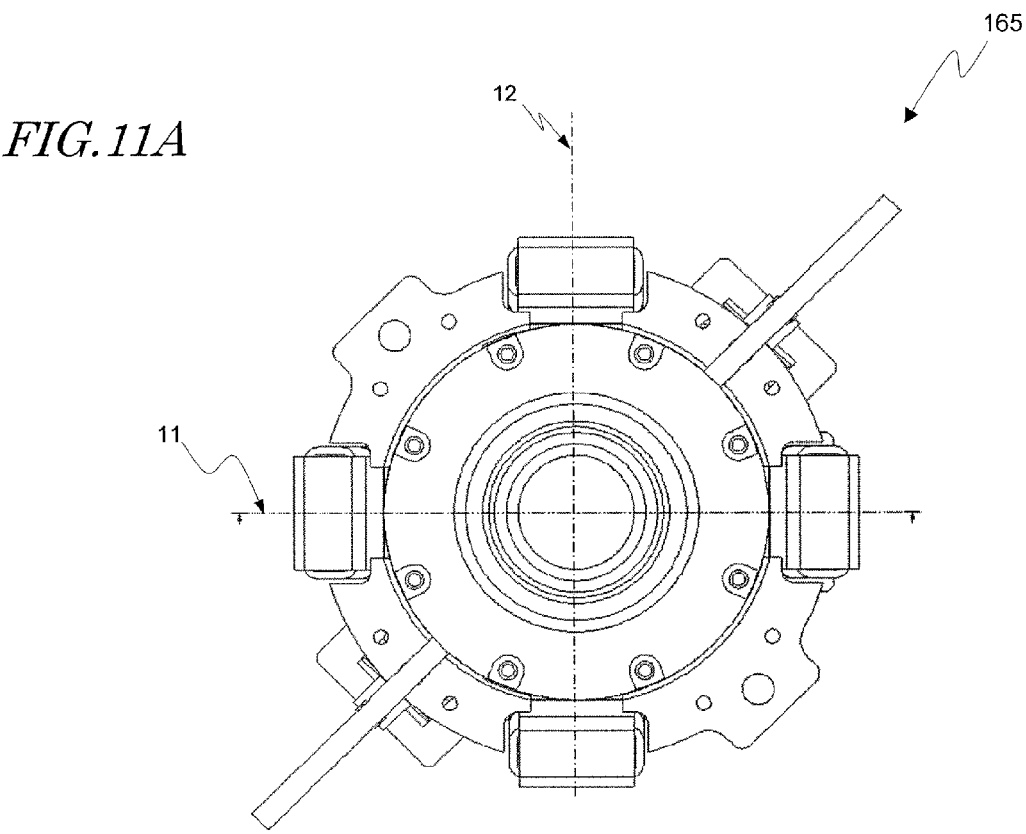
FIG. 11A is a top view of the camera driving apparatus 165 according to the first embodiment of the present invention.
Figure 11B:
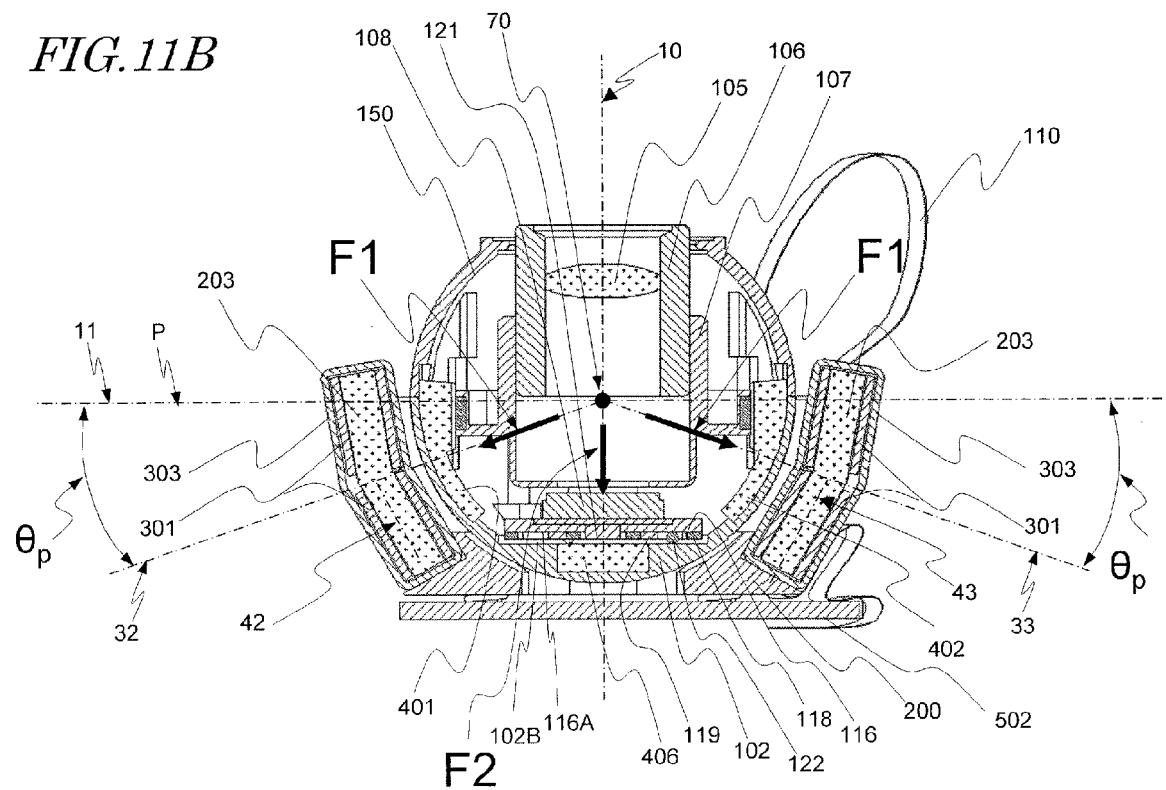
FIG. 11B is a cross-sectional view of the camera driving apparatus 165 according to the first embodiment of the present invention as viewed on a plane including the optical axis 10 and a tilting direction rotation axis 11.

FIGS. 11A and 11B are respectively a top view of the camera driving apparatus 165 and a cross-sectional view thereof as viewed on a plane including the optical axis 10 and a tilting direction rotation axis 11.

Figure 12A:
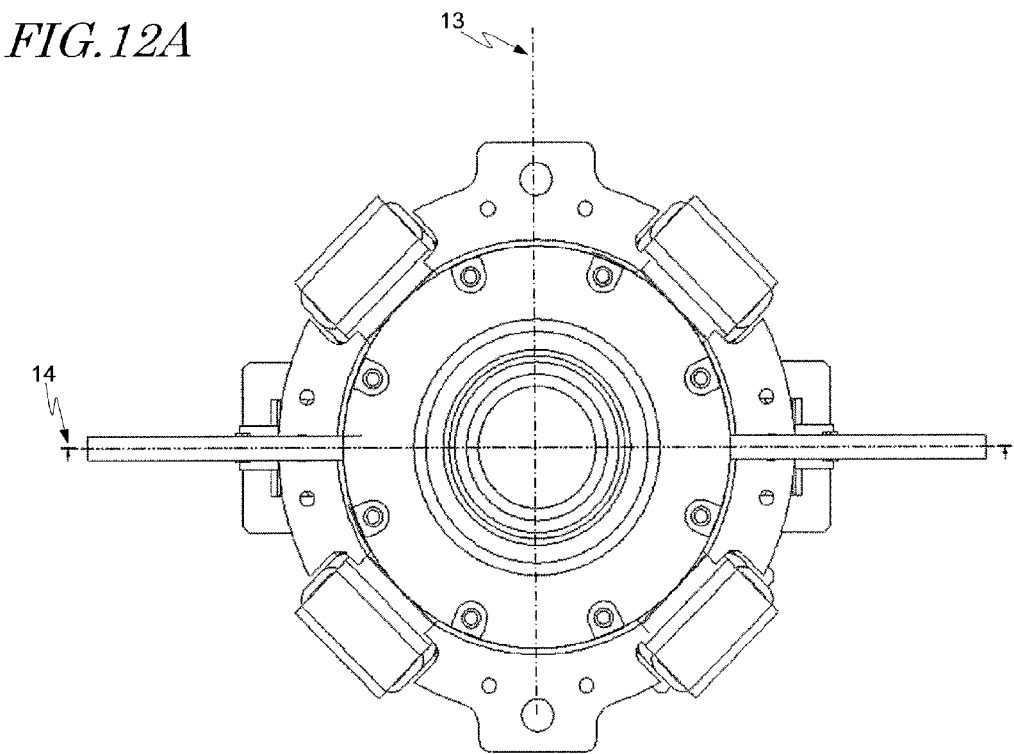
FIG. 12A is a top view of the camera driving apparatus 165 according to the first embodiment of the present invention.
Figure 12B:
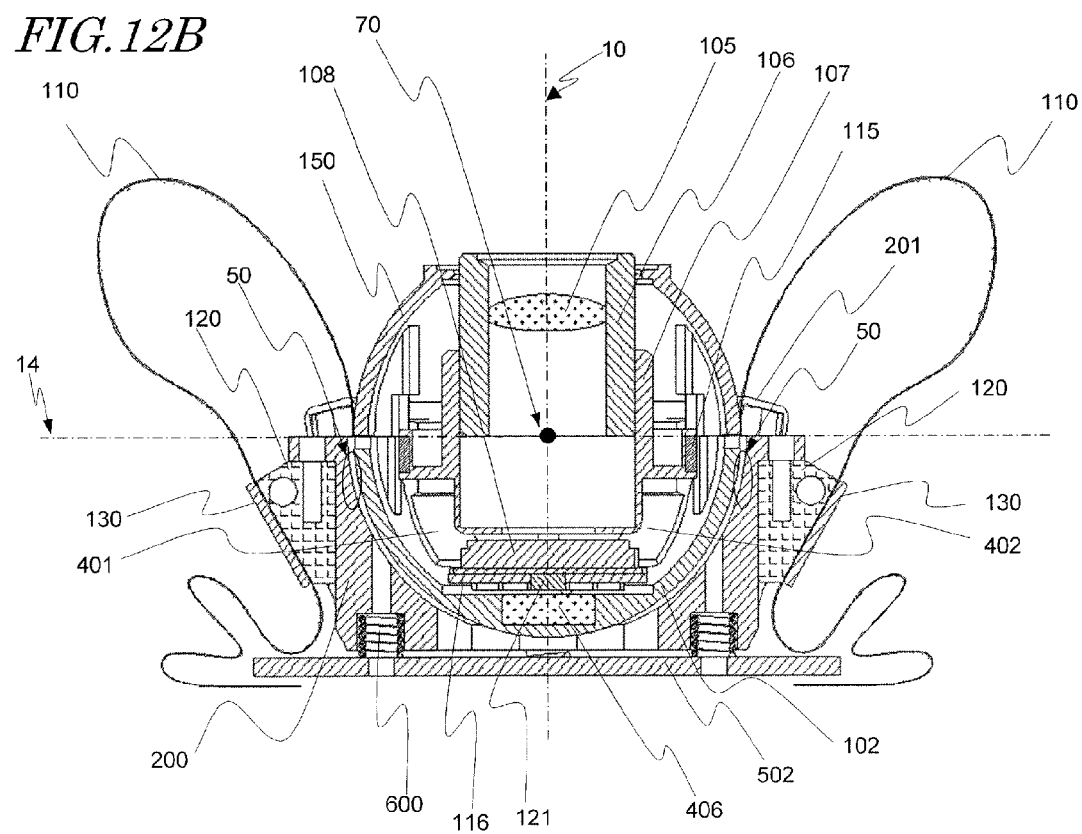
FIG. 12B is a cross-sectional view of the camera driving apparatus 165 according to the first embodiment of the present invention as viewed on a plane including the optical axis 10 and a line 14.

FIGS. 12A and 12B are respectively a top view of the camera driving apparatus 165 and a cross-sectional view thereof as viewed on a plane including the optical axis 10 and a line 14.

Figure 13A:
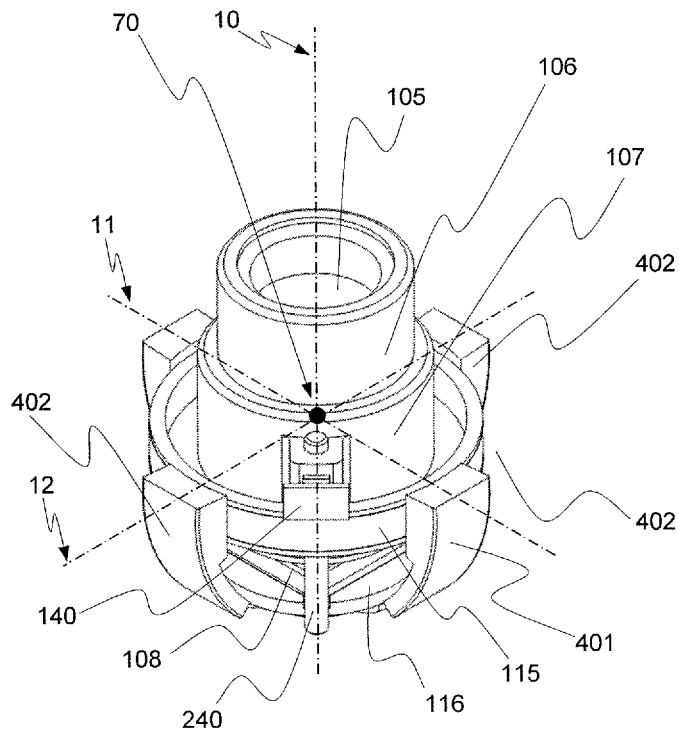
FIG. 13A is a perspective view illustrating respective parts of a lens driving section and an image sensor driving section 99 according to the first embodiment of the present invention as viewed from above them.

FIG. 13A is a perspective view illustrating a lens driving section, an image sensor 108 and an image sensor holder 116 which form parts of the image sensor driving section as viewed from above them.

Figure 13B:
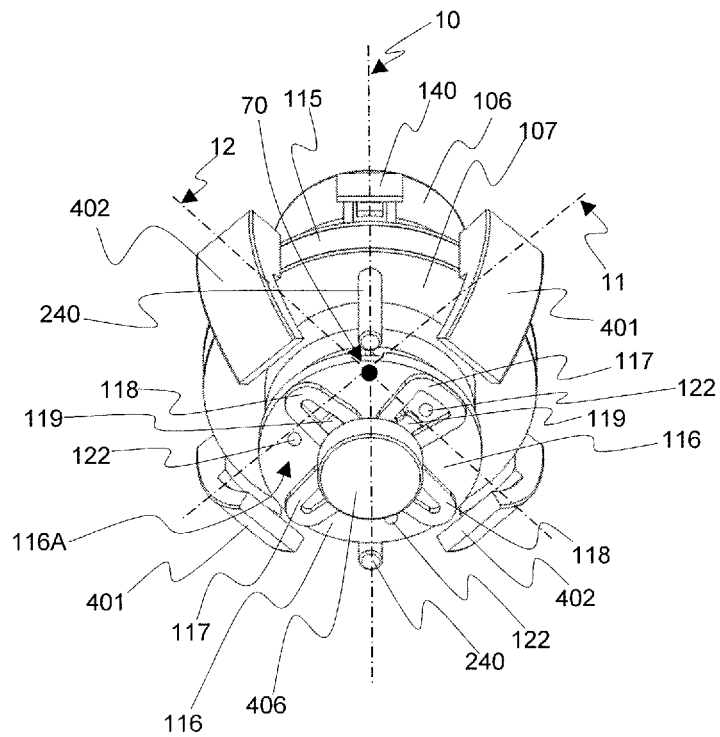
FIG. 13B is a perspective view illustrating respective parts of the lens driving section and the image sensor driving section 99 according to the first embodiment of the present invention as viewed from below them.

FIG. 13B is a perspective view illustrating the lens driving section, the image sensor 108, the image sensor holder 116, image sensor drive coils 117, 118 and a tilt detecting magnet 406 which form parts of the image sensor driving section as viewed from below them.

Figure 14:
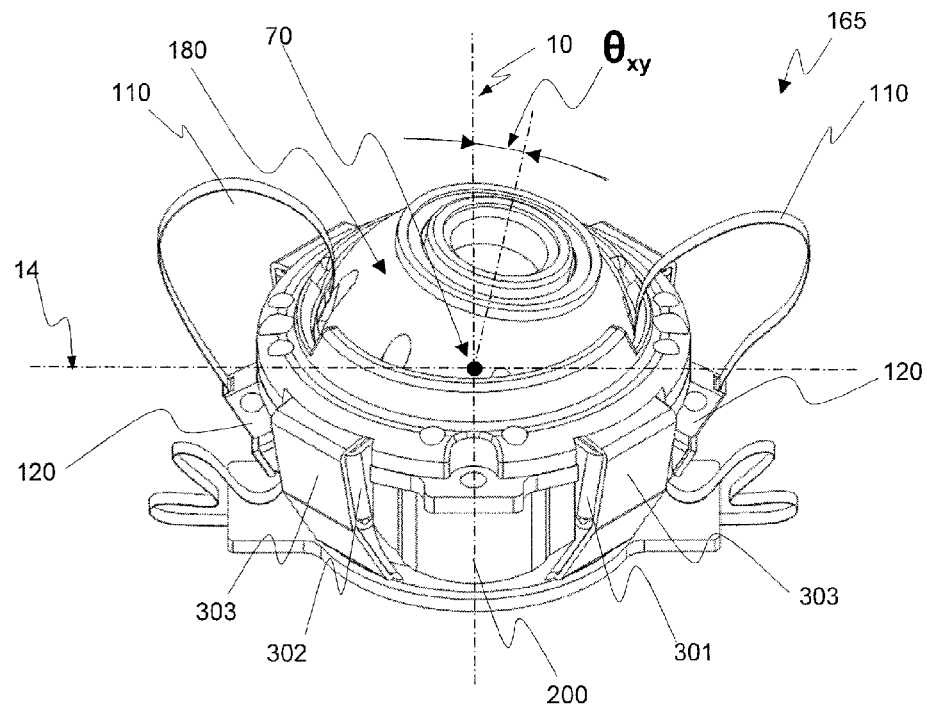
FIG. 14 is a perspective view illustrating the movable unit 180 as viewed from above it in a state where the movable unit 180 is tilted to the same degree (at a synthetic angle θxy) in the panning direction 20 and tilting direction 21.

FIG. 14 is a perspective view illustrating the camera driving apparatus 165 as viewed from above it in a state where the movable unit 180 is tilted to the same degree (at a synthetic angle θxy) in the panning direction 20 and tilting direction 21.

Figure 15A:
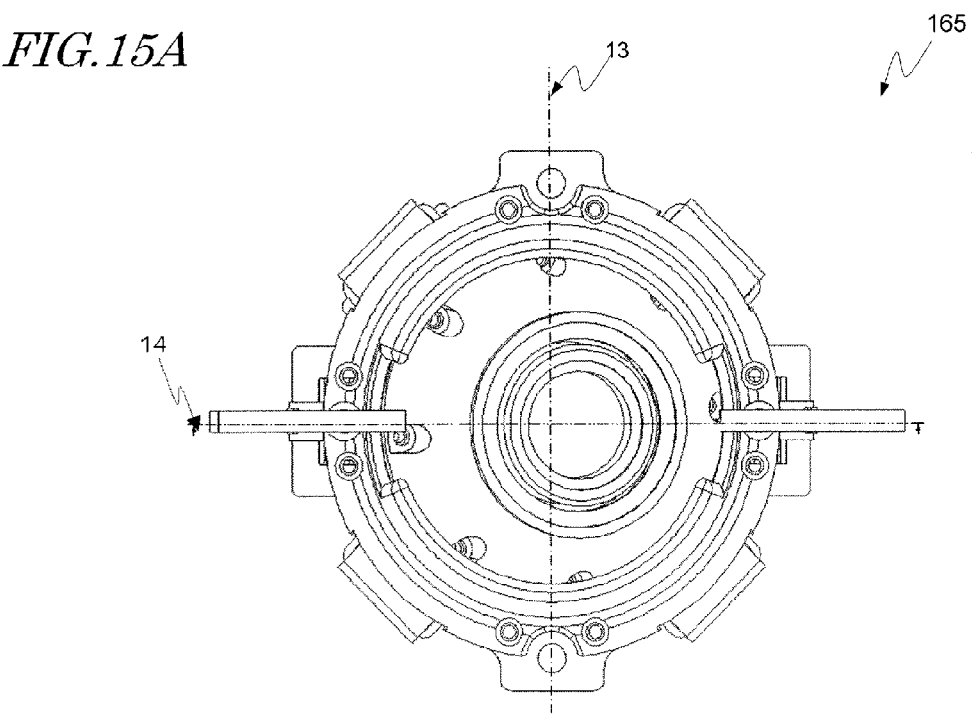
FIG. 15A is a top view illustrating the movable unit 180 as viewed in a state where the movable unit 180 is tilted to the same degree (at a synthetic angle θxy) in the panning direction 20 and tilting direction 21.
Figure 15B:
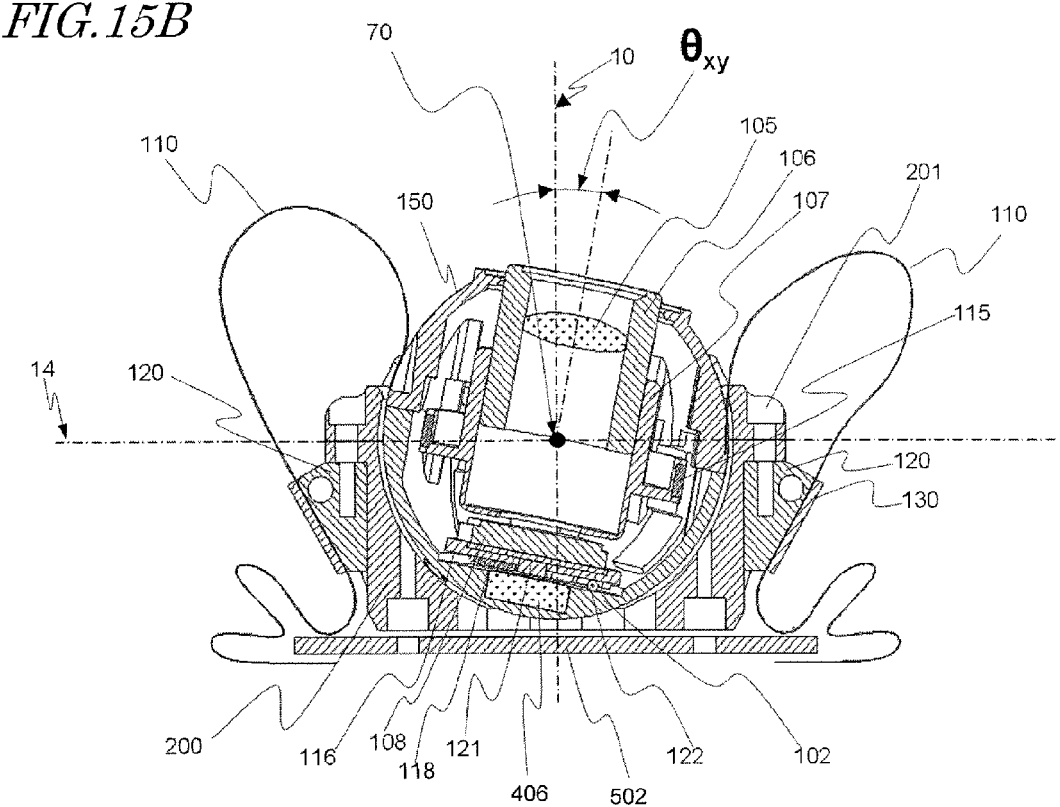
FIG. 15B is a cross-sectional view of the movable unit 180 as viewed on a plane including the optical axis 10 and the line 14 in a state where the movable unit 180 is tilted to the same degree (at the synthetic angle θxy) in the panning direction 20 and tilting direction 21.

FIG. 15A is a top view of the camera driving apparatus 165.
FIG. 15B is a cross-sectional view of the camera driving apparatus 165 as viewed on a plane including the optical axis 10 and the line 14 in a state where the movable unit 180 is tilted to the same degree (at the synthetic angle θxy) in the panning direction 20 and tilting direction 21.

Figure 16A:
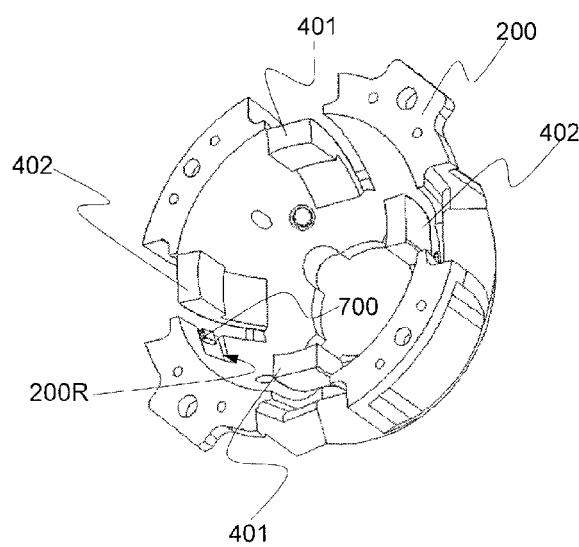
FIG. 16A is a perspective view illustrating a second magnetic sensor 700 of the movable unit 180 which is provided for the fixed unit of the camera driving apparatus 165 according to the present invention, the panning drive magnet 401 and the tilting drive magnet 402 as viewed from above them.

FIG. 16A is a perspective view illustrating a second magnetic sensor 700 which is provided for the fixed unit, the panning drive magnet 401 and the tilting drive magnet 402 as viewed from above them.

Figure 16B:
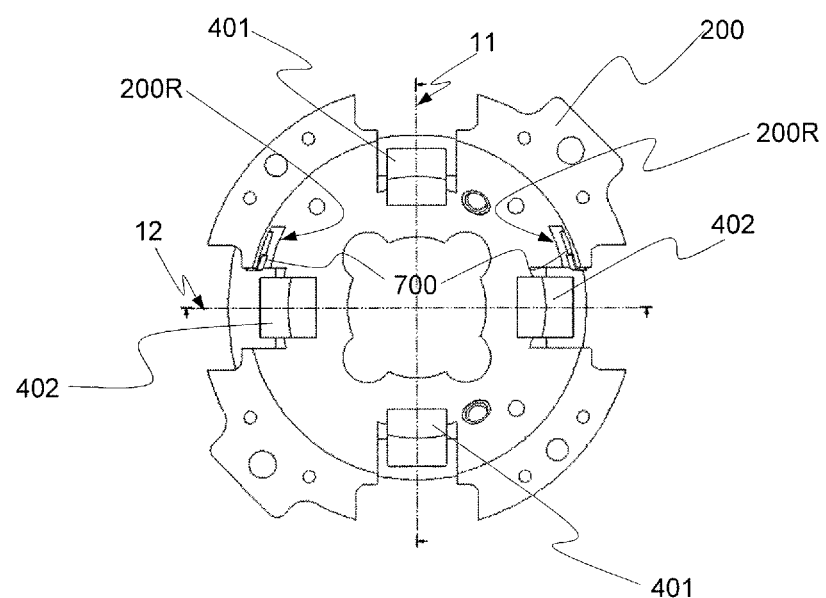
FIG. 16B is a top view illustrating a second magnetic sensor 700 which is provided for the fixed unit of the camera driving apparatus 165 according to the aspect of the present invention, the panning drive magnet 401 and the tilting drive magnet 402.

FIG. 16B is a top view illustrating the second magnetic sensor 700 provided for the fixed unit, the panning drive magnet 401 and the tilting drive magnet 402.

Figure 16C:
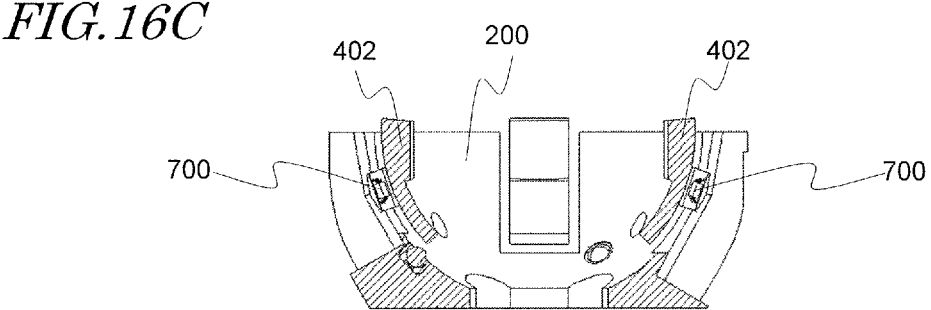
FIG. 16C is a cross-sectional view illustrating the second magnetic sensor 700 provided for the fixed unit of the camera driving apparatus 165 according to the aspect of the present invention, the panning drive magnet 401 and the tilting drive magnet 402 as viewed on a plane including the optical axis 10 and the panning direction rotation axis 12.

FIG. 16C is a cross-sectional view illustrating the second magnetic sensor 700 provided for the fixed unit, the panning drive magnet 401 and the tilting drive magnet 402 as viewed on a plane including the optical axis 10 and the panning direction rotation axis 12.

Figure 17:
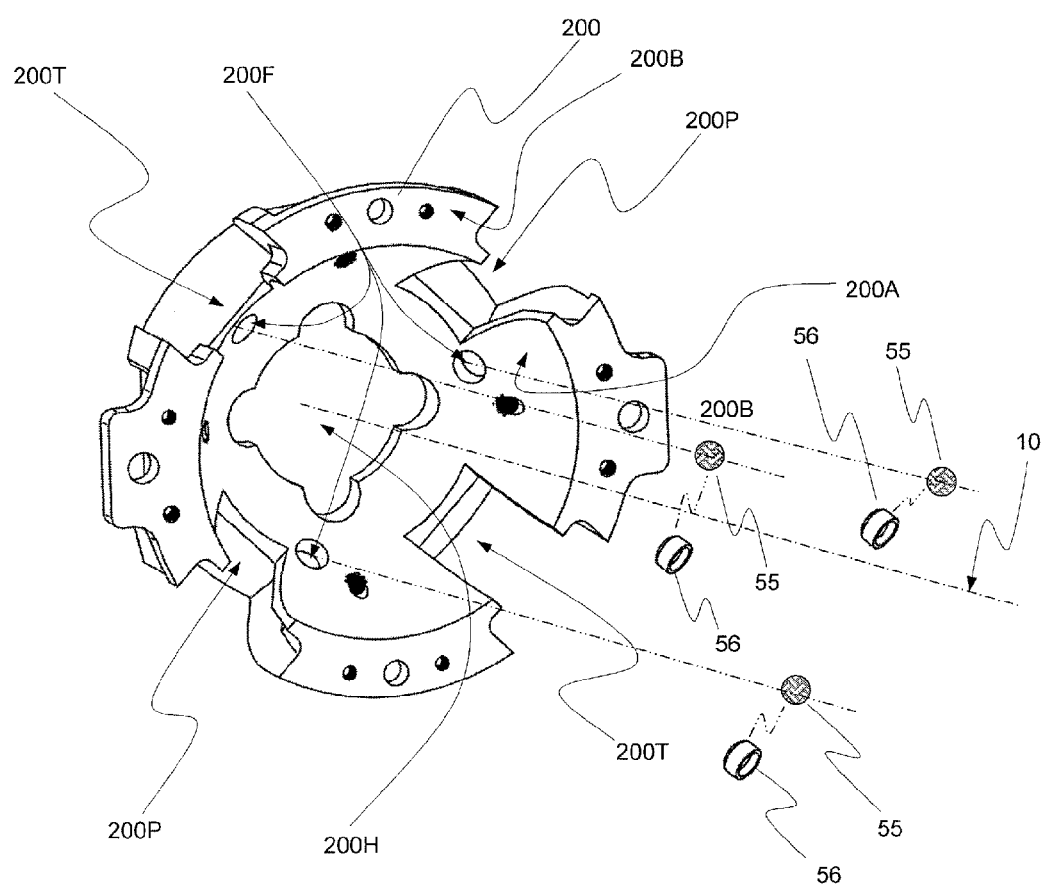
FIG. 17 is an exploded perspective view illustrating relative positions of supporting balls 55 with respect to the fixed unit in the camera driving apparatus 165 according to the aspect of the present invention.

FIG. 17 is an exploded perspective view illustrating relative positions of supporting balls 55 with respect to the fixed unit.

Figure 18A:
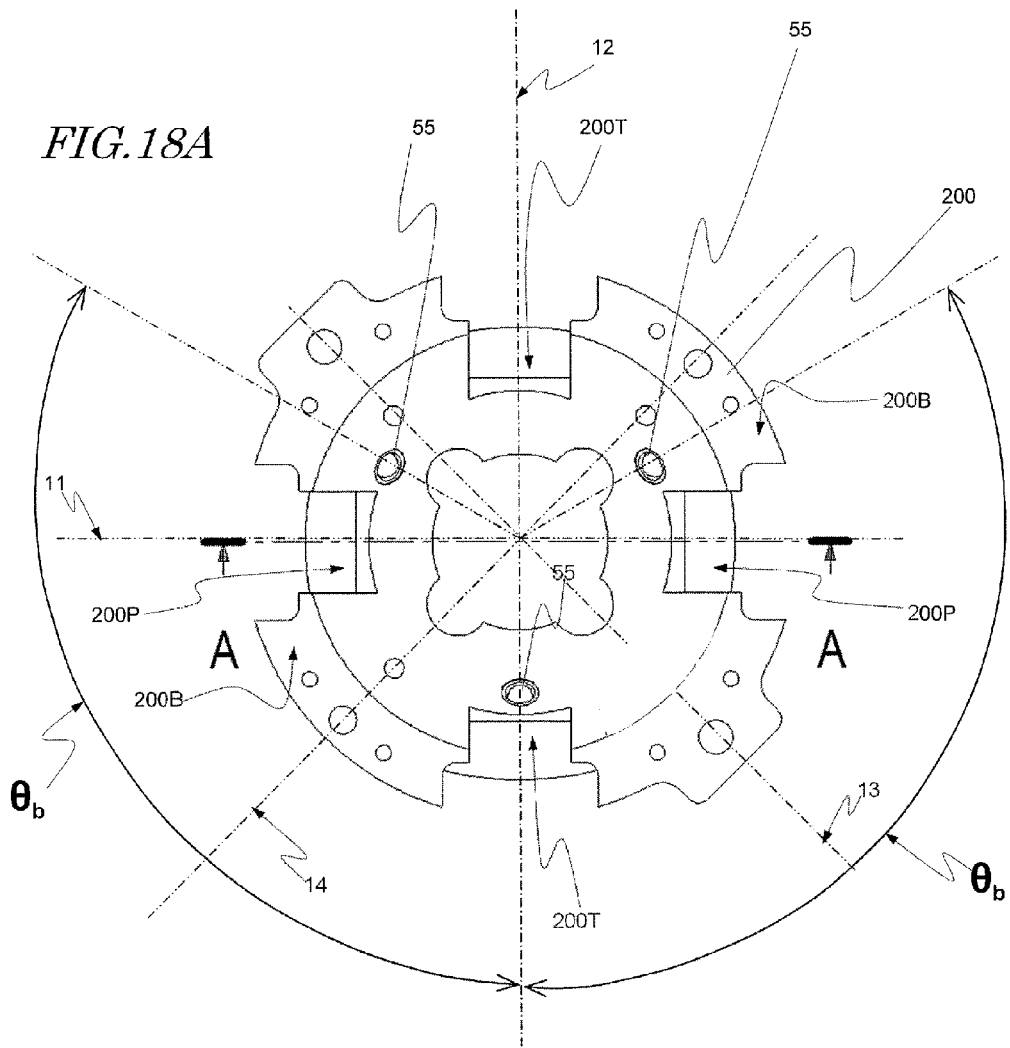
FIG. 18A is a top view of the fixed unit of the camera driving apparatus 165 according to the aspect of the present invention.
Figure 18B:
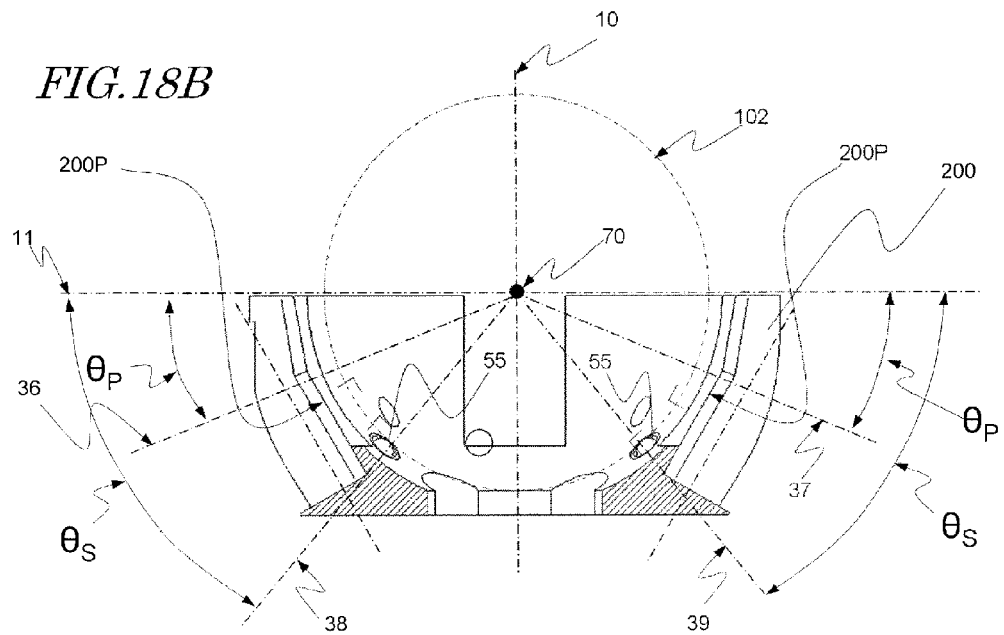
FIG. 18B is a cross-sectional view of the fixed unit of the camera driving apparatus 165 according to the aspect of the present invention as viewed on a plane including the optical axis 10 and the tilting direction rotation axis 11.

FIGS. 18A and 18B are respectively a top view of the fixed unit and a cross-sectional view of the fixed unit as viewed on a plane including the optical axis 10 and the tilting direction rotation axis 11.

Figure 19A:
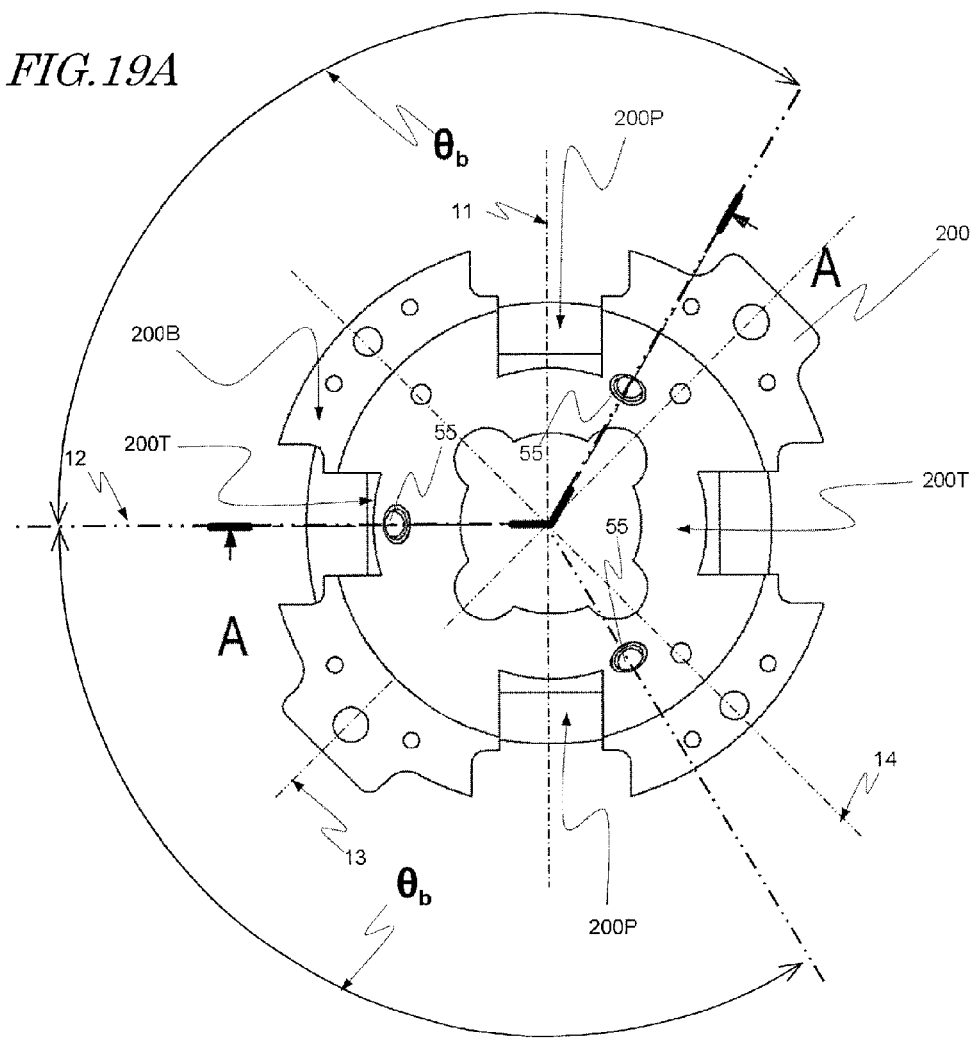
FIG. 19A is a top view of the fixed unit of the camera driving apparatus 165 according to the aspect of the present invention.
Figure 19B:
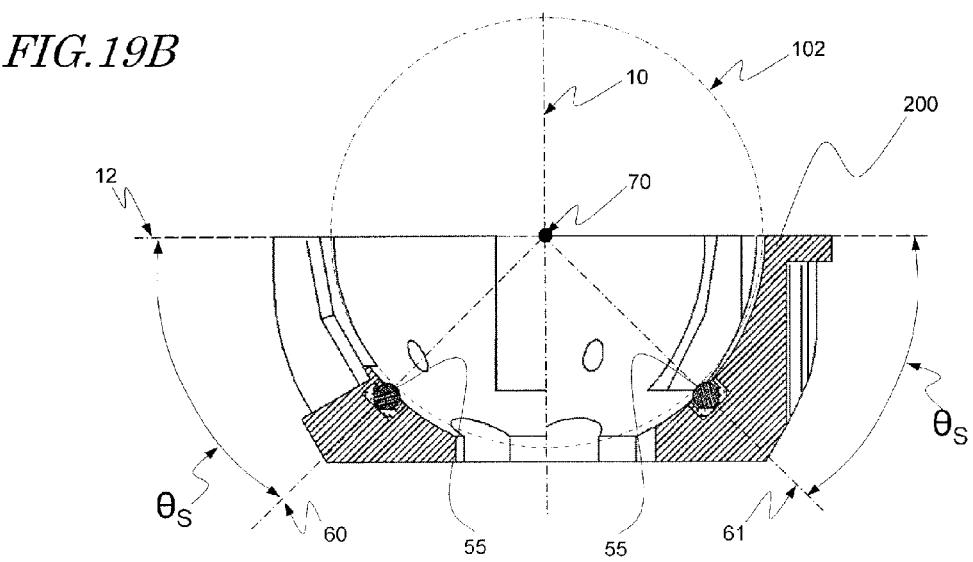
FIG. 19B is a cross-sectional view of the fixed unit of the camera driving apparatus 165 according to the aspect of the present invention as viewed on a plane including the optical axis 10 and the centers of supporting balls 55.

FIGS. 19A and 19B are respectively a top view of the fixed unit and a cross-sectional view of the fixed unit as viewed on a plane including the optical axis 10 and the centers of supporting balls 55.

Figure 20A:
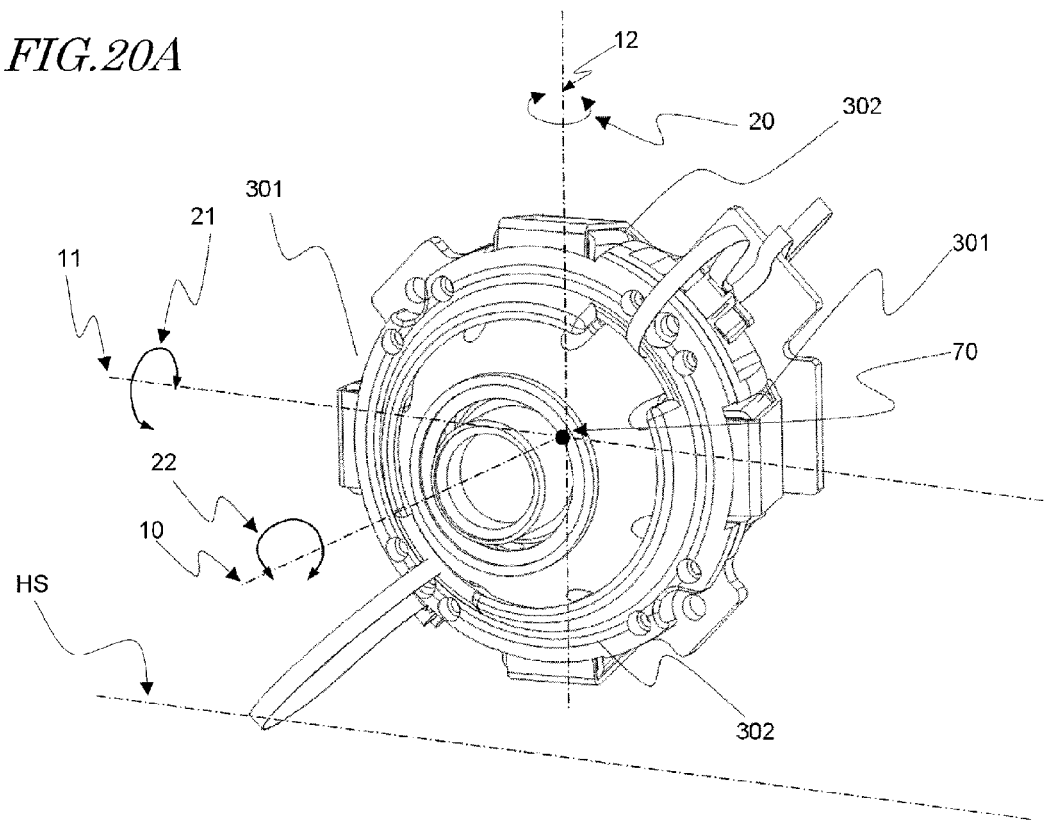
FIG. 20A is a perspective view showing a relative angular position with respect to the reference horizontal shooting plane of the camera driving apparatus 165 according to the aspect of the present invention as viewed from above the driver 165.
Figure 20B:
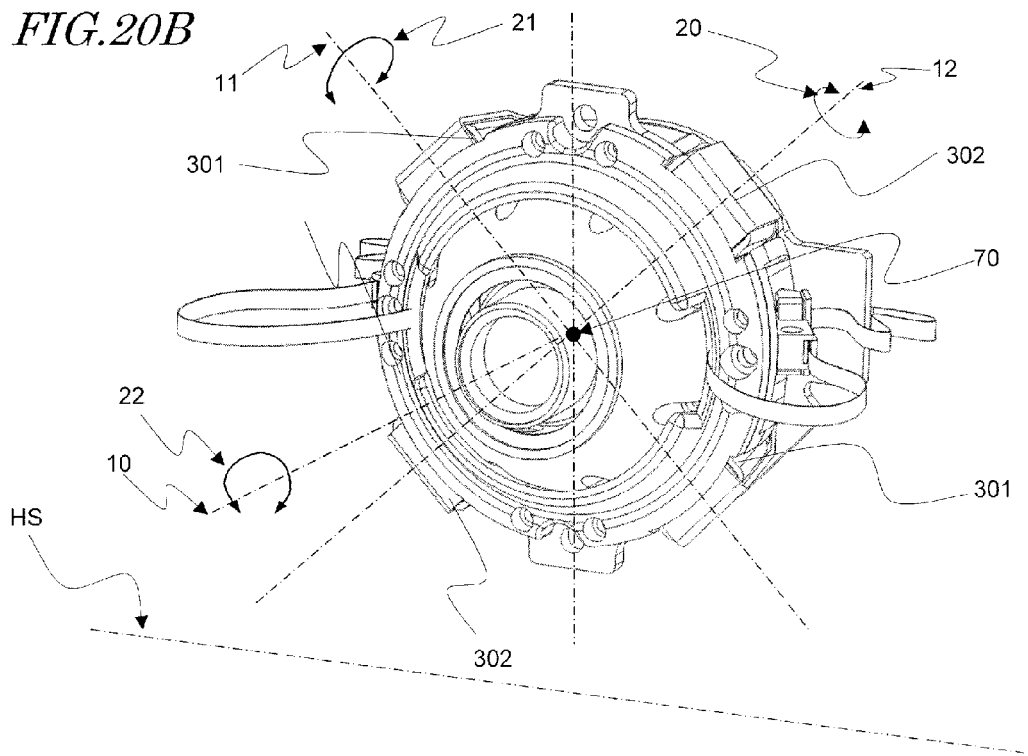
FIG. 20B is another perspective view showing a relative angular position with respect to the reference horizontal shooting plane of the camera driving apparatus 165 according to the aspect of the present invention as viewed from above the driver 165.

FIGS. 20A and 20B are perspective views showing relative angular positions with respect to the reference horizontal shooting plane of the camera driving apparatus 165 as viewed from above the driver 165.

Hereinafter, a typical configuration for this camera driving apparatus 165 will be described with reference to these drawings.

This camera driving apparatus 165 includes a movable unit 180 to house a camera section 100 inside, and a fixed unit 300 to support the movable unit 180. The camera section 100 includes a lens section 101 and an image sensor driving section 99. The movable unit 180 can rotate freely in a rolling direction 22 on the optical axis 10 of the lens, in a tilting direction 21 on a tilting direction rotation axis 11, and in a panning direction 20 on a panning direction rotation axis 12 with respect to the fixed unit 300. The tilting direction rotation axis 11 and the panning direction rotation axis 12 intersect with each other at right angles.

For that purpose, this camera driving apparatus 165 includes a driving section to tilt the movable unit 180 in the panning direction 20 and in the tilting direction 21 and a rolling driving section to rotate the movable unit 180 in the rolling direction on the optical axis 10 of the lens with respect to the fixed unit 300.

The panning driving section includes a pair of panning drive magnets 401 provided for the movable unit 180, a pair of panning drive coils 301 provided for the fixed unit 300 and a pair of panning magnetic yokes 203 made of a magnetic body. Around the pair of panning drive coils 301, wound is a pair of rolling drive coils 303 to be rotated and driven in the rolling direction 22 on the optical axis 10 as will be described later.

The tilting driving section includes a pair of tilting drive magnets 402 provided for the movable unit 180, a pair of tilting drive coils 302 provided for the fixed unit 300 and a pair of tilting magnetic yokes 204 made of a magnetic body.

The rolling driving section includes a pair of rolling drive magnets, a pair of rolling drive coils 303 and a pair of rolling magnetic yokes. Around the pair of tilting drive coils 302, wound is a pair of rolling drive coils 303 to be rotated and driven in the rolling direction 22 on the optical axis 10 as will be described later.

It will be described in detail later how the panning, tilting and rolling driving sections drive the movable unit 180.

The camera driving apparatus 165 further includes detectors to detect the tilt angle of the movable unit 180 with respect to the fixed unit 300 and its angle of rotation around the optical axis 10 of the lens. Specifically, the camera driving apparatus 165 further includes a first detector to detect the two-dimensional tilt angles of the movable unit 180, i.e., its angles of rotation in the panning and tilting directions 20 and 21, and a second detector to detect the angle of rotation of the movable unit 180 around the optical axis 10 of the lens. The first detector includes a first magnetic sensor 501 and a tilt detecting magnet 406.

As shown in FIG. 2, the lens section 101 includes a lens 105 which has the optical axis 10 to produce a subject image on the imaging plane of an image sensor 108, a lens holder 106 to hold the lens 105, a lens barrel 107 to support the lens holder 106, and an optical axis direction drive coil 115. The image sensor 108 may be a CMOS sensor or a CCD sensor, for example.

Meanwhile, the image sensor driving section 99 includes the image sensor 108, an image sensor holder 116 to hold the image sensor 108, a magnetic member 121 fixed to the image sensor holder 116 and image sensor drive coils 117 and 118.

Cables 110 to supply the output signal of the image sensor 108 to an external device are connected to the image sensor driving section 99. The cables 110 may be implemented as flexible cables, for example.

The fixed unit 300 includes a base 200, which has a depressed portion in which at least a portion of the movable unit 180 is loosely fit. In this embodiment, the inner side surface of the depressed portion is defined by a concave spherical surface 200A. The base 200 further has notches 200P, 200T and a contact surface 200B. In this description, the concave spherical surface will be sometimes referred to herein as a "concave conical surface".

As shown in FIGS. 1 to 9, this camera driving apparatus 165 uses the pair of panning magnetic yokes 203 and the pair of tilting magnetic yokes 204 in combination as the rolling magnetic yokes in order to rotate the movable unit 180 in the rolling direction 22 and includes four rolling drive coils 303 to be wound around them. This camera driving apparatus 165 also uses the pair of panning drive magnets 401 and the pair of tilting drive magnets 402 in combination as the rolling drive magnets.

As shown in FIGS. 8 and 9, the rolling drive coils 303 have a crossed winding structure in which those coils are wound around the pair of panning magnetic yokes 203 and the pair of tilting magnetic yokes 204 perpendicularly to the coil winding direction of the panning drive coils 301 and the tilting drive coil 302 so that the former coils are stacked on the latter coils. And the rolling drive coils 303 are inserted and secured to the notches 200P and 200T of the base 200.

For example, the fixed unit 300 including the base 200 may be made of a resin. Also, in this fixed unit 300 including the base 200, the panning drive coils 301 and rolling drive coils 303 that are wound around the pair of panning magnetic yokes 203 may have been formed together, and the tilting drive coils 302 and rolling drive coils 303 that are wound around the pair of tilting magnetic yokes 204 may also have been formed together. Furthermore, these drive coils that are wound around those magnetic yokes may not be exposed on the inner side surface of the base 200, i.e., on the concave spherical surface 200A.

As shown in FIG. 2, the lens section 101 is comprised of a lens holder 106 to which a lens 105 is fixed, a lens barrel 107, and an image sensor 108. The lens holder 106 is inserted and fixed into the opening 107A of the lens barrel 107.

As shown in FIGS. 2, 13A and 13B, two guide bars 240 which are fixed on the lower movable portion 102 and of which the axial direction is parallel to the optical axis 10 are inserted into the holes 107C of the lens barrel 107 to enable the lens section 101 to slide along the optical axis 10.

The optical axis direction drive coil 115 has a winding center axis which agrees with the optical axis 10 and is fit into a depressed portion 107B of the lens barrel 107 so as to face the panning drive magnets 401 and the tilting drive magnets 402.

Thus, by supplying electric power to the optical axis direction drive coil 115, the lens section 101 receives electromagnetic force from the panning drive magnets 401 and the tilting drive magnets 402 and gets ready to shift along the optical axis 10.

Furthermore, a shift detecting magnet 109 to detect the shift along the optical axis 10 is fit and fixed into the depressed portion 107D of the lens barrel 107. And a magnetic sensor 140 to detect the shift along the optical axis 10 is provided for either the camera cover 150 or the lower movable portion 102 so as to face the shift detecting magnet 109.

As a result, the magnitude of shift of the lens section 101 in the optical axis (10) direction can be detected, and the center of the focus (i.e., nodal point) of the lens 105 can perfectly agree with the spherical centroid 70 that is the physical center of rotation of the movable unit 180 highly accurately.

Consequently, even if the lens section 101 has been rotated and shifted in the panning direction 20 or the tilting direction 21, the shooting session can still be carried out from the nodal point that does not vary optically, and therefore, fine adjustment work can be cut down significantly when panorama synthetic shooting is carried out.

In addition, by eliminating a blurry image to be generated as a byproduct when the lens section 101 is moved in the panning direction 20 or the tilting direction 21 in order to compensate for and control the walking blur, walking blurred images can naturally be further reduced overall.

Meanwhile, by intentionally offsetting the nodal point of the lens 105 from the spherical centroid 70 that is the physical center of rotation of the movable unit 180, an approximate distance to the subject can be calculated and measured based on the magnitude of the image blur generated.

In that case, the focus control can be carried out more accurately and the image quality can be improved. In addition, by measuring the degree of blur due to defocusing, the distance to the subject can be measured approximately, too.

Next, the image sensor driving section 99 will be described.

As shown in FIG. 2, the movable unit 180 includes a camera cover 150 and a lower movable portion 102. The camera cover 150 to which the lens section 101 is fixed is secured to the lower movable portion 102 that houses the image sensor driving section 99 inside.

As shown in FIGS. 2, 13A and 13B, the image sensor holder 116 to which the image sensor 108 is fixed has a plane portion 116A which has a plane that intersects with the optical axis 10 at right angles, while the bottom of the lower movable portion 102 has a plane portion 102B. As shown in FIGS. 11B and 15B, three supporting spheres 122 are held between the plane portions 116A and 102B. The image sensor holder 116 is supported by those spheres (i.e., balls) on the lower movable portion 102 within a plane which intersects with the optical axis 10 at right angles. In this ball supported state, the image sensor drive coils 117 and 118 are secured to the image sensor holder 116 via a predetermined gap left so as to face the tilt detecting magnet 406.

Also, a magnetic member 121 is provided for the image sensor holder 116 to hold the three supporting spheres 122 under the magnetic attractive force of the tilt detecting magnet 406.

Furthermore, as shown in FIG. 13B, a pair of image sensor drive coils 117 is arranged parallel to the tilting direction rotation axis 11, and another pair of image sensor drive coils 118 is arranged parallel to the panning direction rotation axis 12, with respect to the tilt detecting magnet 406 which is magnetized at a single pole in the optical axis (10) direction.

Furthermore, the respective winding center axes of these two pairs of image sensor drive coils 117 and 118 are parallel to the optical axis 10. These image sensor drive coils 117 and 118 are arranged so as to partially overlap with quadruple regions which are defined by the tilting direction rotation axis 11 and the panning direction rotation axis 12 by projecting the tilt detecting magnet 406 in the optical axis (10) direction.

Consequently, by supplying electric power to the pair of image sensor drive coils 117, the image sensor holder 116 receives electromagnetic force from the tilt detecting magnet 406 and is ready to shift along the tilting direction rotation axis 11 which is a rotation axis defined in the tilting direction.

Meanwhile, by supplying electric power to the pair of image sensor drive coils 118, the image sensor holder 116 receives electromagnetic force from the tilt detecting magnet 406 and is ready to shift along the panning direction rotation axis 12 which is a rotation axis defined in the panning direction.

A third magnetic sensor 119 is secured to the image sensor holder 116 in the quadruple regions that are defined by projecting the tilt detecting magnet 406 in the optical axis (10) direction. The third magnetic sensor 119 detects a variation in the magnetic force of the tilt detecting magnet 406, thereby calculating the magnitudes of shift of the image sensor holder 116 along the tilting direction rotation axis 11 and the panning direction rotation axis 12.

As a result, the magnitudes of shift of the image sensor 108 along the tilting direction rotation axis 11 and the panning direction rotation axis 12 can be detected and the shake of the image sensor 108 in the translational directions (i.e., along the tilting and panning direction rotation axes 11, 12) can be compensated for with respect to the optical axis 10.

Consequently, the translational image blur to be produced noticeably during a macro shooting session, in particular, can be compensated for. In addition, even image blur which is too small for conventional movable units 180 to compensate for successfully by rotating and driving the camera section in three axis directions can also be compensated for on a pixel-by-pixel basis.

The lower movable portion 102 has a pot shape with an opening 102H and has a convex partial sphere 102R on its outer surface. The convex partial sphere 102R may be at least a part of a sphere and may even be an entire sphere. The convex partial sphere 102R has the spherical centroid 70. As shown in FIGS. 17, 18B and 19B, the convex partial sphere 102R of the lower movable portion 102 makes a point contact with three supporting balls 55 which have been fit into three cylindrical holes 200F that have been cut through the concave spherical inner side surface 200A of the base 200 with supporting ball holders 56 of resin.

The convex partial sphere 102R covers the entire outer surface of the lower movable portion 102.

The spherical centroid 70 of the convex partial sphere 102 is located substantially at the center of the lower movable portion 102.

Optionally, in order to position the cables 110 which are connected to the image sensor driving section 99 in the movable unit 180, the lower movable portion 102 may have notched portions 102S with depressions to which the cables 110 are partially inserted.

The movable unit 180 is provided with a tilt detecting magnet 406, the pair of panning drive magnets 401 and the pair of tilting drive magnets 402. These detecting and drive magnets to be mounted may be introduced through the opening 102H into the lower movable portion 102 so as not to be exposed on the convex partial sphere 102R. Also, the tilt detecting magnet 406 may be arranged on the optical axis 10 at the bottom of the lower movable portion 102. The lower movable portion 102 may be made of a resin with good slidability. Optionally, the lower movable portion 102, tilt detecting magnet 406, pair of panning drive magnets 401 and pair of tilting drive magnets 402 may be formed altogether.

As shown in FIGS. 10B and 11B, since the panning magnetic yokes 203 and tilting magnetic yokes 204 arranged inside of the base 200 are made of a magnetic body, the panning drive magnets 401 and tilting drive magnets 402 that are arranged inside of the lower movable portion 102 so as to face those yokes function as attracting magnets. As a result, magnetic attractive force is generated between those yokes and magnets. Specifically, magnetic attractive force F1 is generated not only between the panning magnetic yokes 203 and panning drive magnets 401 but also between the tilting magnetic yokes 204 and tilting drive magnets 402.

Next, the arrangement of the supporting balls 55 will be described with reference to FIGS. 10B, 17, 18A, 18B, 19A and 19B.

In the region of the concave sphere 200A, three cylindrical holes 200F have been cut through the concave conical surface 200A so that when viewed along the optical axis 10, each pair of the holes 200F is spaced apart from each other by an angle $\theta b$ with respect to a start line 14 that defines an angle of 45 degrees to both the panning direction rotation axis 12 and the tilting direction rotation axis 11. Each of those cylindrical holes 200F has a conical inner side surface. To support the movable unit 180 evenly, the angle θb may be set to be 120 degrees, for example.

The three supporting balls 55 are inserted into the three cylindrical holes 200F and make a line contact with the inner side surface. The supporting balls 55 protrude from the concave spherical surface 200A. The three supporting balls 55 each have a convex partial sphere and contact with the convex partial sphere 102R of the lower movable portion 102 at three contact points 102P.

As shown in FIG. 19B, the lines 60 and 61 which connect the respective spherical centroids of the convex partial spheres of those supporting balls 55 (i.e., the respective spherical centroids of the supporting balls 55) to the spherical centroid 70 of the convex partial sphere 102R of the lower movable portion 102 define a tilt angle θs (corresponding to the tilt angle C) downward with respect to a horizontal plane P which intersects with the optical axis 10 at right angles and which passes through the spherical centroid 70 of the convex partial sphere 102R. The tilt angle θs may be 45 degrees, for example, but may be any other value falling within the range of 30 to 60 degrees.

As a result, the lower movable portion 102 is supported at only three points to the fixed unit 300 and the supporting balls 55 are ready to rotate. Consequently, the friction to be caused between the movable unit 180 and the fixed unit 300 can be minimized and the movable unit 180 can have very good dynamic characteristic.

Furthermore, as shown in FIG. 11B, the panning magnetic yokes 203 and tilting magnetic yokes 204 to be also used as rolling magnetic yokes and inserted into the base 200 are made of a magnetic body. That is why magnetic attractive force F1 is generated between those yokes and the panning drive magnets 401 and tilting drive magnets 402 to be also used as rolling drive magnets and inserted into the lower movable portion 102 so as to face those yokes. The magnetic attractive force F1 becomes normal force for the convex partial sphere 102R of the movable unit 180 and the three supporting balls 55. In addition, another magnetic attractive force F2 is obtained as synthetic vector in the optical axis (10) direction.

With these three supporting balls 55, the movable unit 180 can be supported with respect to the fixed unit 300. In addition, since the supporting balls 55 are arranged at regular angular intervals of 120 degrees so as to be uniformly distributed around the optical axis 10, excellent dynamic characteristic is realized using a much stabilized supporting structure. Particularly if the tilt angle θs is set to be approximately 45 degrees, the circumferential line contact portion between the supporting balls 55 and the supporting ball holders 56 receives uniform force under the magnetic attractive force F2. As a result, the coefficient of friction between the movable unit 180 and the fixed unit 300 can be further reduced.

Under this magnetic attractive force F2, the lower movable portion 102 can freely rotate around the spherical centroid 70 while the three supporting balls 55 of the base 200 and the convex partial sphere 102R of the lower movable portion 102 are making a point contact with each other at contact points 102P. In other words, while three contact points 102P are arranged along a circle, of which the center is the optical axis 10, the movable unit 180 is supported by the fixed unit 300. However, this embodiment is characterized in that the concave spherical surface 200A of the base 200 and the convex partial sphere 102R of the lower movable portion 102 are supported so as to make a point contact with each other at three or more points. Thus, a specific structure for getting this support done does not have to be the supporting balls 55 but may also be projections with three convex partial spheres made of a resin, for example.

It should be noted that even when some impact is applied to the camera driving apparatus 165, the three supporting balls 55 will never fall thanks to the anti-fall regulating surface 201A of the stopper member 201. By adopting such a supporting mechanism for the movable unit 180, the camera section 10 can be rotated in two tilt directions, i.e., can be rotated not only in the panning direction 20 around the panning direction rotation axis 12 that intersects with the optical axis 10 at right angles and that passes through the spherical centroid 70 but also in the tilting direction 21 around the tilting direction rotation axis 11 that intersects with the optical axis 10 and the panning direction rotation axis 12 at right angles. In addition, the camera section 10 can also be rotated in the rolling direction 22 around the optical axis 10.

In particular, since the lower movable portion 102 has such a partially notched spherical shape, the spherical centroid 70 agrees with the center and center of mass of the lower movable portion 102. That is why the movable unit 180 can rotate in all of the panning, tilting and rolling directions 20, 21 and 22 with substantially equal moments. As a result, no matter how much the movable unit 180 has rotated in the panning, tilting and rolling directions 20, 21 and 22, the movable unit 180 can be further rotated with substantially constant driving force in the panning, tilting and rolling directions 20, 21 and 22. Consequently, the movable unit 180 can always be driven highly accurately.

Furthermore, since the spherical centroid 70 (i.e., the center of rotation of the movable unit 180) agrees with the center of mass of the movable unit 180, the movable unit 180 rotates in the panning, tilting and rolling directions 20, 21 and 22 with very small moment. That is why the movable unit 180 can be kept in a neutral state or rotated in the panning, tilting and rolling directions 20, 21 and 22 with only a little driving force. Consequently, the power dissipation of the camera driving apparatus 165 can be cut down. Among other things, the drive current that needs to be supplied to keep the movable unit 180 in the neutral state can be reduced to almost zero.

As can be seen, according to this embodiment, the movable unit 180 that houses the lens section 101 and image sensor driving section 99 inside is supported exclusively at the spherical centroid 70 that defines its center of mass. Consequently, the frictional load can be reduced and the mechanical resonance can also be significantly reduced in the drive frequency range.

In addition, the panning drive magnets 401 and tilting drive magnets 402 apply constant normal force dispersively to between the supporting balls 55 and the convex partial sphere 102R with constant magnetic attractive force without being affected by the angle of rotation. As a result, the variation in frictional load according to the angle of rotation can be minimized and good phase and gain characteristics are realized in the drive frequency range.

Optionally, if the lower movable portion 102 with the convex partial sphere 102R and the supporting ball holders 56 are made of a resin material such as plastic, the friction between the supporting balls 55 and convex partial sphere 102R that contact with each other can be further reduced. Consequently, a supporting structure with excellent abrasive resistance is realized.

The camera driving apparatus 165 typically further includes a stopper member 201 which restricts the movement of the movable unit 180 in order to prevent the movable unit 180 from falling off the fixed unit 300. The stopper member 201 has an anti-fall regulating surface 201A. If the movable unit 180 has moved away from the fixed unit 300, the lower movable portion 102 of the movable unit 180 contacts with the anti-fall regulating surface 201A, thus restricting the movement of the movable unit 180. As shown in FIG. 11B, a predetermined gap (not shown) is left between the convex partial sphere 102R of the lower movable portion 102 and the anti-fall regulating surface 201A of the stopper member 201 so that the lower movable portion 102 can rotate freely in the entire movable range with respect to the spherical centroid 70.

For example, the anti-fall regulating surface 201A may have a concave partial sphere, of which the center agrees with the spherical centroid 70 of the convex partial sphere 102R of the lower movable portion 102. The stopper member 201 is fixed on the contact surface 200B of the base 200. Between the convex partial sphere 102R and the anti-fall regulating surface 201A, a gap has been created while the convex partial sphere 102R of the lower movable portion 102 makes a point contact with the supporting balls 55 of the fixed unit 300 at contact points 102P.

This gap has been determined so that even if the convex partial sphere 102R of the lower movable portion 102 has lost contact with the supporting balls 55, the original state where the convex partial sphere 102R makes a point contact with the supporting balls 55 at those contact points 102P under the magnetic attractive force F1 can be recovered.

That is to say, even if the movable unit 180 has moved upward by a distance that is as long as the gap to bring the anti-fall regulating surface 201A into contact with the convex partial sphere 102R, the movable unit 180 can recover the original state where the convex partial sphere 102R makes a point contact with the supporting balls 55 under the magnetic attractive force F1.

Consequently, this embodiment provides a camera driving apparatus with impact resistance that is high enough to recover the original good supporting state immediately with the magnetic attractive force F1 even if the movable unit 180 has dropped out of its predetermined position momentarily.

Hereinafter, a structure for driving the movable unit 180 will be described in detail.

In the lower movable portion 102, the pair of panning drive magnets 401 is arranged symmetrically with respect to the optical axis 10 in order to rotate and drive the movable unit 180 in the panning direction 20, and the pair of tilting drive magnets 402 is arranged symmetrically with respect to the optical axis 10 in order to rotate and drive the movable unit 180 in the tilting direction 21. In this description, if any member is provided for the fixed unit 300 "symmetrically with respect to the optical axis 10", it means that the member is arranged symmetrically with respect to the optical axis 10 when the movable unit 180 is in the neutral state (i.e., not tilted with respect to the fixed unit 300).

The panning drive magnets 401 have been magnetized at a single pole so as to have a magnetic flux along the tilting direction rotation axis 11. In the same way, the tilting drive magnets 402 have also been magnetized at a single pole so as to have a magnetic flux along the panning direction rotation axis 12.

As described above, the pair of panning magnetic yokes 203 and pair of tilting magnetic yokes 204 are arranged along the circumference of the base 200, of which the center is defined at the optical axis 10, so as to face the pair of panning drive magnets 401 and the pair of tilting drive magnets 402, respectively.

As shown in FIGS. 6A through 9, panning drive coils 301 are wound around each of the two panning magnetic yokes 203 that are arranged on the base 200 along the tilting direction rotation axis 11. In addition, the rolling drive coil 303 is further wound around the panning drive coils 301 in a winding direction that intersects with the winding direction of the panning drive coils 301 at right angles.

In the same way, tilting drive coils 302 are wound around each of the two tilting magnetic yokes 204 that are arranged along the panning direction rotation axis 12 that intersects with the tilting direction rotation axis 11 at right angles. In addition, the rolling drive coil 303 is further wound around the tilting drive coils 302 in a winding direction that intersects with the winding direction of the tilting drive coils 302 at right angles.

In other words, along the circumference of a circle which is drawn around the optical axis 10, the driving sections for the panning, tilting and rolling directions 20, 21 and 22 are arranged dispersively and independently of each other.

By adopting such a structure, magnetic gaps can be left evenly between the panning magnetic yokes 203 and the panning drive magnets 401 and between the tilting magnetic yokes 204 and the tilting drive magnets 402. That is why the flux density can increased evenly in all of those gaps. As a result, the drive efficiency can be increased significantly in the panning, tilting and rolling directions 20, 21 and 22.

Next, it will be described how those tilt and rotation driving sections may have their heights adjusted in the optical axis (10) direction.

As shown in FIG. 10B, the lines 30 and 31 which intersect at right angles with the winding center axes 40, 41 of the tilting drive coils 302 that are wound around the tilting magnetic yokes 204 to be fixed to the base 200 and which pass through the spherical centroid 70 and the respective centers of the tilting drive coils 302 define a tilt angle $\theta p$ of 45 degrees or less downward with respect to a horizontal plane P which intersects with the optical axis 10 at right angles and which passes through the spherical centroid 70. Meanwhile, the pair of tilting drive magnets 402 is arranged tilted with respect to the movable unit 180 so as to face the pair of tilting drive coils 302.

As shown in FIG. 11B, the lines 32 and 33 which intersect at right angles with the winding center axes 42, 43 of the panning drive coils 301 that are wound around the panning magnetic yokes 203 to be fixed to the base 200 and which pass through the spherical centroid 70 and the respective centers of the panning drive coils 301 define a tilt angle $\theta p$ (i.e., tilt angle A) of 45 degrees or less downward with respect to the horizontal plane P which intersects with the optical axis 10 at right angles and which passes through the spherical centroid 70.

Meanwhile, the pair of panning drive magnets 401 is also arranged tilted with respect to the movable unit 180 so as to face the pair of panning drive coils 301. Likewise, the lines which intersect at right angles with the winding center axes of the rolling drive coils 303 and which pass through the spherical centroid 70 and the respective centers of the rolling drive coils 303 also define a tilt angle $\theta r$ (i.e., tilt angle B) of 45 degrees or less downward with respect to the horizontal plane P which intersects with the optical axis at right angles and which passes through the spherical centroid 70.

Furthermore, as shown in FIG. 10B, the winding center axes 40 and 41 become the centerlines of the pair of notches 200T through which the tilting magnetic yokes 204 and the tilting drive coils 302 shown in FIGS. 8 and 9 are inserted into the base 200. As shown in FIG. 11B, the centerlines of the pair of notches 200P through which the panning magnetic yokes 203 and the panning drive coils 301 are inserted also agree with the winding center axes of the panning drive coils 301.

As described above, by setting the tilt angle $\theta p$ to be 45 degrees or less, the height of the fixed unit 300 can be reduced, and the space to be allocated to the driver and the height of the driver can be cut down. The tilt angle θp may be set to fall within the range of 20 to 25 degrees, for example. The same can be said about the tilt angle θr, too.

By supplying electric power to the pair of panning drive coils 301, the pair of panning drive magnets 401 receives the electromagnetic force of the couple, and the lower movable portion 102, i.e., the movable unit 180, is rotated and driven in the panning direction 20 around the panning direction rotation axis 12. In the same way, by supplying electric power to the pair of tilting drive coils 302, the pair of tilting drive magnets 402 receives the electromagnetic force of the couple, and the movable unit 180 is rotated and driven in the tilting direction 21 around the tilting direction rotation axis 11.

Furthermore, by supplying electric power to the panning drive coils 301 and tilting drive coils 302 simultaneously, the movable unit 180 in which the image sensor driving section 99 and the lens section 101 are housed can be tilted two-dimensionally. FIGS. 14, 15A and 15B illustrate a state where by supplying substantially the same amount of current to the panning drive coils 301 and the tilting drive coils 302 simultaneously, the movable unit 180 gets tilted at the same angle in the panning and tilting directions 20 and 21, and eventually gets tilted along the line 14 that forms an angle of 45 degrees with respect to the panning and tilting directions 20 and 21 so as to define a synthetic angle θxy with respect to the optical axis 10.

Also, by supplying electric power to the four rolling drive coils 303, the movable unit 180 receives electromagnetic force in the same rotational direction and is rotated and driven in the rolling direction 22 around the optical axis 10.

As can be seen, according to this embodiment, a moving magnet driving method in which the panning drive magnets 401 and tilting drive magnets 402 are provided for the movable unit 180 is adopted. According to such a configuration, generally there is a concern about an increase in the weight of the movable unit 180. However, according to this configuration, there is no need to provide any suspended cables to tilt and drive the movable unit 180 but just drive signals of the lens section 101 and the image sensor driving section 99, and the output signal of the image sensor 180 need to be transmitted between the movable unit 180 and an external device.

It should be noted that if the image sensor driving section 99 is a wireless camera, just a drive line for the lens section 101 and a power line and a drive line for the image sensor driving section 99 need to be provided.

In addition, the center of mass of the movable unit 180 agrees with its center of rotation. That is why even if the weight increases by introducing those drive magnets, the moment of rotation of the movable unit 180 does not increase so much. That is why according to this embodiment, the advantages of the moving magnet driving method which is usually adopted to tilt and rotate the movable unit 180 can be achieved with the problem caused by an increase in weight avoided.

Next, the drive line and output signal transmitting means for the image sensor driving section 99 will be described.

As shown in FIGS. 7, 12A, 12B, 15A and 15B, the camera driving apparatus 165 includes, as transmission means, a pair of cables 110 which is arranged symmetrically along the line 14 (that defines an angle of 45 degrees with respect to the panning and tilting directions 20 and 21) with respect to the optical axis 10.

Specifically, as shown in FIGS. 1 and 2, first fixing holders 120 which pinch and position the cables 110 are secured to the contact surface 200C of the base 200. Furthermore, the tilted surface 120A of the first fixing holders 120 (see FIG. 1) is tilted downward with respect to the horizontal plane which intersects with the optical axis 10 at right angles and which includes the spherical centroid 70 as shown in FIGS. 12B and 15B.

The back surface of the cables 110 is either bonded to this tilted surface 120A with an adhesive or secured to the tilted surface 120A by being pinched by second fixing holders 130. Furthermore, by securing the first fixing holders 120 to the contact surface 200C of the base 200, the cables 110 are positioned by being pinched between the tilted surface 120A of the first fixing holders 120 (see FIGS. 1 and 2) and the second fixing holders 130.

As a result, the cables 110 are bent downward. As shown in FIG. 15B, even if the movable unit 180 is defining a tilt angle θxy, the cables 110 can still draw gentle curves. Consequently, the reaction of the flexible spring property of the cables 110 on the lower movable portion 102 can be reduced.

In addition, according to the moving magnet driving method, the heat generated by the panning drive coils 301, tilting drive coils 302 and rolling drive coils 303 can be dissipated into the base 200 via the panning magnetic yokes 203 and tilting magnetic yokes 204, which is very advantageous. Furthermore, even if the tilt angles in the panning direction 20 and tilting direction 21 and the angle of rotation in the rolling direction 22 are equal to or greater than 20 degrees, the size and weight of the movable unit 180 can still be reduced, which is beneficial, too. Nevertheless, according to the moving coil driving method, the drive coils could be too big to avoid a significant increase in the weight of the fixed unit 300.

As can be seen, according to this embodiment, the lens section 101, image sensor driving section 99, lower movable portion 102, convex partial sphere 102R and anti-fall regulating surface 201A of the lower movable portion 102, supporting balls 55 provided for the base 200, tilting and driving section, rotation driving section and tilt detecting magnet 406 are all configured so that their center axis passes through the spherical centroid 70 that is their supporting and driving center.

As a result, the center of mass of the movable unit 180 agrees with the spherical centroid 70 and the movable unit 180 is supported at its center of mass. Consequently, it is possible to rotate and drive the movable unit 180 around three axes that pass through the center of mass and that intersect with each other at right angles while preventing the movable unit 180 from falling.

Optionally, the camera driving apparatus 165 may include a viscous member (not shown) in order to reduce the index of amplitude augmentation (i.e., Q value) of the movable unit 180. In that case, as shown in FIGS. 10B and 11B, the viscous member may be provided between the convex partial sphere 102R of the lower movable portion 102 and the concave spherical surface 200A of the base 200 or the anti-fall regulating surface 201A of the stopper member 201. As a result, it is possible to reduce the index (Q value) of amplitude augmentation of the vibration or the Q value of the mechanical natural vibration to be produced between the panning and tilting drive magnets 401, 402 of the movable unit 180 and the panning and tilting magnetic yokes 203, 204 of the base 200 due to a magnetic spring effect caused by a variation in magnetic attractive force that has been produced by tilt and rotation. Consequently, good controllability can be achieved.

Optionally, in the entire movable range of the movable unit 180, the surface of the convex partial sphere 102R of the lower movable portion 102 may have unevenness (not shown) in a region where there are no locus of the contact point 102P. As the area of contact with the viscous member increases due to the presence of the unevenness, the viscous resistance increases. As a result, the viscous damping characteristic improves significantly.

Hereinafter, it will be described how to detect the tilt and rotation of the movable unit 180. First of all, it will be described in detail how to detect the tilt angle of the movable unit 180 in the panning and tilting directions 20 and 21 thereof.

As shown in FIGS. 1, 2, 8 and 9, the camera driving apparatus 165 includes a first magnetic sensor 501 as a first detector to detect the tilt angle of the movable unit 180. The first magnetic sensor 501 can detect a tilt or rotation around two axes and is arranged so as to face the tilt detecting magnet 406 which has been magnetized at a single pole in the optical axis (10) direction. The first magnetic sensor 501 is inserted into the hole 200H and fixed to the base 200 via a circuit board 502.

Also, as shown in FIGS. 1 and 12B, the circuit board 502 is fixed to the base 200 at three points with adjusting screws and compression springs 600. If the three adjusting screws are turned, the relative tilt and distance of the first magnetic sensor 501 with respect to the tilt detecting magnet 406 change. As a result, the tilt output signal of the first magnetic sensor 501 can be adjusted to the best one.

Also, one pair of first magnetic sensors 501 is arranged symmetrically to each other on the tilting direction rotation axis 11 around the optical axis 10 and another pair of first magnetic sensors 501 is arranged symmetrically to each other on the panning direction rotation axis 12 around the optical axis 10. The first magnetic sensors 501 can calculate panning and tilting tilt angles by detecting the variation in the magnetic force of the tilt detecting magnet 406 to be produced by the tilting operation of the movable unit 180 in the panning and tilting directions 20 and 21 as a difference between biaxial components.

Optionally, one pair of first magnetic sensors 501 may be arranged symmetrically to each other along a line 13 which defines an angle of 45 degrees with respect to the tilting direction rotation axis 11 and panning direction rotation axis 12 and another pair of first magnetic sensor 501 may be arranged symmetrically along a line 14 which also defines an angle of 45 degrees with respect to the tilting and panning direction rotation axes 11, 12 as shown in FIG. 1.

As can be seen, according to this embodiment, the interval between the tilt detecting magnet 406 and the spherical centroid 70 can be shortened, the distance to go for the tilt detecting magnet 406 can be shortened for the tilt angle, and therefore, the size of the first magnetic sensors 501 can be reduced.

In addition, according to this embodiment, by arranging the first magnetic sensors 501 along the lines 13 and 14, the best panning and tilting tilt angles can be calculated without being affected by a magnetic field to be generated by supplying electric power to the panning drive coils 301 and tilting drive coils 302.

In the embodiment described above, the first detector is supposed to include the first magnetic sensors 501 and the tilt detecting magnet 406. However, the first detector may have any other configuration. For example, the first detector may include a photosensor which is provided for the fixed unit 300 and a photosensing pattern provided for the movable unit 180 on the optical axis 10. As the movable unit 180 tilts, the photosensing pattern also tilts, and therefore, the light to be incident on the photosensor varies. By sensing this variation in light, the photosensor can also calculate two-dimensional tilt angles in the panning and tilting directions as well.

Next, a second detector will be described.

The second detector detects the angle of rotation of the movable unit 180 in the rolling direction 22 around the optical axis 10. As shown in FIGS. 16A, 16B and 16C, the second detector includes the pair of tilting drive magnets 402 mounted on the movable unit 180 and a pair of second magnetic sensors 700 which is provided for the base 200 so as to face the pair of tilting drive magnets 402.

If the movable unit 180 rotates in the rolling direction 22, the pair of tilting drive magnets 402 also rotates to cause a steep variation in magnetic pole with respect to the second magnetic sensors 700. That is why by making the second magnetic sensors 700 detect such a steep magnetic pole variation involved with the rotation in the rolling direction 22, the angle of rotation in the rolling direction 22 can be detected highly accurately. Although the tilting drive magnets 402 are supposed to form part of the second detector in this embodiment, the panning drive magnets 401 may form part of the second detector instead.

Next, shooting orientations of the camera driving apparatus 165 will be described with reference to FIGS. 20A and 20B.

FIG. 20A illustrates a certain shooting orientation of the camera driving apparatus 165 described above. The tilting direction rotation axis 11 is parallel to a reference horizontal plane HS at the subject but the panning direction rotation axis 12 is perpendicular to the reference horizontal plane HS. Even in such a shooting orientation, the camera can naturally be driven well.

FIG. 20B illustrates another shooting orientation of the camera driving apparatus 165. In this case, both the tilting direction rotation axis 11 and the panning direction rotation axis 12 define a tilt angle of 45 degrees with respect to a reference horizontal plane HS at the subject.

According to the shooting orientation shown in FIG. 20B, if the movable unit 180 needs to be driven in the direction parallel to the reference horizontal plane HS (i.e., if the movable unit 180 needs to be panning driven), the movable unit 180 can be driven in the original panning direction 20 shown in FIG. 20A by supplying electric power to both the panning drive coils 301 and the tilting drive coils 302, which is one of the advantages achieved by the shooting orientation shown in FIG. 20B. On the other hand, if the movable unit 180 needs to be driven in the direction perpendicular to the reference horizontal plane HS at the subject (i.e., if the movable unit 180 needs to be tilting driven), the movable unit 180 can be driven in the original tilting direction 21 shown in FIG. 20A by supplying electric power to both the panning drive coils 301 and the tilting drive coils 302, which is another one of the advantages achieved by the shooting orientation shown in FIG. 20B.

That is to say, by supplying electric power to the two pairs of coils when the movable unit needs to be driven in the panning and tilting directions in which shooting sessions should be carried out frequently, the movable unit can be driven in the original panning and tilting directions 20 and 21 shown in FIG. 20A.

As a result, if the panning drive coils 301 and tilting drive coils 302 are driven, the angles of rotation of the movable unit 180 along the panning direction rotation axis 12 and tilting direction rotation axis 11 shown in FIG. 20B become $1/\sqrt{2}$ times as large as the angles of rotation of the movable unit 180 in the original panning and tilting directions shown in FIG. 20A.

Thus, according to the shooting orientation shown in FIG. 20B, the angle of rotation when driven in the original panning and tilting directions in which shooting should be carried out very frequently increases $1/\sqrt{2}$ times. Consequently, the magnetic spring effect of the magnetic attractive force to be produced between the drive magnets provided for the movable unit 180 and the magnetic yokes provided for the fixed unit 300 can be reduced, and the camera can be driven just as intended.

As can be seen, in the camera driving apparatus 165 of this embodiment, the spherical centroid 70 of the convex partial sphere 102R provided for the movable portion of the movable unit 180 is defined on the optical axis of the lens of the camera section 100. In addition, the center axis of the supporting balls 55 which are arranged along the circumference of the fixed unit 300 passes through the spherical centroid 70. As a result, a structure for supporting the movable unit 180 at its center of mass is realized, and the mechanical resonance can be reduced significantly in the drive frequency range.

Also, constant normal force can be applied as magnetic attractive force that is not affected by the angle of rotation of the movable unit 180 to a three-point supporting structure formed by the supporting balls 55 of the fixed unit 300 and the convex partial sphere 102R of the movable unit 180. As a result, the variation in frictional load with the angle of rotation can be reduced and good phase and gain characteristics are realized in the drive frequency range.

In addition, in order to prevent the movable unit 180 from falling even when exposed to some disturbance such as vibration or impact, which is a serious problem peculiar to a conventional supporting structure that uses magnetic attractive force, the stopper member 201 provided for the fixed unit 300 has an anti-fall regulating surface 201A with a predetermined gap which is wide enough for the movable unit 180 to rotate left. As a result, it is possible to prevent the movable unit 180 from falling just as intended while avoiding increasing the size of the driver too much.

Also, even if the movable unit 180 has fallen to the point that the convex partial sphere 102R of the movable unit 180 contacts with the anti-fall regulating surface 201A of the fixed unit 300, the position of the anti-fall regulating surface 201A may be determined so that the convex partial sphere 102R of the movable unit 180 and the supporting balls 55 of the fixed unit 300 can recover their point contact under the magnetic attractive force. Consequently, this embodiment provides a camera driving apparatus with impact resistance that is high enough to recover the original good supporting state immediately even if the movable unit 180 has fallen momentarily.

Furthermore, the driving sections provided in the panning, tilting and rolling directions include two pairs of drive magnets which are fixed to the movable unit 180 and arranged on two orthogonal lines on a plane that intersects with the optical axis at right angles, and two pairs of drive coils which are provided for the fixed unit 300 along a circumference of a circle, of which the center is the optical axis, so as to face the two pairs of drive magnets.

These drive magnets and drive coils are arranged at a lower level in the optical axis direction than the horizontal plane including the spherical centroid 70 so as to define a tilt angle with respect to the horizontal plane. As a result, the movable unit 180 can be driven at the spherical centroid 70 and can have its height reduced.

In addition, by making the movable unit 180 and base 200 of a resin material or by coating the surface portions of the convex partial sphere 102R and supporting ball holder 56 with a resin member, a supporting structure with low friction and good abrasion resistance is realized.

Furthermore, the gap to be left between the convex partial sphere 102R of the movable unit 180 and the concave spherical inner surface of the base or the anti-fall regulating surface 201A may be filled with a viscous member. Then, the index (Q value) of the amplitude augmentation of the variation or the Q value of the mechanical natural vibration to be produced between the drive magnets of the movable unit 180 and the magnetic yokes of the fixed unit 300 due to the magnetic spring effect caused by a variation in the magnetic attractive force can be reduced. As a result, good controllability can be achieved.

Consequently, the camera driving apparatus 165 of this embodiment can tilt the movable unit 180 by as large an angle as ±10 degrees or more in the panning and tilting directions 20 and 21, for example, and can rotate the movable unit 180 by as large an angle as ±10 degrees or more in the rolling direction 22. In addition, the camera driving apparatus 165 can carry out a shake compensation control in a broad frequency range to about 50 Hz.

Furthermore, by providing means for shifting the lens 105 in the optical axis direction with respect to the movable unit 180, the nodal point of the lens can agree with the spherical centroid that is the physical center of rotation of the entire camera section 100 highly accurately. Consequently, even if the camera section 100 has been rotated and shifted in the panning direction 20 or the tilting direction 21, the shooting session can still be carried out from the nodal point that does not vary, and therefore, fine adjustment work can be cut down significantly when panorama synthetic shooting is carried out, for example.

In addition, by eliminating a blurry image to be generated as a byproduct due to a shift of the nodal point when the camera section 10 is moved in the panning direction 20 or the tilting direction 21, walking blurred images can naturally be further reduced overall.

Meanwhile, by intentionally offsetting the nodal point of the lens from the spherical centroid 70 that is the physical center of rotation of the camera section 100, an approximate distance to the subject can be calculated and measured based on the magnitude of the significant image blur generated.

Furthermore, by providing the image sensor driving section 99 for moving the image sensor 108 two-dimensionally with respect to the movable unit 180 within a plane which intersects with the optical axis direction at right angles, the two-dimensional position of the image sensor 108 can be controlled more accurately within the plane that intersects with the optical axis direction at right angles. As a result, the camera shake compensation in the translational direction, which has been difficult to get done according to the rotational drive shake compensation method, can get done on a pixel-by-pixel basis by driving the image sensor.

Consequently, high-speed panning, tilting and rolling operations can be performed on the camera section. In addition, by matching the nodal point perfectly to the spherical centroid that is the physical center of rotation of the camera section, the image blur to be caused to an image shot by the walking blur while a shooting session is carried out by a user who is walking can be compensated for and the image blur caused by the shake compensation operation can also be cut down. Furthermore, by providing the image sensor driving section for moving the image sensor two-dimensionally within a plane which intersects with the optical axis direction at right angles, not only can a three-axis direction shake compensation control be performed on the movable unit but also can the camera shake compensation be carried out in the translational direction of the camera as well. Also, since this camera driving apparatus has a small and robust stopper structure, a camera driving apparatus which exhibits high resistance to external shocks such as vibrations and the impact caused by dropping is realized.

On top of that, as driving means for shifting the lens 105 in the optical axis direction with respect to the movable unit 180, the panning drive magnets and the tilting drive magnets can be used in combination as drive magnets.

Furthermore, the driving means for shifting the image sensor 108 with respect to the movable unit 180 may also use the tilt detecting magnet 406 as a drive magnet, too.

In addition, the detecting means for detecting the magnitude of shift of the image sensor 108 with respect to the movable unit 180 may also use the tilt detecting magnet 406 as a magnet for detecting the magnitude of shift. As can be seen, according to this embodiment, the same magnet may be shared in common by both the driving means and the detecting means. As a result, the overall size and the number of parts of the camera driving apparatus 165 can both be cut down.

Moreover, the rolling drive coils have a crossed winding structure so as to be stacked on, and wound perpendicularly to, the coil winding direction of the pair of panning drive coils 301 that is wound around the pair of panning magnetic yokes, and to be stacked on, and wound perpendicularly to, the coil winding direction of the pair of tilting drive coils 302 that is wound around the pair of tilting magnetic yokes. Consequently, the space to be allocated to the fixed unit 300 and the size and number of parts thereof can all be reduced.

As can be seen, the camera driving apparatus 165 of this embodiment can perform high-speed panning, tilting and rolling operations on the camera section 100, can perform a shake compensation in the translational direction on a pixel-by-pixel basis, and can compensate very well for the image blur to be caused to an image shot by a camera shake while a shooting session is carried out by a user who is walking.

On top of that, by performing high-speed panning, tilting and rolling operations on the camera section 100 in a broad frequency range, even a subject who is moving quickly can also be tracked and shot.

What is more, by using the small and robust stopper structure, a camera driving apparatus which exhibits high resistance to external shocks such as vibrations and the impact caused by dropping is realized.

Embodiment 2

Hereinafter, a second embodiment of a camera driving apparatus according to the present invention will be described.

Figure 21:
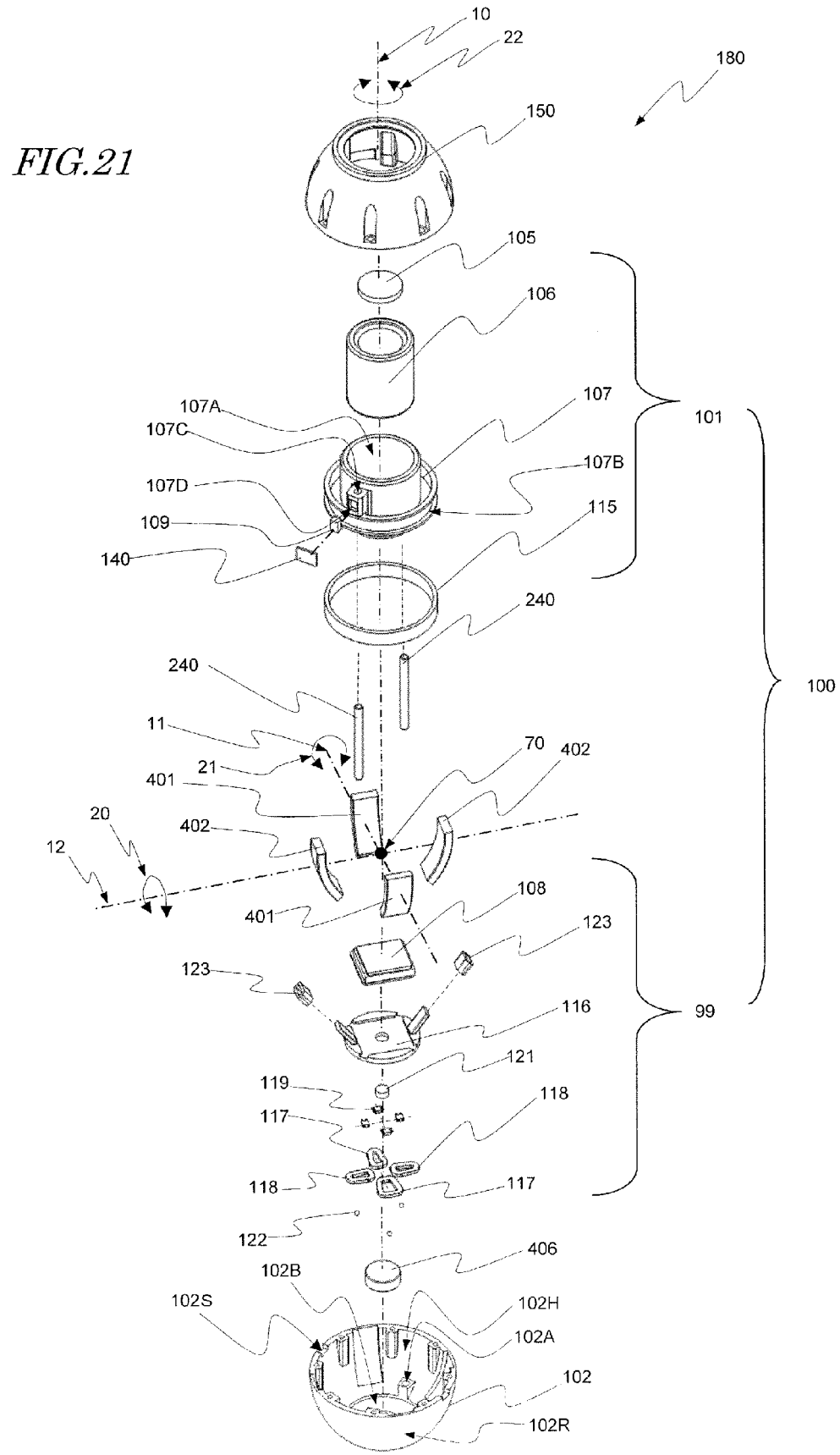
FIG. 21 is an exploded perspective view illustrating a detailed configuration for a movable unit 180 according to a second embodiment of the present invention.

FIG. 21 is an exploded perspective view illustrating a detailed configuration for a movable unit 180 according to the second embodiment of the present invention.

FIGS. 22A and 22B are respectively a top view of the camera driving apparatus 165 and a cross-sectional view thereof as viewed on a plane including the optical axis 10 and a panning direction rotation axis 12.

Figure 23A:
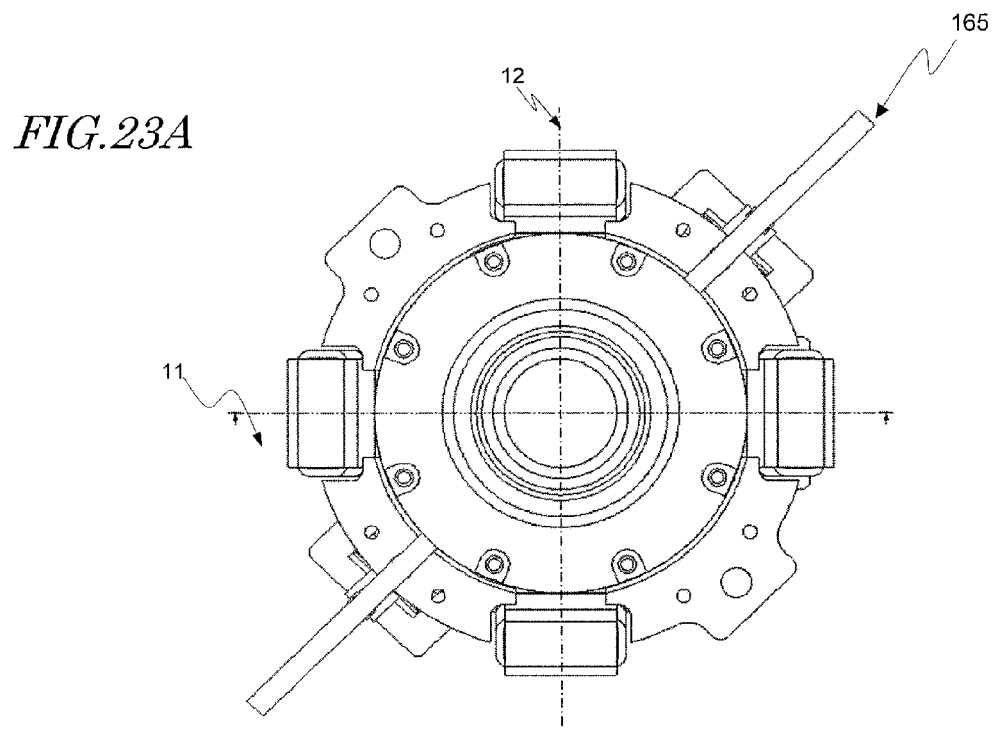
FIG. 23A is a top view of the camera driving apparatus 165 according to the second embodiment of the present invention.
Figure 23B:
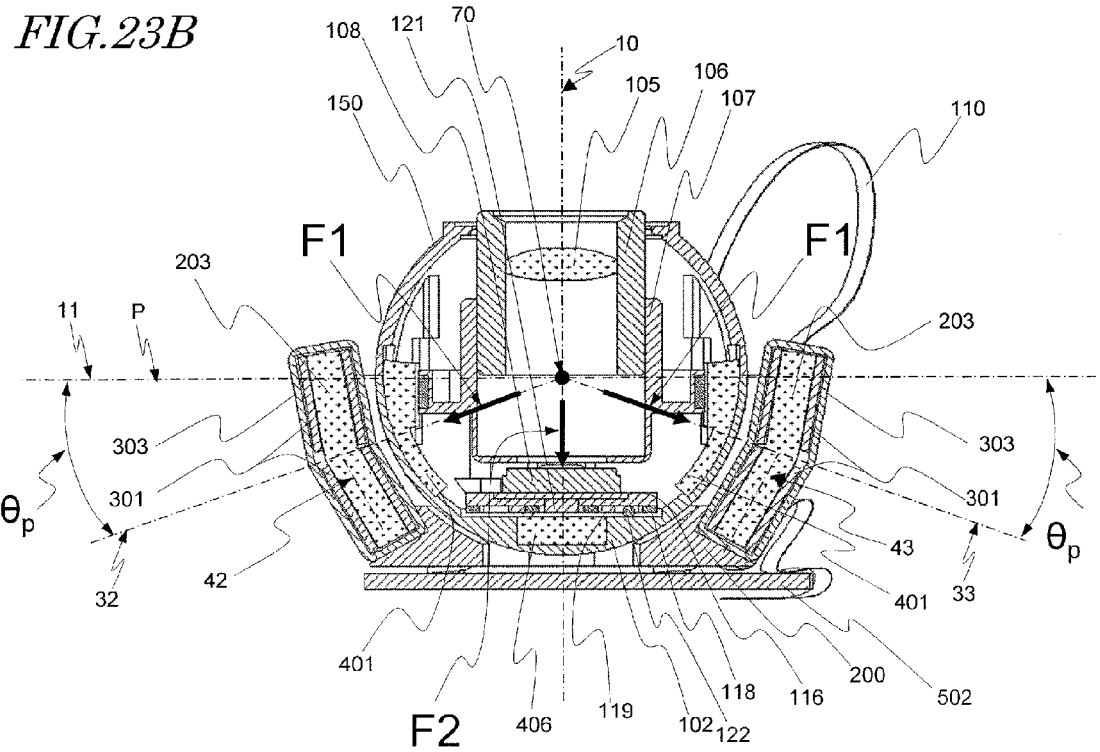
FIG. 23B is a cross-sectional view of the camera driving apparatus 165 according to the second embodiment of the present invention as viewed on a plane including the optical axis 10 and a tilting direction rotation axis 11.

FIGS. 23A and 23B are respectively a top view of the camera driving apparatus 165 and a cross-sectional view thereof as viewed on a plane including the optical axis 10 and a tilting direction rotation axis 11.

FIGS. 24A and 24B are respectively a top view of the camera driving apparatus 165 and a cross-sectional view thereof as viewed on a plane including the optical axis 10 and a line 14.

Figure 25A:
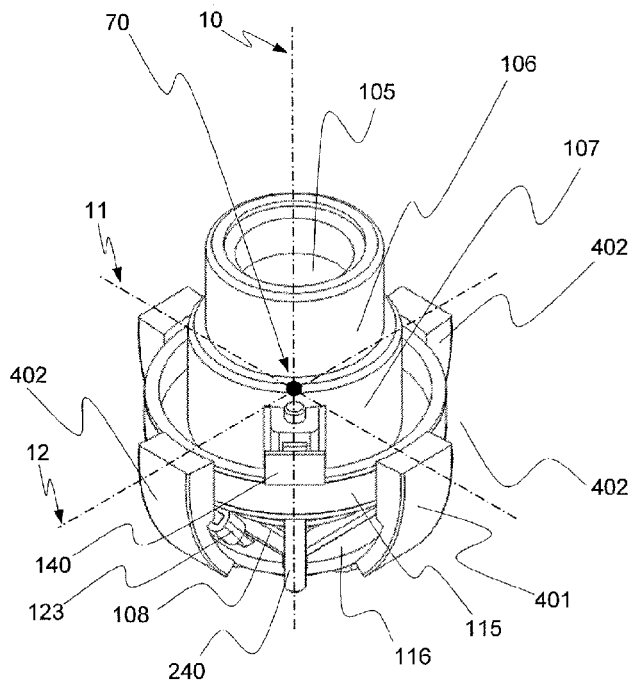
FIG. 25A is a perspective view illustrating respective parts of a lens driving section and an image sensor driving section 99 according to the second embodiment of the present invention as viewed from above them.

FIG. 25A is a perspective view of a lens section 101, an image sensor 108, an image sensor holder 116, panning drive magnets 401 and tilting drive magnets 402 as viewed from above them.

Figure 25B:
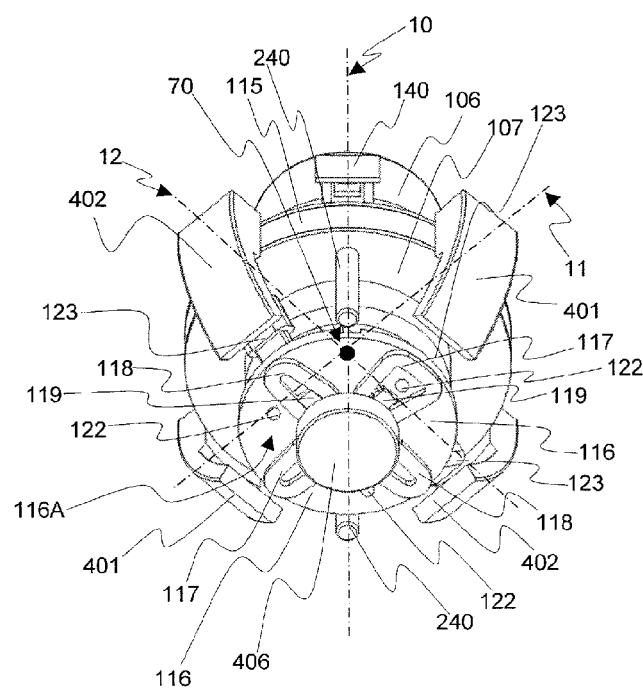
FIG. 25B is a perspective view illustrating respective parts of the lens driving section and image sensor driving section 99 according to the second embodiment of the present invention as viewed from below them.

FIG. 25B is a perspective view of the lens section 101, the image sensor 108, the image sensor holder 116, image sensor drive coils 117, 118, image sensor rotating drive coils 123, the panning drive magnets 401 and the tilting drive magnets 402 as viewed from below them.

Figure 25C:
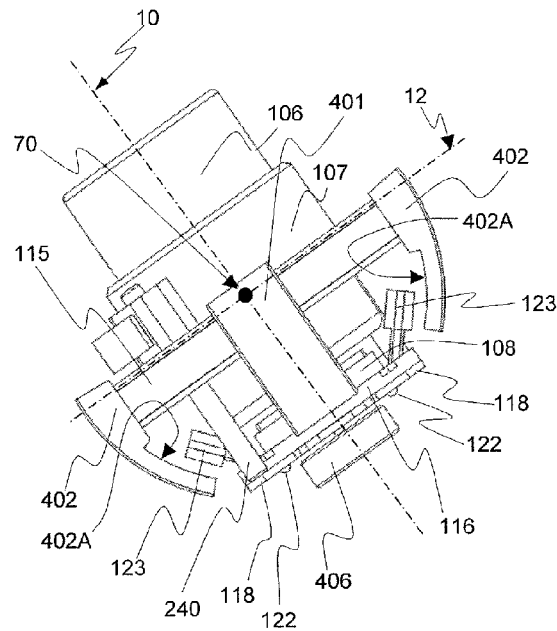
FIG. 25C is another perspective view illustrating respective parts of the lens driving section and image sensor driving section 99 according to the second embodiment of the present invention as viewed from below them.

FIG. 25C is another perspective view of the lens section 101, the image sensor 108, the image sensor holder 116, the image sensor drive coil 118, the image sensor rotating drive coils 123, the panning drive magnets 401 and the panning drive magnets 401 as viewed from below them.

Figure 26A:
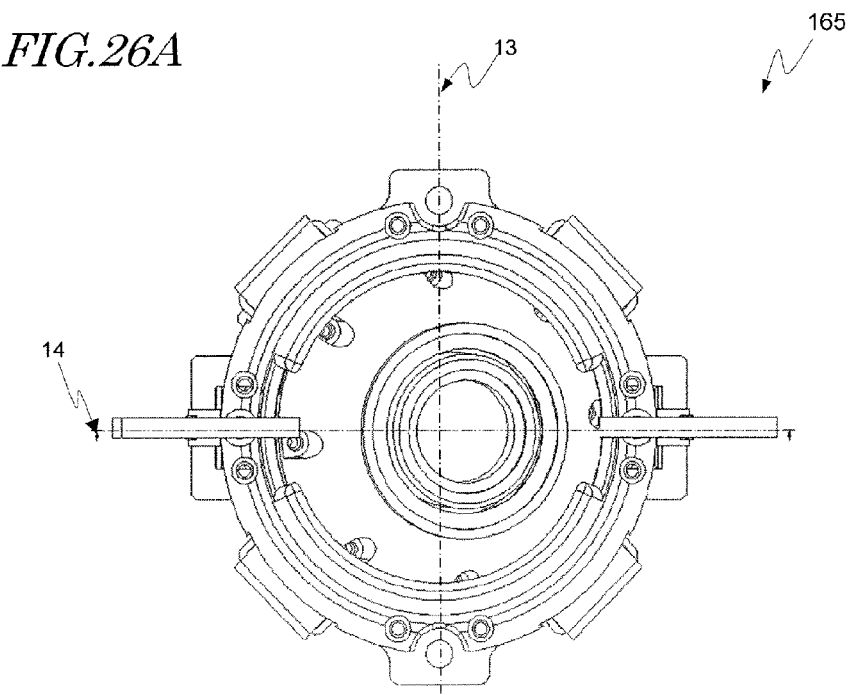
FIG. 26A is a top view of the camera driving apparatus 165 according to the second embodiment of the present invention in a state where the movable unit 180 is tilted to the same degree (at a synthetic angle θxy) in the panning direction 20 and tilting direction 21.
Figure 26B:
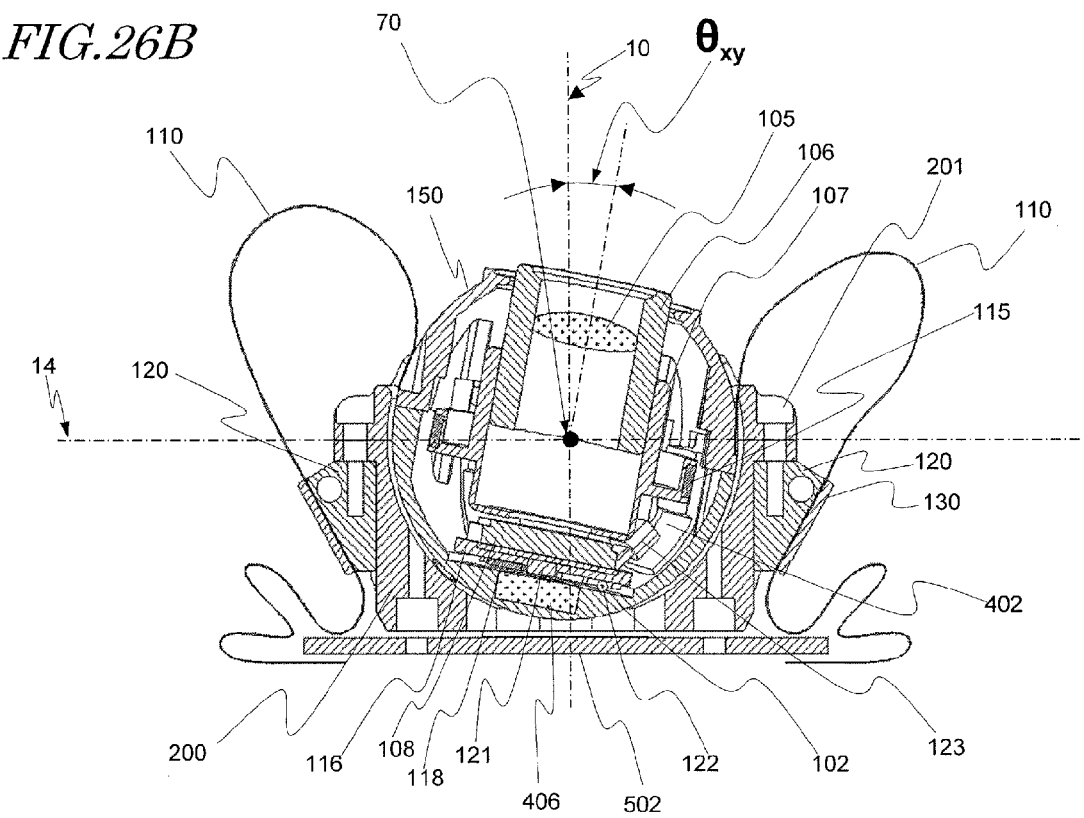
FIG. 26B is a cross-sectional view thereof according to the second embodiment of the present invention as viewed on a plane including the optical axis 10 and the line 14 in a state where the movable unit 180 is tilted to the same degree (at a synthetic angle θxy) in the panning direction 20 and tilting direction 21.

FIG. 26A is a top view of the camera driving apparatus 165. FIG. 26B is a cross-sectional view of the camera driving apparatus 165 as viewed on a plane including the optical axis 10 and the line 14 in a state where the movable unit 180 is tilted to the same degree (at a synthetic angle θxy) in the panning direction 20 and tilting direction 21.

Hereinafter, a typical configuration for this camera driving apparatus 165 will be described with reference to these drawings.

In the image sensor driving section 99 of this embodiment, the image sensor holder 116 includes image sensor rotating drive coils 123 as shown in FIGS. 21, 25A, 25B and 25C, which is a major difference from the first embodiment.

As shown in FIG. 21, the lens section 101 includes a lens 105 which has the optical axis 10 to produce a subject image on the imaging plane of an image sensor 108, a lens holder 106 to hold the lens 105, and a lens barrel 107 to support the lens holder 106.

Meanwhile, the image sensor driving section 99 includes the image sensor 108, an image sensor holder 116 to hold the image sensor 108, a magnetic member 121 fixed to the image sensor holder 116, image sensor drive coils 117 and 118, and image sensor rotating drive coils 123.

The driving means for shifting the lens barrel 107 in the optical axis (10) direction and means for detecting the magnitude of its shift and the driving means for shifting the image sensor 108 two-dimensionally within a plane that intersects with the optical axis 10 at right angles and means for detecting the magnitude of its shift may be the same as what has already been described for the first embodiment, and a detailed description thereof will be omitted herein.

As shown in FIGS. 25B and 25C, the pair of image sensor rotating drive coils 123 is fixed onto the image sensor holder 116 so as to leave a gap with the inner curved surfaces 402A (i.e., closer to the spherical centroid 70) of the pair of tilting drive magnets 402 that is fixed to the movable unit 180 and to face the tilting drive magnets 402.

Alternatively, the pair of image sensor rotating drive coils 123 may be fixed onto the image sensor holder 116 so as to leave a gap with the inner curved surfaces (i.e., closer to the spherical centroid 70) of the pair of panning drive magnets 401 that is fixed to the movable unit 180 and to face the panning drive magnets 401.

The winding center axis of the image sensor rotating drive coils 123 is on a plane including the optical axis 10 and the panning direction rotation axis 12 and defines a predetermined tilt angle with respect to the optical axis 10.

That is why if electric power is supplied to the pair of image sensor rotating drive coils 123, the image sensor holder 116 on which the image sensor 106 is mounted will receive electromagnetic force from the pair of tilting drive magnets 402 and will be rotated and driven on the optical axis 10.

Consequently, the image sensor 108 can be shifted linearly along the tilting direction rotation axis 11 and along the panning direction rotation axis 12 and can be rotated on the optical axis 10, too.

According to this second embodiment, the image sensor 108 can be rotated on the optical axis 10, and therefore, compensation can be carried out in the rolling direction 22 on a pixel-by-pixel basis. As a result, while performing rotation blur compensation macroscopically by driving the entire movable unit 180 in the rolling direction 22, a residual subtle rotation blur of the image can be compensated for microscopically. By controlling the image sensor on a pixel-by-pixel basis in this manner, a camera driving apparatus which can produce a high-quality image can be provided.

The other effects to be achieved by this embodiment are the same as the ones of the first embodiment.

Embodiment 3

Hereinafter, a third embodiment of a camera driving apparatus according to the present invention will be described.

Figure 27:
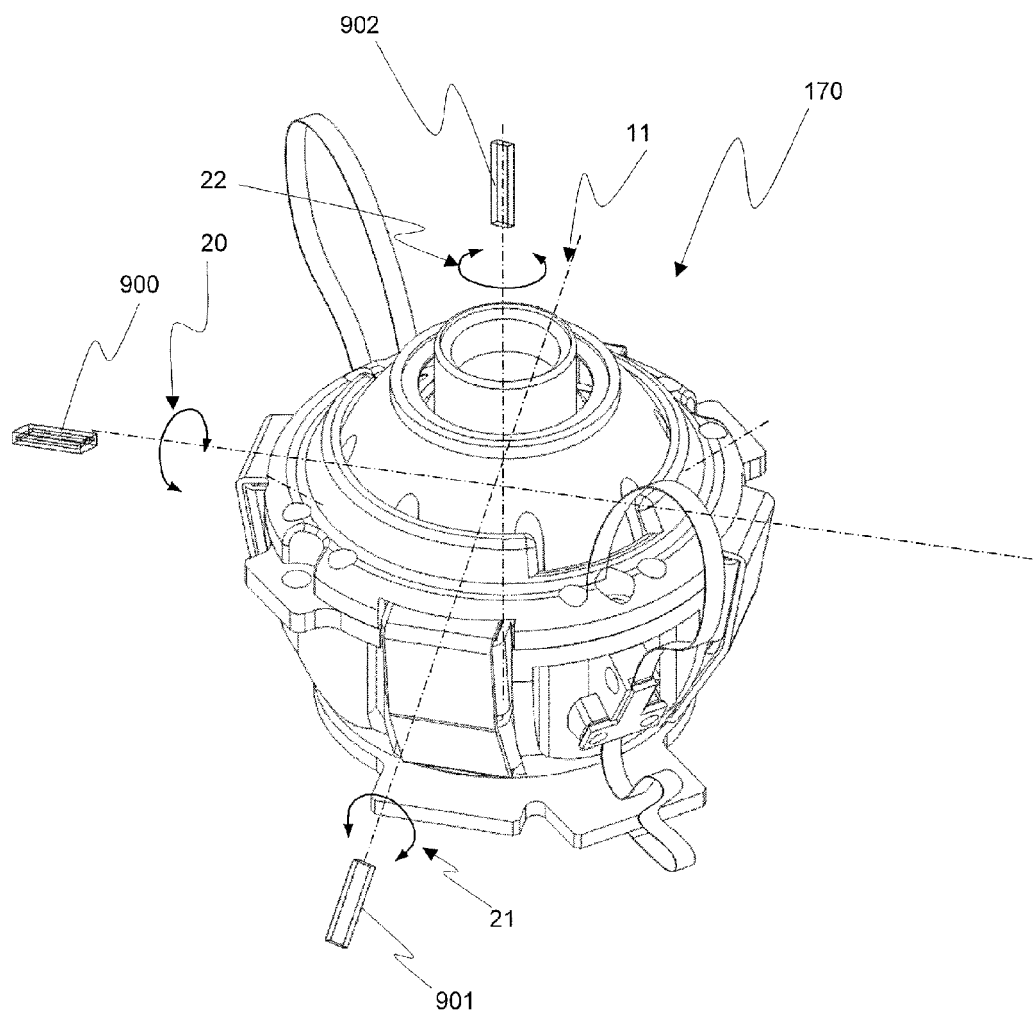
FIG. 27 is a perspective view illustrating an arrangement of angular velocity sensors 900, 901 and 902 provided for a camera unit 170 according to a third embodiment of the present invention.
Figure 28:
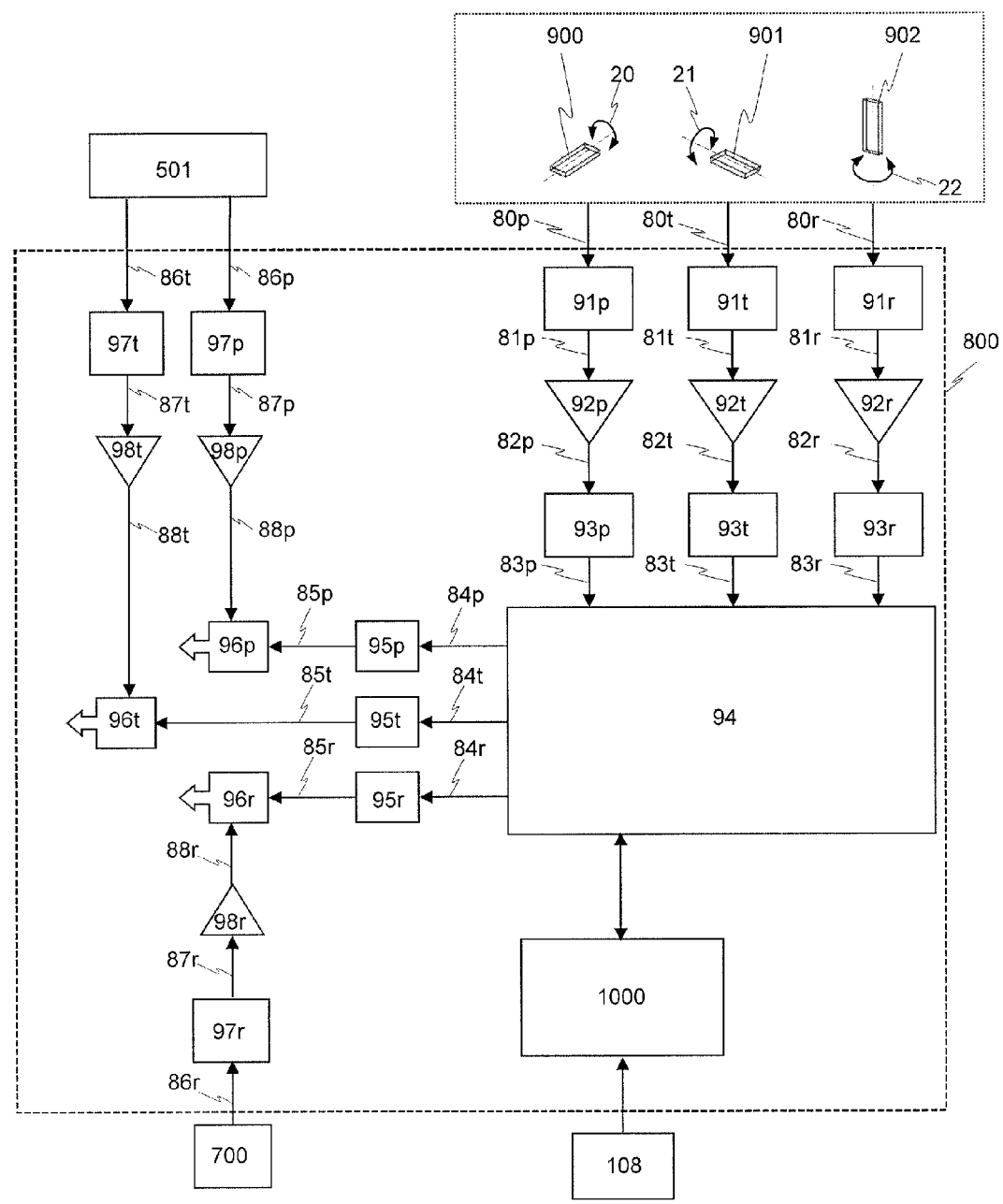
FIG. 28 is a block diagram illustrating a configuration for the camera unit 170 according to the third embodiment of the present invention.

FIG. 27 is a perspective view illustrating an arrangement of angular velocity sensors 900, 901 and 902 provided for a camera unit 170 according to the third embodiment of the present invention. FIG. 28 is a block diagram of the camera unit 170.

An embodiment of a camera unit according to the present invention will be described. The camera unit 170 according to the third embodiment of the present invention includes a camera driving apparatus 165 and a control section 800 and can compensate for an image blur to be produced during a shooting session performed by a person who is walking.

As shown in FIGS. 27 and 28, the camera unit 170 includes a camera driving apparatus 165, angular velocity sensors 900, 901, 902 and a control section 800. The control section 800 typically includes an arithmetic processing section 94, an image processing section 1000, analog circuits 91p, 91t, 91r, amplifier circuits 92p, 92t, 92r, A/D converters 93p, 93t, 93r, D/A converters 95p, 95t, 95r, driver circuits 96p, 96t, 96r, analog circuits 97p, 97t, 97r, and amplifier circuits 98p, 98t, 98r. However, this is just an exemplary embodiment of the present invention. Alternatively, the analog circuits 97p, 97t, 97r and amplifier circuits 98p, 98t, 98r may also be provided for the camera driving apparatus 165. Optionally, the angular velocity sensors 900, 901, 902, analog circuits 91p, 91t, 91r, amplifier circuits 92p, 92t, 92r and A/D converters 93p, 93t, 93r may form an angular velocity sensor module (not shown), which may be electrically connected to the arithmetic processing section 94.

The arithmetic processing section 94 controls the entire camera unit 170, and may be implemented as combination of a ROM which stores program information and a CPU which processes the program information, for example. The ROM may store an autofocus (AF) control program, an auto-exposure (AE) control program, and a program to control the overall operation of the camera unit 170, for example.

The image processing section 1000 receives the captured image data from the image sensor 108 and subjects the captured image data to various kinds of processing, thereby generating image data. Examples of those various kinds of processing include gamma correction, white balance correction, YC conversion, electronic zooming, compression and expansion. However, these are just examples. The image processing section 1000 is typically an imaging signal processor (ISP). Optionally, the arithmetic processing section 94, the image processing section 1000 and other circuit components may be implemented as a single semiconductor chip.

The angular velocity sensors 900, 901 and 902 are attached to either the base 200 of the camera driving apparatus 165 or a camera unit body (not shown) to which the base 200 is fixed. These angular velocity sensors 900, 901 and 902 detect the angular velocities around the axes that are indicated by the dotted lines in FIG. 28. Specifically, the angular velocity sensors 900, 901 and 902 detect angular velocities in the panning, tilting and rolling directions 20, and 22, respectively. Although FIG. 27 illustrates an exemplary configuration in which three independent angular velocity sensors 900, 901, 902 are used, a single angular velocity sensor which can detect angular velocities around three axes may be used instead. Also, as long as the angular velocity sensors can detect angular velocities around three axes that intersect with each other at right angles, those three axes do not always have to agree with the panning, tilting and rolling directions 20, 21 and 22. If the axes of the angular velocities detected by the angular velocity sensors do not agree with the panning, tilting and rolling directions 20, 21, 22, then the arithmetic processing section 94 may convert accelerations detected in the respective axis directions into angular velocities in the panning, tilting and rolling directions 20, 21 and 22, respectively.

For example, the angles of the shake in the panning and tilting directions 20 and 21 caused by a camera shake during a shooting session may be detected by the angular velocity sensors 900 and 901, respectively. On the other hand, a shift angle of the shake in the rolling direction 22 caused by a shift of the center of mass of a person who is shooting while walking may be detected by the angular velocity sensor 902. As shown in FIG. 28, information about the angles of the shake that have been detected by the angular velocity sensors 900, 901 and 902 is output as angular velocity signals 80p, 80t and 80r, respectively.

The angular velocity signals 80p, 80t, 80r are converted into signals to be easily processed by the arithmetic processing section 94. Specifically, the analog circuits 91p, 91t, 91r remove noise components and DC drift components from the angular velocity signals 80p, 80t, 80r and output the noise reduced signals to the amplifier circuits 92p, 92t, 92r, which output angular velocity signals 82p, 82t, 82r with appropriate values in response. Thereafter, the A/D converters 93p, 93t, 93r convert the angular velocity signals 82p, 82t, 82r that are analog signals into digital signals and output the digital signals to the arithmetic processing section 94.

The arithmetic processing section 94 performs integration processing to transform the angular velocities into camera shake angles, thereby calculating the angles of camera shake in the panning, tilting and rolling directions 20, 21 and 22 sequentially. The arithmetic processing section also performs three-axis shake compensation processing, which is carried out as an open loop control to drive the movable unit 180 so as to regulate the angular velocities in accordance with the angular velocity signals 83p, 83t, 83r that have been detected by the angular velocity sensors 900, 901 and 902, respectively. The arithmetic processing section sequentially outputs target rotation angle signals 84p, 84t, 84r indicating the magnitude of the best digital shake compensation while taking the frequency response characteristic of the camera driving apparatus 165, the phase compensation and gain correction into consideration.

The D/A converters 95p, 95t, 95r convert the target rotation angle signals 84p, 84t, 84r that are digital signals into target rotation angle signals 85p, 85t, 85r that are analog signals and output the signals 85p, 85t, 85r to the driver circuits 96p, 96t, 96r, respectively.

Meanwhile, in the camera driving apparatus 165, the first and second magnetic sensors 501 and 700 which detect the angle of rotation of the movable unit 180 with respect to the base 200 output rotation angle signals 86p, 86t, 86r in the panning, tilting and rolling directions 20, 21, 22. The analog circuits 97p, 97t, 97r remove noise components and DC drift components from the rotation angle signals 86p, 86t, 86r and output rotation angle signals 87p, 87t, 87r. The amplifier circuits 98p, 98t, 98r amplify the rotation angle signals 87p, 87t, 87r and output rotation angle signals 88p, 88t, 88r with appropriate values to the driver circuits 96p, 96t, 96r.

The driver circuits 96p, 96t, 96r are feedback circuits which are configured to feed back the rotation angle signals 88p, 88t, 88r to the target rotation angle signals 85p, 85t, 85r. That is why when no external force is acting on the camera unit 170, the driver circuits 96p, 96t, 96r control the angles of the movable unit 180 in the panning, tilting and rolling directions 20, 21, 22 so as to obtain predetermined rotational angle positions. Based on the target rotation angle signals 85p, 85t, 85r and rotation angle signals 88p, 88t, 88r, the driver circuits 96p, 96t, 96r output drive signals to drive the panning drive coils 301, the tilting drive coils 302 and the rolling drive coils 303. In this manner, the camera driving apparatus 165 performs a feedback control on the angular positions of the movable unit 186 and drives the movable unit 180 so that the rotation angle signals 88p, 88t, 88r become equal to the target rotation angle signals 85p, 85t, 85r, respectively.

By performing this series of drive controls, a shake compensation can be carried out on the camera section 100 and a shooting session can also be carried out with good stability even by a person who is walking.

A control system which operates based mainly on the rotation angle signals that have been obtained by integrating the outputs of the angular velocity sensors has been described as a third embodiment of the present invention. However, this is just an example of the present invention. Alternatively, the rotation angular velocity signal of the movable unit 180 may also be detected by supplying the rotation angle signals 88p, 88t, 88r to the arithmetic processing section 94 from the first and second magnetic sensors 501 and 700 of the camera driving apparatus 165 via the A/D converters and making the arithmetic processing section 94 perform differentiation arithmetic processing. As a result, the arithmetic processing section 94 can perform angular velocity feedback computation even more accurately based on the angular velocity signals 83p, 83t, 83r of the camera unit and the rotation angle signal of the movable unit 180 and the camera shake and walking blur can be compensated for even more accurately.

It should be noted that the compensation control to shift the lens barrel 107 in which the lens 105 is fit linearly in the optical axis (10) direction with respect to the movable unit 180 is carried out based on a result obtained by subjecting the output image signal of the image sensor 108 to image processing.

Such a control to be carried out based on a result obtained by subjecting the output image signal of the image sensor 108 to image processing may be an AF control, for example. The AF control is performed by the arithmetic processing section 94. First of all, the arithmetic processing section 94 gets a contrast value in a particular subject region of the image data from the image processing section 1000. Next, the arithmetic processing section 94 determines the focusing state in that particular subject region based on a series of contrast values obtained continuously and drives the lens barrel 107, for example, so as to focus on the subject region.

Optionally, the arithmetic processing section 94 may also perform a high-speed AF operation. In that case, the arithmetic processing section 94 controls the image sensor 108 so as to increase the frame rate, but decrease the resolution, of the captured image data that the image sensor 108 outputs. This control is carried out because by increasing the frame rate, a larger number of contrast values can be obtained per unit time and the in-focus position can be detected more quickly and because by decreasing the resolution, the contrast detection can get done at a higher processing rate.

Such a control to be carried out based on a result obtained by subjecting the output image signal of the image sensor 108 to image processing may also be controlling the degree of image blur due to defocusing. The arithmetic processing section 94 estimates a point spread function (PSF) in the image based on the output signal of the image processing section 1000. The PSF indicates the degree of blur in the image, which varies with the distance to the subject. The arithmetic processing section 94 calculates a variation in the degree of image blur by driving the lens barrel 107, for example, thereby calculating an approximate distance to the subject.

In the same way, the control to shift linearly the image sensor holder 116 on which the image sensor 108 is mounted along the tilting direction rotation axis 11 and the panning direction rotation axis 12 and the control to rotate and shift the image sensor holder 116 in the rolling direction 22 on the optical axis 10 are carried out with respect to the movable unit 180 based on a result obtained by subjecting the output image signal of the image sensor 108 to image processing.

Specifically, the arithmetic processing section 94 performs a feedback control based on the PSF estimated, for example, thereby controlling the image sensor driving section 99 so as to reduce the degree of blur. Under the control by the arithmetic processing section 94, the image sensor driving section 99 drives the image sensor holder 116.

A camera driving apparatus 165 and camera unit 170 according to an embodiment of the present invention can rotate the camera section 100 to a larger angle than a conventional camera shake compensation device does. That is why a camera driving apparatus which can track any subject designated in an image so that the subject is located at the center of the frame by image processing, for example, is realized.

In addition, by carrying out a shooting session while rotating the camera section 100 in either the panning direction 20 or the tilting direction 21 and by sequentially synthesizing together still pictures and movies that have been shot, a camera driving apparatus which can capture still pictures and movies at super-wide angles is realized.

Furthermore, by feeding back the results of the image processing at high speeds, the nodal point that is the center of the focus of the lens can be matched highly accurately to the spherical centroid 70 that is the physical center of rotation of the camera section 100.

Furthermore, the translational image blur to be produced noticeably during a macro shooting session, in particular, can be compensated for. In addition, according to this embodiment, even image blur which is too small for conventional movable units to compensate for successfully by rotating and driving the camera section in three axis directions can also be compensated for on a pixel-by-pixel basis.

Furthermore, the image sensor 108 is rotated on the optical axis 10, and therefore, compensation can be carried out in the rolling direction 22 on a pixel-by-pixel basis. As a result, while performing rotation blur compensation macroscopically by driving the entire movable unit 180 in the rolling direction 22, a residual subtle rotation blur of the image can be compensated for microscopically by rotating the image sensor 198 on the optical axis. By controlling the image sensor on a pixel-by-pixel basis in this manner, a camera driving apparatus which can produce a high-quality image can be provided.

Although a camera driving apparatus 165 and camera unit 170 including a camera section 100 has been described as first through third embodiments, an embodiment of the present invention is also applicable to a driver which includes a lightemitting device or a photosensing device instead of the camera section 100 and which can be driven freely in three-axis directions. For example, a driver in which a laser element or a photosensitive element is provided for the movable unit 180 instead of the camera section 100 and which can be driven freely in three-axis directions may be realized. It should be noted that the configuration of the drive system could be changed appropriately according to the design and specification. For example, if the movable unit 180 does not have to be rotated in the rolling direction, no rolling driving section needs to be provided. Likewise, if the movable unit 180 does not have to be rotated in the tilting direction 21, no tilting driving section needs to be provided.

Also, in the first through third embodiments described above, panning, tilting and rolling drive magnets are supposed to be used as attracting magnets and panning, tilting and rolling magnetic yokes are supposed to be used as magnetic bodies. However, this is only an example of the present invention. Alternatively, the camera driving apparatus 165 may include any other magnets and magnetic bodies as the attracting magnets and magnetic bodies instead of these drive magnets and magnetic yokes.

INDUSTRIAL APPLICABILITY

A camera driving apparatus 165 according to the present disclosure has a structure which can be driven in the panning, tilting, rolling and optical axis directions. Such a structure can be used effectively in a wearable camera and various other kinds of image capture devices that need an image blur compensation. The camera driving apparatus 165 can also be used effectively in high-speed subject tracking cameras, surveillance cameras and car-mounted cameras that need high-speed panning, tilting and rolling operations. The camera driving apparatus 165 is also applicable effectively to a camcorder which can carry out super-wide-angle shooting.

REFERENCE SIGNS LIST

10 optical axis
11 tilting direction rotation axis
12 panning direction rotation axis
20 panning direction
21 tilting direction
22 rolling direction
40, 41, 42, 43 winding center axis
55 supporting ball
56 supporting ball holder
70 spherical centroid
80$p$, 80$r$, 80$t$ angular velocity signal
82$p$, 82$r$, 82$t$ angular velocity signal
83$p$, 83$r$, 83$t$ angular velocity signal
84$p$, 84$r$, 84$t$ target rotation angle signal
85$p$, 85$r$, 85$t$ target angle signal
86$p$, 86$r$, 86$t$ rotation angle signal
87$p$, 87$r$, 87$t$ rotation angle signal
88$p$, 88$r$, 88$t$ rotation angle signal
91$p$, 91$r$, 91$t$ analog circuit
92$p$, 92$r$, 92$t$ amplifier circuit
93$p$, 93$r$, 93$t$ converter
94 arithmetic processing section
95$p$, 95$r$, 95$t$ converter
96$p$, 96$r$, 96$t$ driver circuit
97$p$, 97$r$, 97$t$ analog circuit
98$p$, 98$r$, 98$t$ amplifier circuit
99 image sensor driving section
100 camera section
101 lens section
102 lower movable portion
102B plane portion
102H opening
102P contact point
102R convex partial sphere
102S notched portion
105 lens
106 lens holder
107 camera barrel
107A opening
107B projection
107C hole
107D depressed portion
108 image sensor
109 shift detecting magnet
110 cable
115 optical axis direction drive coil
116 image sensor holder
116A plane portion
117, 118 image sensor drive coil
119 third magnetic sensor
120 first fixing holder
120A tilted surface
121 magnetic member
122 supporting sphere
123 image sensor rotating drive coil
130 second fixing holder
140 magnetic sensor
150 camera cover
160 movable unit
165 camera driving apparatus
170 camera unit
180 movable unit
200 base
200A concave spherical surface
200B contact surface
200C contact surface
200F cylindrical hole
200H, 200P, 200T hole
201 stopper member
201A anti-fall regulating surface
203 panning magnetic yoke
204 tilting magnetic yoke
240 guide bar
300 fixed unit
301 panning drive coil
302 tilting drive coil
303 rolling drive coil
401 panning drive magnet
402 tilting drive magnet
402A inner curved surface
405 rolling drive magnet
406 tilt detecting magnet
501 first magnetic sensor
501 second magnetic sensor
502 circuit board
600 compression spring
700 second magnetic sensor
800 control section
900, 901, 902 angular velocity sensor
1000 image processing section

The invention claimed is:

1. A camera driving apparatus comprising:
a camera section including an image sensor which has an imaging plane, a lens which has an optical axis and which produces a subject image on the imaging plane, and a lens barrel to support the lens;
a movable unit which includes at least one attracting magnet, houses the camera section inside, and has a first convex partial sphere on outer surface thereof;
a fixed unit which has at least one magnetic body and a depressed portion in which at least a portion of the movable unit is loosely fit and which brings the first convex partial sphere of the movable unit into a point or line contact with the depressed portion under magnetic attractive force of the at least one attracting magnet to the at least one magnetic body, the fixed unit allowing the movable unit to rotate freely on the spherical centroid of the first convex partial sphere;
a panning driver which tilts the camera section in a panning direction with respect to the fixed unit;
a tilting driver which tilts the camera section in a tilting direction that intersects with the panning direction at right angles with respect to the fixed unit;
a rolling driver which rotates the camera section in a rolling direction around the optical axis of the lens with respect to the fixed unit;
a lens shifter which shifts the lens barrel in the optical axis direction with respect to the movable unit and which is provided for the movable unit, wherein the lens shifter includes:
 the lens barrel which shifts in the optical axis direction with respect to a plurality of guide portions that are provided parallel to the optical axis for the movable unit and which supports the lens;
 an optical axis direction drive coil which is provided for the lens barrel; and
 an optical axis direction drive magnet which is provided for the movable unit so as to face the optical axis direction drive coil;
an image sensor shifter which shifts the image sensor with respect to the movable unit in a panning rotation axis direction that defines the axis of rotation in the panning direction and in a tilting rotation axis direction that defines the axis of rotation in the tilting direction and which is provided for the movable unit;
a first detector which detects the tilt angles of the camera section in the panning and tilting directions with respect to the fixed unit;
a second detector which detects the angle of rotation of the camera section that rotates in the rolling direction;
a third detector which detects the magnitude of shift of the lens barrel in the optical axis direction; and
a fourth detector which detects the magnitudes of shift of the image sensor in the panning rotation axis direction and in the tilting rotation axis direction.

2. A camera driving apparatus comprising:
a camera section including an image sensor which has an imaging plane, a lens which has an optical axis and which produces a subject image on the imaging plane, and a lens barrel to support the lens;
a movable unit which includes at least one attracting magnet, houses the camera section inside, and has a first convex partial sphere on outer surface thereof;
a fixed unit which has at least one magnetic body and a depressed portion in which at least a portion of the movable unit is loosely fit and which brings the first convex partial sphere of the movable unit into a point or line contact with the depressed portion under magnetic attractive force of the at least one attracting magnet to the at least one magnetic body, the fixed unit allowing the movable unit to rotate freely on the spherical centroid of the first convex partial sphere;
a panning driver which tilts the camera section in a panning direction with respect to the fixed unit;
a tilting driver which tilts the camera section in a tilting direction that intersects with the panning direction at right angles with respect to the fixed unit;
a rolling driver which rotates the camera section in a rolling direction around the optical axis of the lens with respect to the fixed unit;
a lens shifter which shifts the lens barrel in the optical axis direction with respect to the movable unit and which is provided for the movable unit, wherein the lens shifter includes:
 the lens barrel which shifts in the optical axis direction with respect to a plurality of guide portions that are provided parallel to the optical axis for the movable unit and which supports the lens;
 an optical axis direction drive coil which is provided for the lens barrel; and
 an optical axis direction drive magnet which is provided for the movable unit so as to face the optical axis direction drive coil;
an image sensor shifter which shifts the image sensor with respect to the movable unit in a panning rotation axis direction that defines the axis of rotation in the panning direction and in a tilting rotation axis direction that defines the axis of rotation in the tilting direction and rotates the image sensor in the rolling direction and which is provided for the movable unit;
a first detector which detects the tilt angles of the camera section in the panning and tilting directions with respect to the fixed unit;
a second detector which detects the angle of rotation of the camera section that rotates in the rolling direction;
a third detector which detects the magnitude of shift of the lens barrel in the optical axis direction; and
a fourth detector which detects the magnitudes of shift of the image sensor in the panning rotation axis direction and in the tilting rotation axis direction.

3. The camera driving apparatus of claim 1, wherein the fixed unit has at least three second convex partial spheres inside the depressed portion, and the second convex partial spheres make a point contact with the first convex partial sphere of the movable unit.

4. The camera driving apparatus of claim 1, wherein the fixed unit has a concave conical surface defining the inner side surface of the depressed portion and the concave conical surface and the first convex partial sphere of the movable unit make a line contact with each other.

5. The camera driving apparatus of claim 1, further comprising a stopper member which is provided for the fixed unit and which has a regulating surface that regulates the movement of the movable unit so as to prevent the movable unit from falling off the fixed unit,
wherein the regulating surface has a concave partial sphere, of which the centroid agrees with the spherical centroid of the first convex partial sphere.

6. The camera driving apparatus of claim 1, wherein the panning driver includes a pair of panning drive magnets which is arranged symmetrically with respect to the optical axis in the movable unit, a pair of panning magnetic yokes which is arranged in the fixed unit so as to face the pair of panning drive magnets, and a pair of panning drive coils which is wound around the pair of panning magnetic yokes,
the tilting driver includes a pair of tilting drive magnets which is arranged symmetrically with respect to the optical axis in the movable unit, a pair of tilting magnetic yokes which is arranged in the fixed unit so as to face the pair of tilting drive magnets, and a pair of tilting drive coils which is wound around the pair of tilting magnetic yokes, the pair of panning drive magnets and the pair of panning drive coils are arranged on a line which passes through the spherical centroid of the first convex partial sphere, the pair of tilting drive magnets and the pair of tilting drive coils are arranged on another line which also passes through the spherical centroid of the first convex partial sphere, and the center of the movable unit in the optical axis direction substantially agrees with the spherical centroid of the first convex partial sphere.

7. The camera driving apparatus of claim 6, wherein the rolling driver includes four rolling drive coils which are wound around the pair of panning magnetic yokes and the pair of tilting magnetic yokes, respectively, and uses the pair of panning drive magnets and the pair of tilting drive magnets as a pair of rolling drive magnets.

8. The camera driving apparatus of claim 6, wherein the at least one magnetic body includes the pair of panning magnetic yokes and the pair of tilting magnetic yokes.

9. The camera driving apparatus of claim 6, wherein the at least one attracting magnet includes the pair of panning drive magnets and the pair of tilting drive magnets.

10. The camera driving apparatus of claim 6, wherein lines which intersect at right angles with the respective winding center axes of the pair of panning drive coils and the pair of tilting drive coils and which pass through the spherical centroid of the first convex partial sphere and the drive coils define a tilt angle A of 45 degrees or less with respect to a horizontal plane which intersects with the optical axis at right angles and which passes through the spherical centroid of the first convex partial sphere, and the pair of panning drive magnets and the pair of tilting drive magnets are arranged tilted with respect to the movable unit so as to face the pair of panning drive coils and the pair of tilting drive coils, respectively.

11. The camera driving apparatus of claim 6, wherein lines which intersect at right angles with the respective winding center axes of the pair of rolling drive coils and which pass through the spherical centroid of the first convex partial sphere define a tilt angle B of 45 degrees or less with respect to a horizontal plane which intersects with the optical axis at right angles and which passes through the spherical centroid of the first convex partial sphere and the respective centers of the rolling drive coils, the rolling driver includes a pair of rolling drive magnets, which is arranged tilted with respect to the movable unit so as to face the rolling drive coils.

12. The camera driving apparatus of claim 10, wherein the tilt angle A is 20 degrees.

13. The camera driving apparatus of claim 11, wherein the tilt angle B is 20 degrees.

14. The camera driving apparatus of claim 3, wherein lines which connect the respective spherical centroids of the second convex partial spheres to the spherical centroid of the first convex partial sphere define a tilt angle C of 45 degrees with respect to a horizontal plane which intersects with the optical axis at right angles and which passes through the spherical centroid of the first convex partial sphere.

15. The camera driving apparatus of claim 7, wherein the pair of panning drive magnets, the pair of tilting drive magnets and the pair of rolling drive magnets are located inside the movable unit and not exposed on the first convex partial sphere.

16. The camera driving apparatus of claim 7, wherein the pair of panning drive coils, the pair of tilting drive coils and the rolling drive coils are arranged inside the fixed unit and not exposed inside the depressed portion.

17. The camera driving apparatus of claim 15, wherein the movable unit is made of a resin material.

18. The camera driving apparatus of claim 15, wherein the movable unit has been formed together with the pair of panning drive magnets, the pair of tilting drive magnets and the pair of rolling drive magnets.

19. The camera driving apparatus of claim 16, wherein the fixed unit is made of a resin material.

20. The camera driving apparatus of claim 19, wherein the fixed unit has been formed together with the pair of panning drive coils, the pair of tilting drive coils, the rolling drive coils, the pair of panning magnetic yokes, the pair of tilting magnetic yokes and the pair of rolling magnetic yokes.

21. The camera driving apparatus of claim 1, wherein the first detector includes a first magnetic sensor which is fixed to the fixed unit and a tilt detecting magnet which is provided for the movable unit, and the first magnetic sensor senses a variation in magnetic force due to a tilt of the tilt detecting magnet and calculates two-dimensional tilt angles of the camera section in the panning and tilting directions.

22. The camera driving apparatus of claim 21, wherein the first magnetic sensor and the tilt detecting magnet are located on the optical axis.

23. The camera driving apparatus of claim 1, wherein the first detector includes a photosensor which is fixed to the fixed unit and a photosensing pattern which is arranged on a portion of the first convex partial sphere of the movable unit, and the photosensor senses a variation in light that has been incident on the photosensor due to a tilt of the photosensing pattern and calculates two-dimensional tilt angles of the camera section in the panning and tilting directions.

24. The camera driving apparatus of claim 1, wherein the panning driver includes a pair of panning drive magnets which is arranged symmetrically with respect to the optical axis in the movable unit, the tilting driver includes a pair of tilting drive magnets which is arranged symmetrically with respect to the optical axis in the movable unit, and the optical axis direction drive magnet includes the pair of panning drive magnets and the pair of tilting drive magnets.

25. The camera driving apparatus of claim 1, wherein the winding center axis of the optical axis direction drive coil agrees with the optical axis.

26. The camera driving apparatus of claim 1, wherein the guide portions are guide bars which are fixed to the movable unit and which run parallel to the optical axis.

27. The camera driving apparatus of claim 1, wherein the image sensor shifter includes:

an image sensor holder portion which holds the image sensor;

a supporting member for supporting the image sensor holder portion so that the image sensor holder portion is movable with respect to the movable unit within a plane that intersects with the optical axis at right angles;

an image sensor drive coil which has a winding center axis that is parallel to the optical axis and which is fixed to the image sensor holder portion; and an image sensor drive magnet which is fixed to the movable unit so as to face the image sensor drive coil.

28. The camera driving apparatus of one of claim 2, wherein the image sensor shifter includes:
- an image sensor holder portion which holds the image sensor;
- a supporting member for supporting the image sensor holder portion so that the image sensor holder portion is movable with respect to the movable unit within a plane that intersects with the optical axis at right angles;
- a first image sensor drive coil which has a winding center axis that is parallel to the optical axis and which is fixed to the image sensor holder portion;
- a first image sensor drive magnet which is fixed to the movable unit so as to face the first image sensor drive coil;
- a second image sensor drive coil which has a winding center axis that is tilted with respect to the optical axis and which is fixed to the image sensor holder portion; and
- a second image sensor drive magnet which is fixed to the movable unit so as to face the second image sensor drive coil.

29. The camera driving apparatus of claim 27, wherein the first detector includes a first magnetic sensor which is fixed to the fixed unit and a tilt detecting magnet which is provided for the movable unit,
- the first magnetic sensor senses a variation in magnetic force due to a tilt of the tilt detecting magnet and calculates two-dimensional tilt angles of the camera section in the panning and tilting directions, and
- the image sensor drive magnet is the tilt detecting magnet.

30. The camera driving apparatus of claim 28, wherein the first detector includes a first magnetic sensor which is fixed to the fixed unit and a tilt detecting magnet which is provided for the movable unit,
- the first magnetic sensor senses a variation in magnetic force due to a tilt of the tilt detecting magnet and calculates two-dimensional tilt angles of the camera section in the panning and tilting directions, and
- the first image sensor drive magnet is the tilt detecting magnet.

31. The camera driving apparatus of claim 28, wherein the second image sensor drive magnet is either a panning drive magnet for use to drive the movable unit in the panning direction or a tilting drive magnet for use to drive the movable unit in the tilting direction.

32. The camera driving apparatus of claim 27, wherein the supporting member includes:
- a first plane portion which is provided for the image sensor holder portion and which has a plane that intersects with the optical axis at right angles;
- a second plane portion which is provided for the movable unit and which has a plane that intersects with the optical axis at right angles; and
- at least three supporting balls which are held between the first and second plane portions.

33. The camera driving apparatus of claim 32, wherein the image sensor holder portion includes a magnetic body and grips the supporting balls with magnetic attractive force between the magnetic body and the image sensor drive magnet.

34. The camera driving apparatus of claim 32, wherein the image sensor holder portion includes a magnetic body and grips the supporting balls with magnetic attractive force between the magnetic body and the first image sensor drive magnet.

35. The camera driving apparatus of claim 1, wherein the center of mass of the movable unit agrees with the spherical centroid of the first convex partial sphere.

36. The camera driving apparatus of claim 6, further comprising cables which are connected to the camera section and which are implemented as flexible cables,
- wherein the cables are arranged line-symmetrically with respect to the optical axis and are fixed to the movable unit in a direction which defines an angle of 45 degrees with respect to either a line that connects the pair of tilting drive magnets together or a line that connects the pair of panning drive magnets together on a plane which intersects with the optical axis at right angles.

37. The camera driving apparatus of claim 1, wherein the second detector includes a second magnetic sensor which is fixed to the fixed unit and a rotation detecting magnet which is provided for the movable unit, and
- the second magnetic sensor senses a variation in magnetic force due to a rotation of the rotation detecting magnet and calculates the angle of rotation of the movable unit in the rolling direction.

38. The camera driving apparatus of claim 37, wherein the rotation detecting magnet is either a panning drive magnet for use to drive the movable unit in the panning direction or a tilting drive magnet for use to drive the movable unit in the tilting direction.

39. The camera driving apparatus of claim 1, wherein the third detector includes a third magnetic sensor which is fixed to the movable unit and a first shift detecting magnet which is provided for the lens barrel, and
- the third magnetic sensor senses a variation in magnetic force due to a shift of the first shift detecting magnet and calculates the magnitude of shift of the lens barrel in the optical axis direction.

40. The camera driving apparatus of claim 1, wherein the image sensor shifter includes an image sensor holder portion which holds the image sensor,
- the fourth detector includes a fourth magnetic sensor which is fixed to the image sensor holder portion and a second shift detecting magnet which is provided for the movable unit, and
- the fourth magnetic sensor senses a variation in magnetic force due to a shift of the image sensor holder portion and calculates the magnitudes of shift of the image sensor shifter in the panning rotation axis direction and in the tilting rotation axis direction.

41. The camera driving apparatus of claim 40, wherein the first detector includes a first magnetic sensor which is fixed to the fixed unit and a tilt detecting magnet which is provided for the movable unit,
- the first magnetic sensor senses a variation in magnetic force due to a tilt of the tilt detecting magnet and calculates two-dimensional tilt angles of the camera section in the panning and tilting directions, and
- the second shift detecting magnet is the tilt detecting magnet.

42. The camera driving apparatus of claim 5, wherein a gap is left between the regulating surface of the stopper member and the first convex partial sphere of the movable unit and has been determined so that even if the first convex partial sphere of the movable unit has fallen off the depressed portion of the fixed unit, the first convex partial sphere and the depressed portion recover their point or line contact with magnetic attractive force.

43. A camera unit comprising:

the camera driving apparatus of claim 1;

an angular velocity sensor which senses angular velocities of the fixed unit around three orthogonal axes;

an arithmetic processing section which generates target rotation angle signals based on the outputs of the angular velocity sensor; and a driver circuit which generates signals to drive the panning driver, the tilting driver, and the rolling driver based on the target rotation angle signals.

44. A camera unit comprising:

the camera driving apparatus of claim 1 which has rotated 45 degrees around the optical axis of the camera section;

an angular velocity sensor which senses angular velocities of the fixed unit around three orthogonal axes;

an arithmetic processing section which generates target rotation angle signals based on the outputs of the angular velocity sensor; and a driver circuit which generates signals to drive the panning driver, the tilting driver, and the rolling driver based on the target rotation angle signals.

45. An optical device driver comprising:

an optical device which has an optical axis and which either receives or emits light;

a movable unit which includes at least one attracting magnet, houses the optical device inside, and has a first convex partial sphere on outer surface thereof;

a fixed unit which has at least one magnetic body and a depressed portion in which at least a portion of the movable unit is loosely fit and which brings the first convex partial sphere of the movable unit into a point or line contact with the depressed portion under magnetic attractive force of the at least one attracting magnet to the at least one magnetic body, the fixed unit allowing the movable unit to rotate freely on the spherical centroid of the first convex partial sphere;

a panning driver which tilts the optical device in a panning direction with respect to the fixed unit;

a tilting driver which tilts the optical device in a tilting direction that intersects with the panning direction at right angles with respect to the fixed unit;

a rolling driver which rotates the optical device in a rolling direction around the optical axis with respect to the fixed unit;

a first optical device shifter which shifts the optical device in the optical axis direction with respect to the movable unit and which is provided for the movable unit, wherein the first optical device shifter includes:

a lens barrel which shifts in the optical axis direction with respect to a plurality of guide portions that are provided parallel to the optical axis for the movable unit and which supports a lens;

an optical axis direction drive coil which is provided for the lens barrel; and an optical axis direction drive magnet which is provided for the movable unit so as to face the optical axis direction drive coil;

a second optical device shifter which shifts the optical device with respect to the movable unit in a panning rotation axis direction that defines the axis of rotation in the panning direction and in a tilting rotation axis direction that defines the axis of rotation in the tilting direction and which is provided for the movable unit;

a first detector which detects the tilt angles of the optical device in the panning and tilting directions with respect to the fixed unit;

a second detector which detects the angle of rotation of the optical device that rotates in the rolling direction;

a third detector which detects the magnitude of shift of the optical device in the optical axis direction; and a fourth detector which detects the magnitudes of shift of the optical device in the panning rotation axis direction and in the tilting rotation axis direction.

* * * * *